(12) United States Patent
Tietzen et al.

(10) Patent No.: US 12,271,923 B2
(45) Date of Patent: Apr. 8, 2025

(54) MEMBER PROFILE POPULATION

(71) Applicant: Edatanetworks, Inc., Calgary (CA)

(72) Inventors: Terrance Patrick Tietzen, Edmonton (CA); Matthew Arnold Macpherson Bates, Beaumont (CA)

(73) Assignee: EDATANETWORKS INC, Calgary (CA)

( * ) Notice: Subject to any disclaimer, the term of this patent is extended or adjusted under 35 U.S.C. 154(b) by 0 days.

(21) Appl. No.: 18/517,334

(22) Filed: Nov. 22, 2023

(65) Prior Publication Data

US 2024/0412244 A1 Dec. 12, 2024

Related U.S. Application Data

(63) Continuation of application No. 17/845,531, filed on Jun. 21, 2022, now Pat. No. 12,008,595, which is a
(Continued)

(51) Int. Cl.
*G06Q 30/02* (2023.01)
*G06Q 30/0207* (2023.01)
(Continued)

(52) U.S. Cl.
CPC ........ *G06Q 30/0224* (2013.01); *G06Q 30/02* (2013.01); *G06Q 30/0207* (2013.01); *G06Q 30/0222* (2013.01); *G06Q 30/0226* (2013.01); *G06Q 30/0233* (2013.01); *G06Q 30/0241* (2013.01); *G06Q 30/0242* (2013.01); *G06Q 30/0256* (2013.01); *G06Q 30/0214* (2013.01)

(58) Field of Classification Search
CPC ............... G06Q 30/0224; G06Q 30/02; G06Q 30/0207; G06Q 30/0222; G06Q 30/0226; G06Q 30/0233; G06Q 30/0241; G06Q 30/0242; G06Q 30/0256
See application file for complete search history.

(56) References Cited

U.S. PATENT DOCUMENTS

| 7,082,409 B1 * | 7/2006 | Cherry | G06Q 30/06 705/27.1 |
| 2010/0010887 A1 * | 1/2010 | Karlin | G06Q 30/0273 705/14.15 |
| 2010/0070409 A1 * | 3/2010 | Harrison | G06Q 20/10 705/39 |

* cited by examiner

*Primary Examiner* — Scott C Anderson
(74) *Attorney, Agent, or Firm* — Bradley K. DeSandro; DESANDRO LAW GROUP PLLC

(57) ABSTRACT

Methods, devices and media for a pre-enrollment registration system are described. The method includes: receiving signals representing pre-enrollment data, the pre-enrollment data including profile information associated with at least one prospective member; generating, with the at least one processor, a registration identifier for each of the at least one prospective members; storing each of the registration identifiers in association with the respective prospective member profile information; receiving, at the at least one processor, signals representing a registration request including the registration identifier associated with a requesting prospective member; generating, with the at least one processor, signals for displaying an interface, the interface including a plurality of profile fields, wherein at least one of the profile fields are pre-populated with at least a portion of the profile information associated with the requesting prospective member; and receiving signals for modifying or confirming the pre-populated profile fields.

20 Claims, 55 Drawing Sheets

Related U.S. Application Data continuation of application No. 17/124,690, filed on Dec. 17, 2020, now Pat. No. 11,403,659, which is a continuation of application No. 14/686,247, filed on Apr. 14, 2015, now Pat. No. 10,902,451, which is a continuation-in-part of application No. 13/168,488, filed on Jun. 24, 2011, now Pat. No. 9,105,050, which is a continuation-in-part of application No. PCT/CA2009/001605, filed on Nov. 6, 2009.

(60) Provisional application No. 61/979,137, filed on Apr. 14, 2014.

(51) Int. Cl.
| | |
|---|---|
| *G06Q 30/0226* | (2023.01) |
| *G06Q 30/0241* | (2023.01) |
| *G06Q 30/0242* | (2023.01) |
| *G06Q 30/0251* | (2023.01) |
| *G06Q 30/0214* | (2023.01) |

FIGURE 22A

CUSTOMER TAGGING

| TAG | DESCRIPTION | CUSTOMERS |
|---|---|---|
| R4HF-Join-2014.02 | New signup from the Royal Alex promotion in February and March in 2014 | 123 |
| R4HF-Join-2013.12 | New signup from the Royal Alex promotion in December and January in 2013 | 45 |
| R4HF-Join-2013.10 | New signup from the Royal Alex promotion in October and November in 2013 | 0 |
| R4HF-Join-2013.08 | New signup from the Royal Alex promotion in August and September in 2013 | 1 |
| R4HF-Join-2013.06 | New signup from the Royal Alex promotion in June and July in 2013 | 0 |

[NEW TAG] [ASSIGN MULTIPLE TAGS]

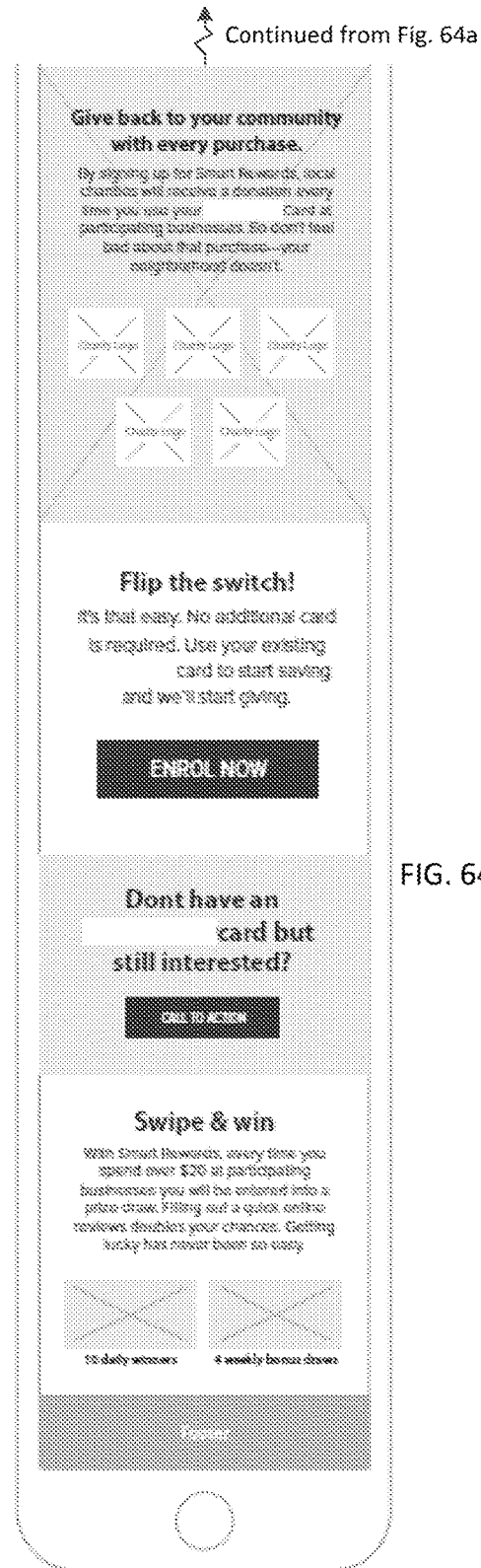
Continued from Fig. 64a
FIG. 64b

MEMBER PROFILE POPULATION

CROSS-REFERENCE TO RELATED APPLICATIONS

This application is a Continuation of U.S. patent application Ser. No. 17/845,531, filed on Jun. 21, 2022, which is a Continuation of U.S. patent application Ser. No. 17/124,690 filed on Dec. 17, 2020, which is a Continuation of U.S. patent application Ser. No. 14/686,247 filed on Apr. 4, 2015, which is a Continuation-in-part of U.S. patent application Ser. No. 13/168,488, filed on Jun. 24, 2011, now U.S. Pat. No. 9,105,050, which is a continuation of application No. PCT/CA2009/001605, filed on Nov. 6, 2009, which claims priority to U.S. Provisional application No. 61/979,137, filed on Apr. 14, 2014. All of these references are hereby incorporated by reference in their entireties.

FIELD

The embodiments described herein relate to systems and methods for loyalty programs, and in particular, to systems and methods for loyalty programs involving merchants and loyalty program members holding financial cards from a card issuer associated with the loyalty reward program.

BACKGROUND

The term "merchant" may refer to an entity who participates in a loyalty program to build loyalty with customers, and potentially acquire new business, and in exchange is willing to provide a loyalty "benefit", which may include the various types of benefits that may be associated with loyalty cards including points, whether convertible to financial rewards, or financial rewards convertible to points, cash, products, services, discounts, value add-ons for purchases of products or services, the opportunity to enter into a contest with prizes contributed by the merchants, financial institutions and/or the loyalty system operator.

A "member" may refer to the customer or potential customer who is a member of the loyalty program.

A "card issuer" may refer to an entity that issues (directly or through an agent) financial cards to individuals or businesses. The card issuer is generally a financial institution, financial institution in association with a credit card company, or other entity that has a financial institution arm. "Financial cards" may generally refer to credit cards, debit cards, INTERAC cards, stored value cards and so on.

"Cardholders" may refer to the individuals or businesses to whom the financial cards are issued. "Loyalty" may be used in the broad sense to also extend to "rewards"; therefore a "loyalty program" may also extend to a "reward program".

Customer acquisition systems may play an increasingly important role for business. Customer loyalty programs can contribute to the loyalty of existing customers, but also can play a role in acquiring new customers.

The businesses of the various card issuers may vary significantly. Financial cards are generally issued by or issued in cooperation with financial institutions. For example: (1) financial institutions (including a financial institution associated with a source of benefits) issue financial cards directly to customers; and (2) a co-branded financial card including for example the brand of the financial institution and the brand of a source of benefits.

Financial institutions are often interested in partnering with other entities, such as sources of benefits, to make the benefits associated with their financial card competitive. This may be in order to retain and attract their customers, but also in order to compete for transaction share as cardholders generally carry more than one financial card in their wallet. Transaction share in turn affects the revenue realized by the financial institution. Accordingly, financial institutions tend to measure the effectiveness of their marketing efforts in connection with financial cards by analyzing incremental transactions involving their financial card.

In addition, financial institutions are generally interested in sharing profit/risk with other parties in connection with their financial card related activities. This is evidenced in the popularity of co-branded cards. Generally speaking, however, card issuers are only interested in providing access to their customer base to outside parties if there is significant financial reward, and if this access does not conflict with their own interests and/or present any risk to the customer base.

Merchants provide benefits to their customers for reasons that are not dissimilar to the factors that motivate financial institutions. Merchants are interested in attracting and maintaining customers. The cost of acquisition of a new customer for many merchants is quite high. While merchants are interested in acquiring new customers efficiently, they are often also willing to provide relatively significant benefits in exchange for a new customer relationship from an outside source.

Merchants and financial institutions often collaborate in the context of co-branded financial cards. Examples include airline/credit cards, oil company financial cards, or retail chain financial cards. From a merchant perspective, these collaborative arrangements are generally available to large national chains and are not generally available to regional chains or small businesses, even though from a customer acquisition or benefits perspective such regional chains or small businesses might be of interest to a financial institution.

The costs associated with deploying and marketing a co-branded card requires economies of scale that effectively exclude many regional or small business co-branded financial card arrangements. From the perspective of a financial institution, the benefits associated with the co-branded financial cards are generally limited to the type of benefits made available by a merchant or a relatively small group of associated partners. This exposes the financial institution to competition to other co-branded financial cards, especially if the merchant associated with the competing card is more popular or makes better benefits available. Also, relationships with merchants become difficult or cumbersome to replace (especially over time) thereby resulting in loss of bargaining power in the hands of the financial institution and thereby possible erosion of benefits. This contributes risk to the financial institution's card issuing operation, and also generally results in financial institutions entering into multiple co-branding relationships, which in turn adds to the associated costs.

Known loyalty programs may lack of flexibility in the manner in which transactions triggering the accrual of benefits to cardholders must occur. The benefit that a merchant participating in a loyalty program is willing to provide will depend on a particular merchant and their business objectives at a particular time, and in some cases on the special demographic attributes of the cardholders, or a particular subset of cardholders. Known systems may not enable merchants to suitably reflect these changing objectives in the manner in which benefits are accrued to cardholders in connection with financial transactions.

There is a need for an improved method to encourage members to join a loyalty program in relatively large numbers. There is also a need for an efficient method to encourage cardholders to use their financial cards in a greater number of transactions thereby protecting transactions market share. There is a further need for an improved method for financial institutions and merchants to collaborate to attract and maintain customers. There is a further need for a loyalty system that enables card issuers to build loyalty with cardholders by maximizing the benefits that are available to their cardholders via the loyalty system. Therefore there is a need for a loyalty program linked to card issuers and their cardholders that allows the participation of multiple merchants, and the flexibility that enables the benefit to the cardholder to be maximized by responding to the changing business objectives of the merchants. There is a further need for a loyalty program that enables multiple merchants to reflect their changing business objectives by dynamically modifying the rules of the loyalty program as they relate to benefits accrued by cardholders. There is a need for a loyalty program that enables merchants to customize their loyalty program, including as it related to cardholders who become members of the loyalty program, on the fly, including based on effectiveness and incremental cost. Finally, there is a need for a loyalty program that analyzes customer and cardholder data to suggest incentives and rewards to merchants to customize their loyalty program.

SUMMARY

In accordance with one aspect, there is provided a method for a pre-enrollment registration system. The method includes: receiving, at at least one processor, signals representing pre-enrollment data, the pre-enrollment data including profile information associated with at least one prospective member; generating, with the at least one processor, a registration identifier for each of the at least one prospective members; storing each of the registration identifiers in association with the respective prospective member profile information; receiving, at the at least one processor, signals representing a registration request including the registration identifier associated with a requesting prospective member; generating, with the at least one processor, signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

In accordance with another aspect, there is provided a computing device for a pre-enrollment registration system. The computing device includes: at least one processor configured for: receiving signals representing pre-enrollment data, the pre-enrollment data including profile information associated with at least one prospective member; generating a registration identifier for each of the at least one prospective members; storing each of the registration identifiers in association with the respective prospective member profile information; receiving signals representing a registration request including the registration identifier associated with a requesting prospective member; generating signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

In accordance with another aspect, there is provided a non-transitory computer-readable medium or media having instructions stored thereon. The instructions when executed by at least one processor, configure the at least one processor for: receiving signals representing pre-enrollment data, the pre-enrollment data including profile information associated with at least one prospective member; generating a registration identifier for each of the at least one prospective members; storing each of the registration identifiers in association with the respective prospective member profile information; receiving signals representing a registration request including the registration identifier associated with a requesting prospective member; generating signals for displaying an interface, the interface including a plurality of profile fields, wherein at least one of the profile fields are pre-populated with at least a portion of the profile information associated with the requesting prospective member; and receiving, at the at least one processor, signals for modifying or confirming the pre-populated profile fields.

DRAWINGS

Various embodiments will now be described, by way of example only, with reference to the following drawings, in which:

FIGS. 1 and 2 provide schematic diagrams of example loyalty systems in accordance with example embodiments;

FIGS. 3 and 4 provide flowchart diagrams of example methods for loyalty systems in accordance with example embodiments;

Figure 14:
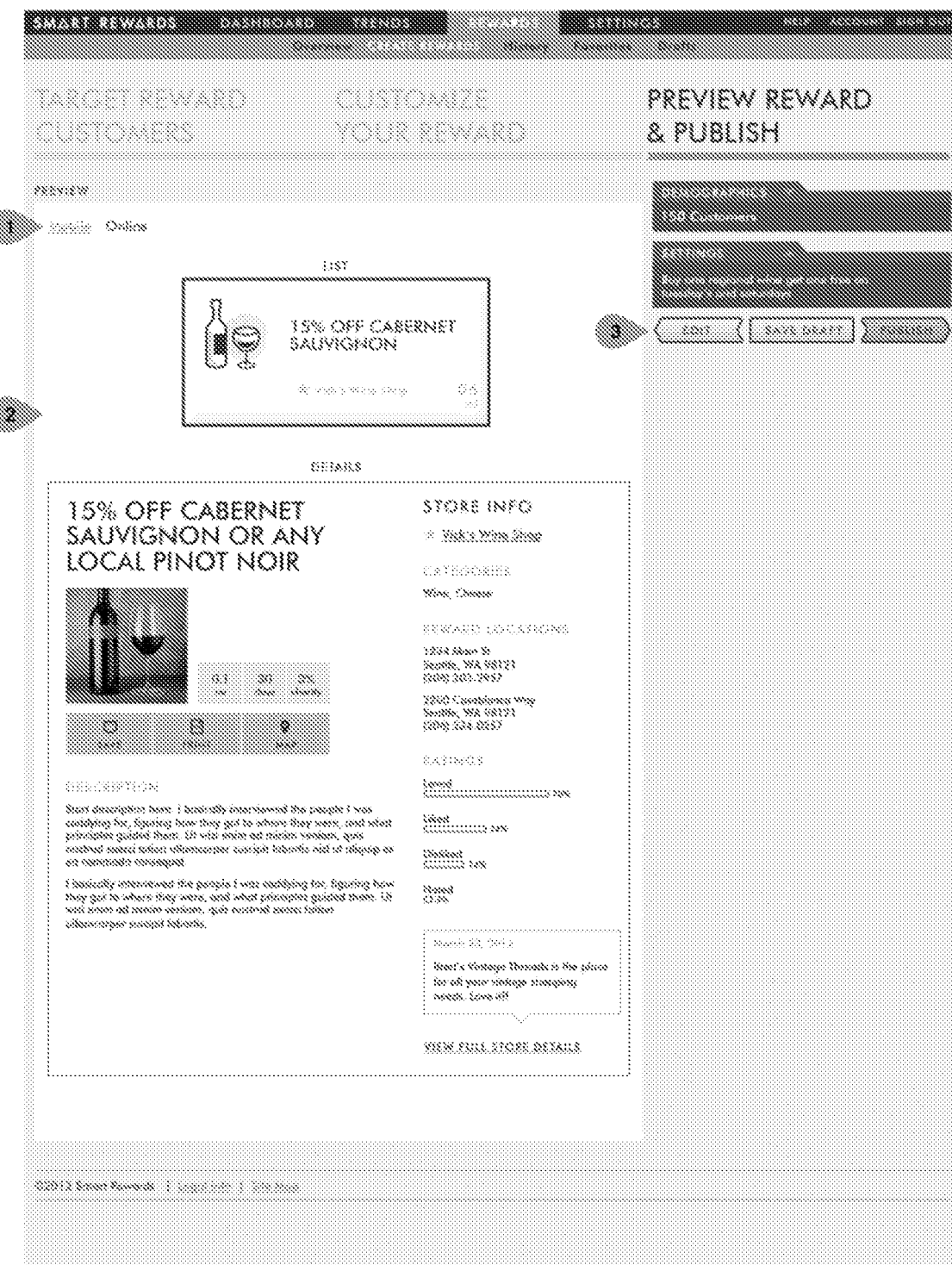
Figure 15:
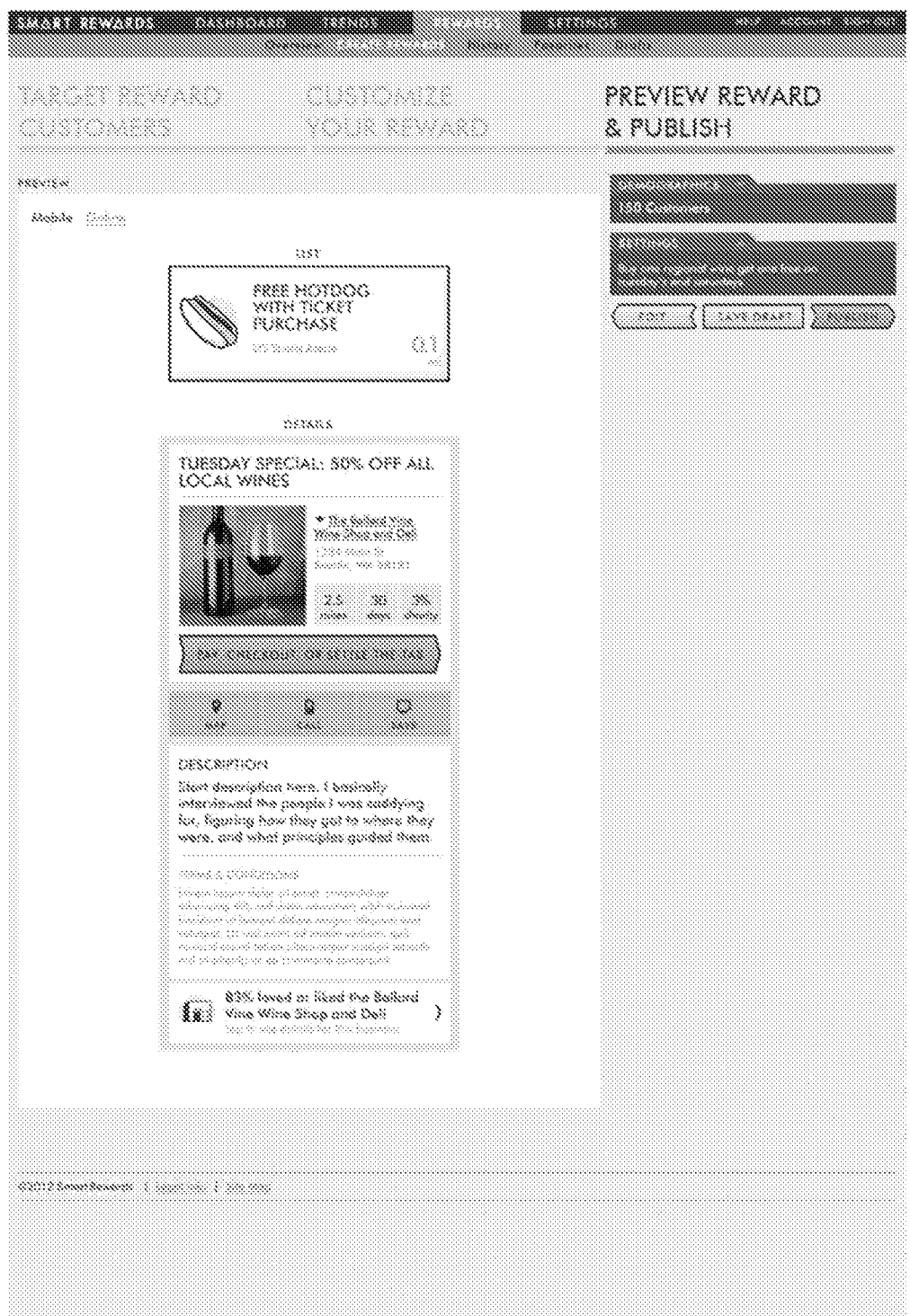
Figure 16:
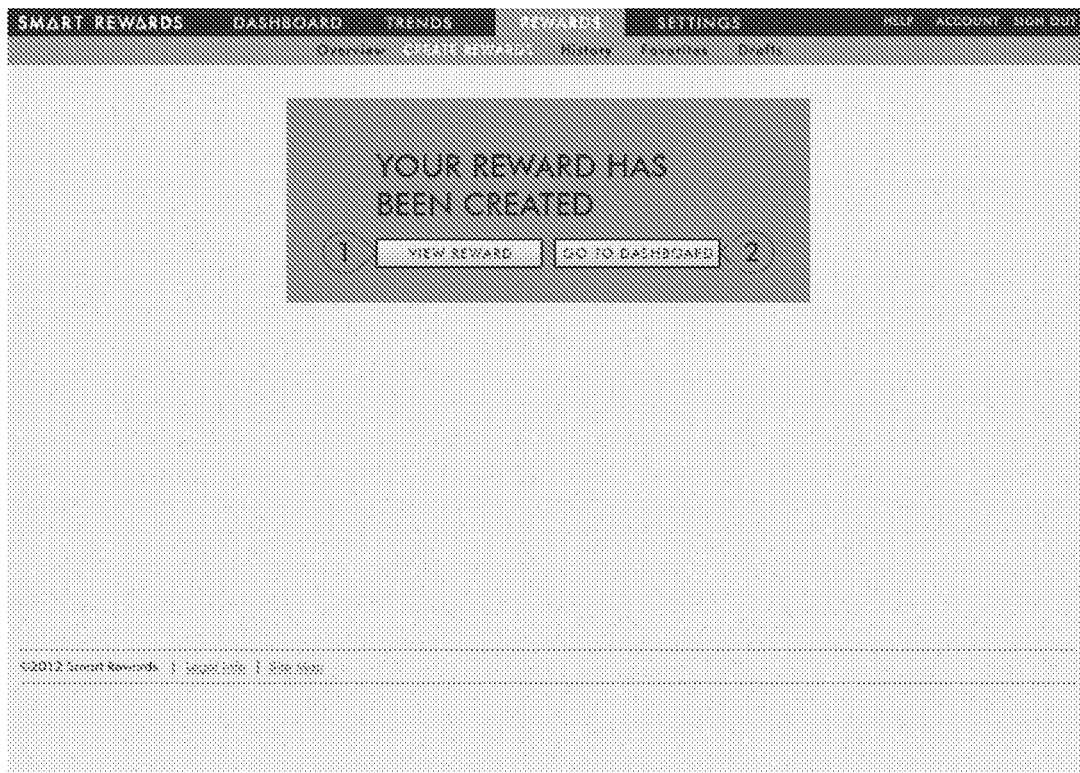
Figure 17:
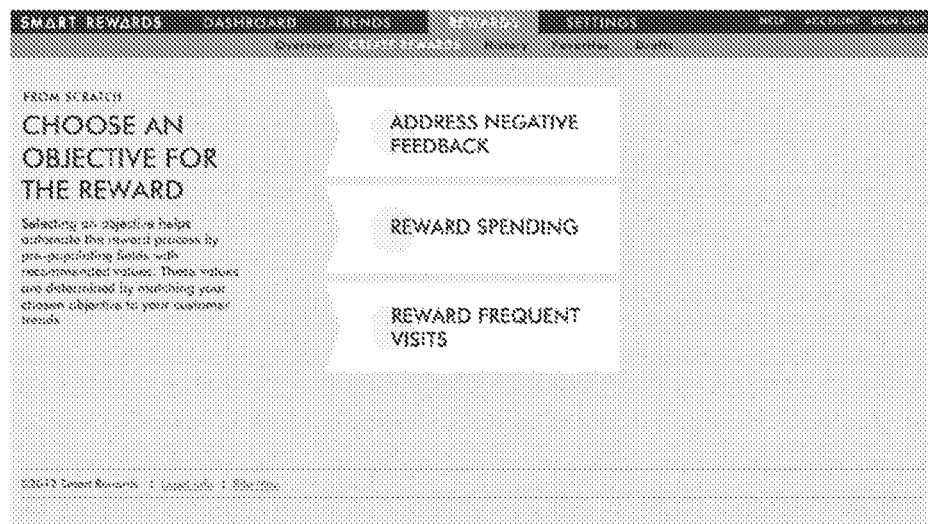
Figure 18:
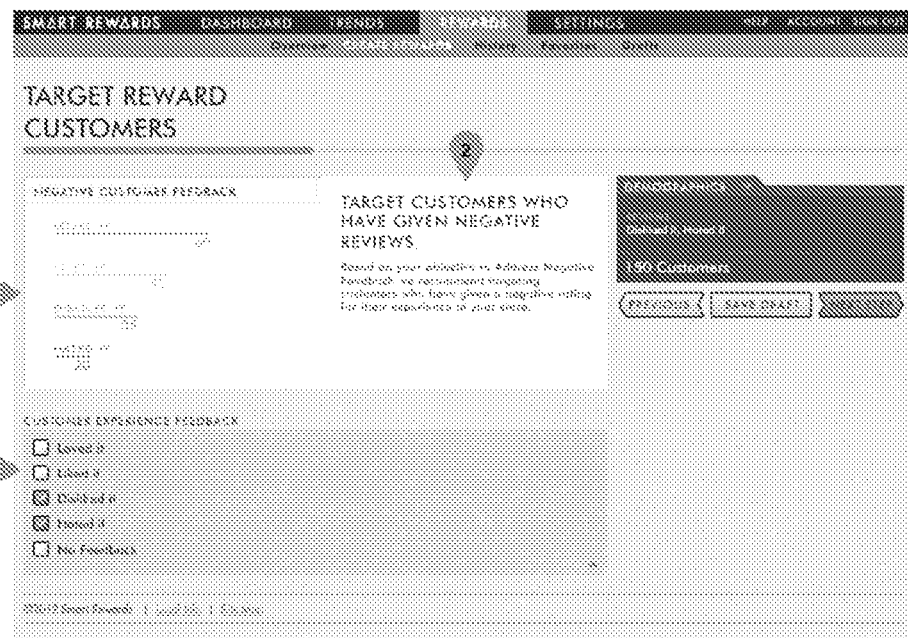
Figure 19:
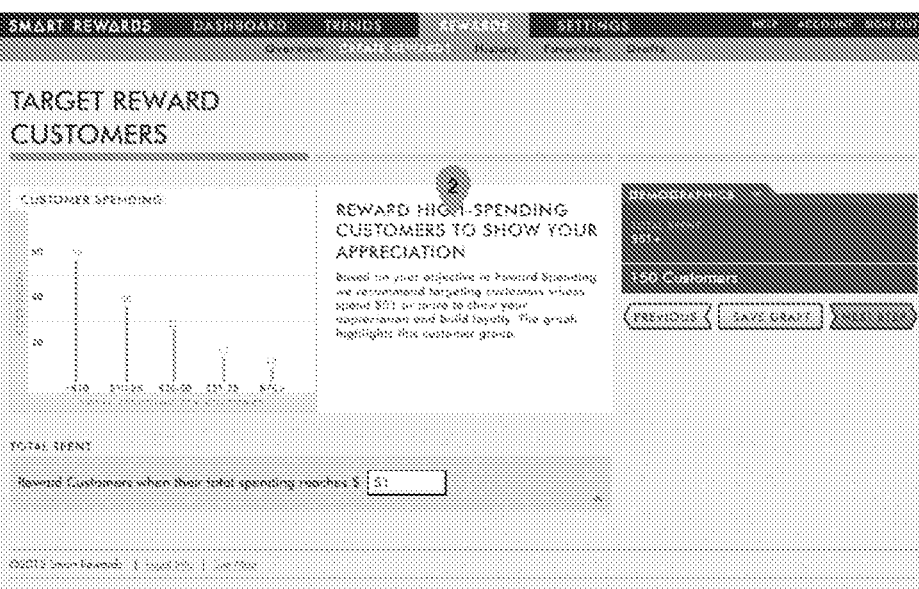
Figure 20:
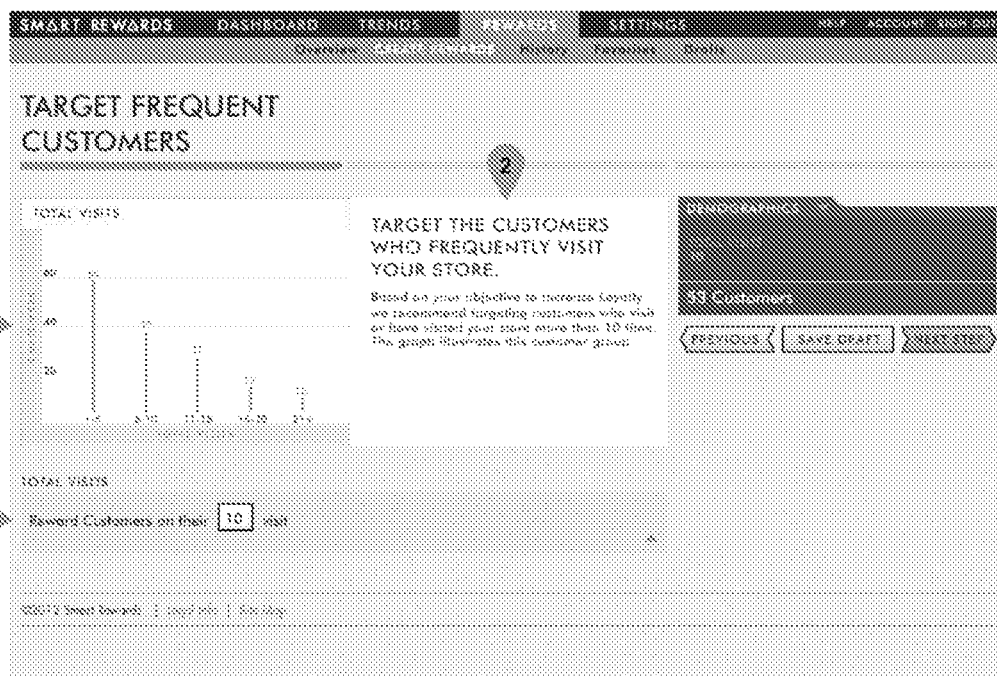
Figure 21:
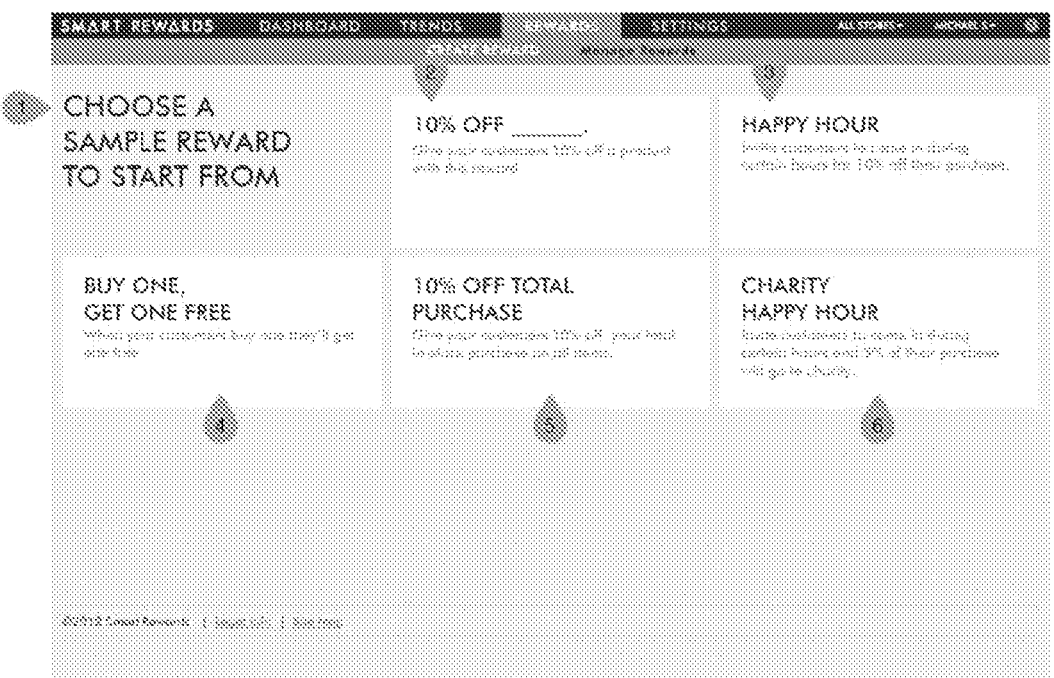
Figure 22B:
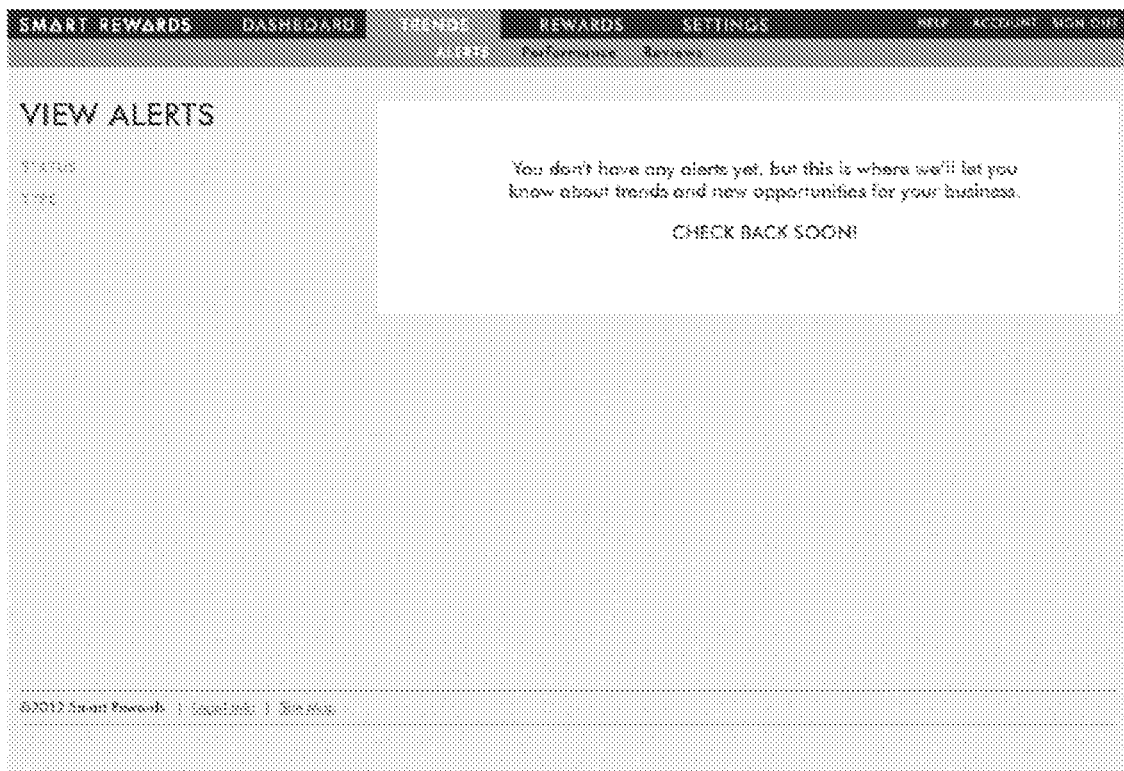
Figure 23A:
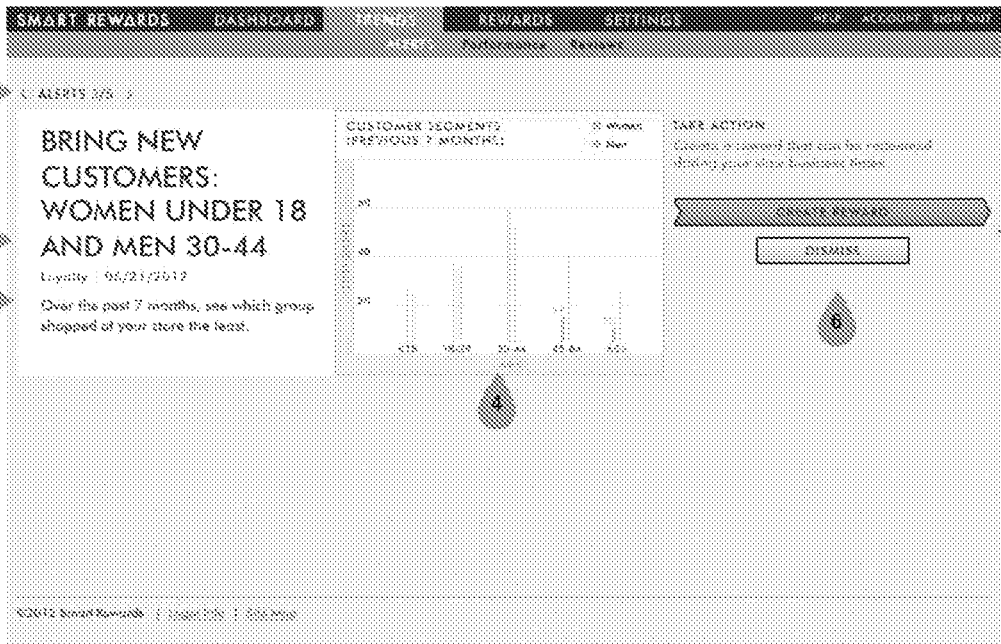
Figure 23B:
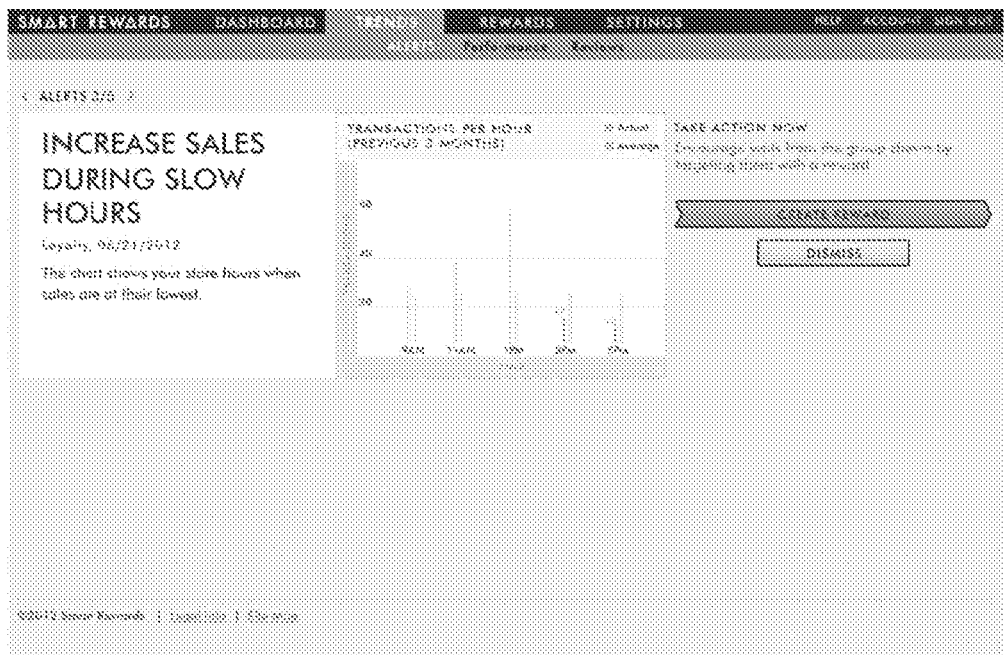
Figure 23C:
Figure 24:
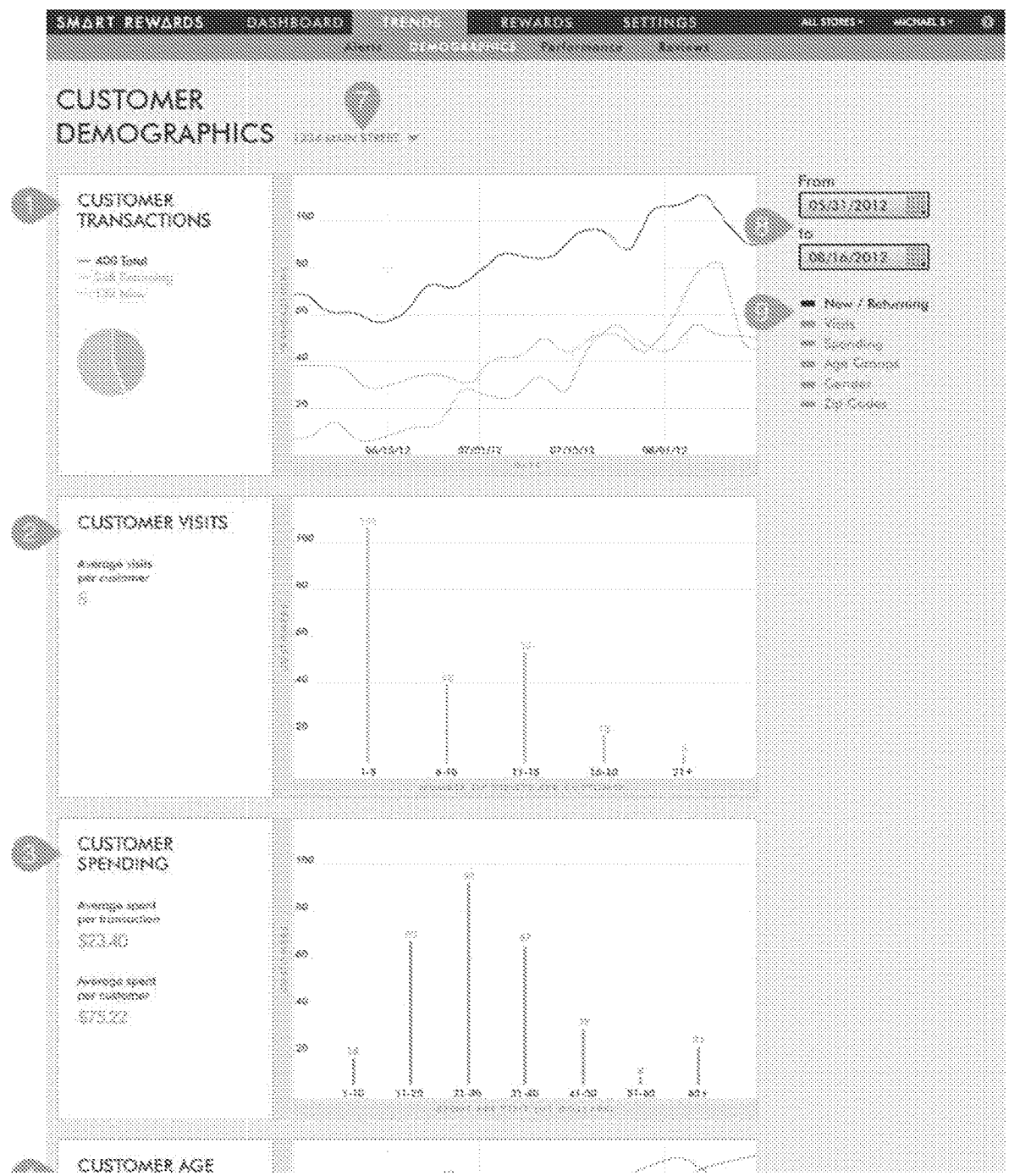
Figure 25:
Figure 26:
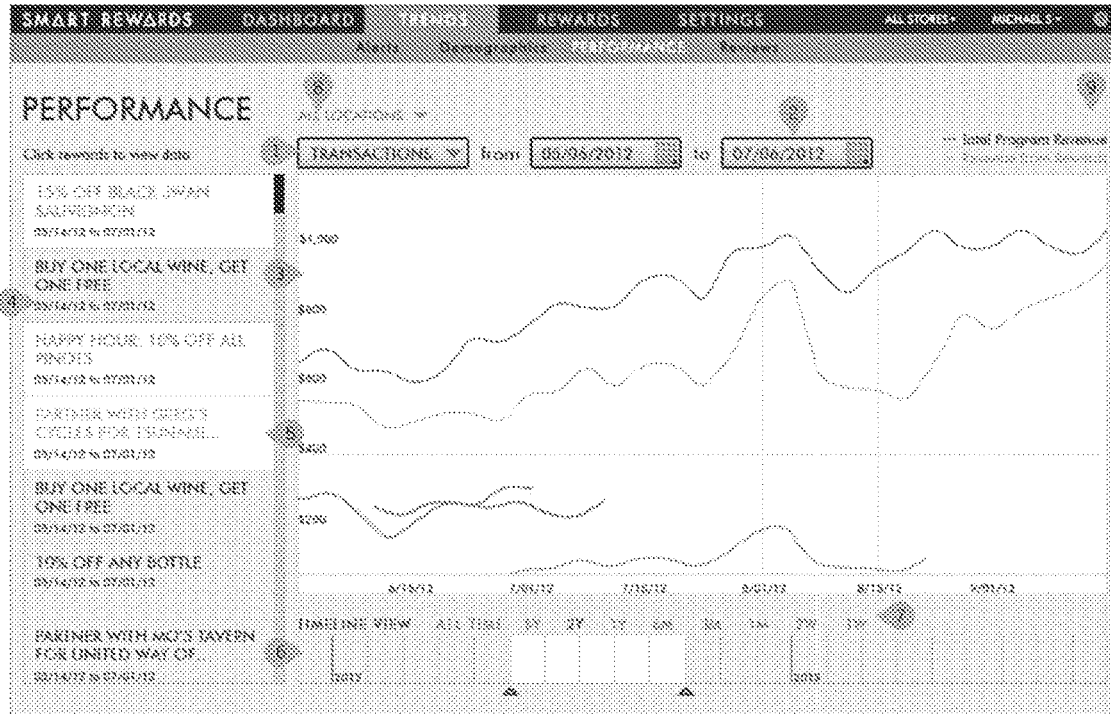
Figure 27:
Figure 28:
Figure 29:
Figure 30:
Figure 31:
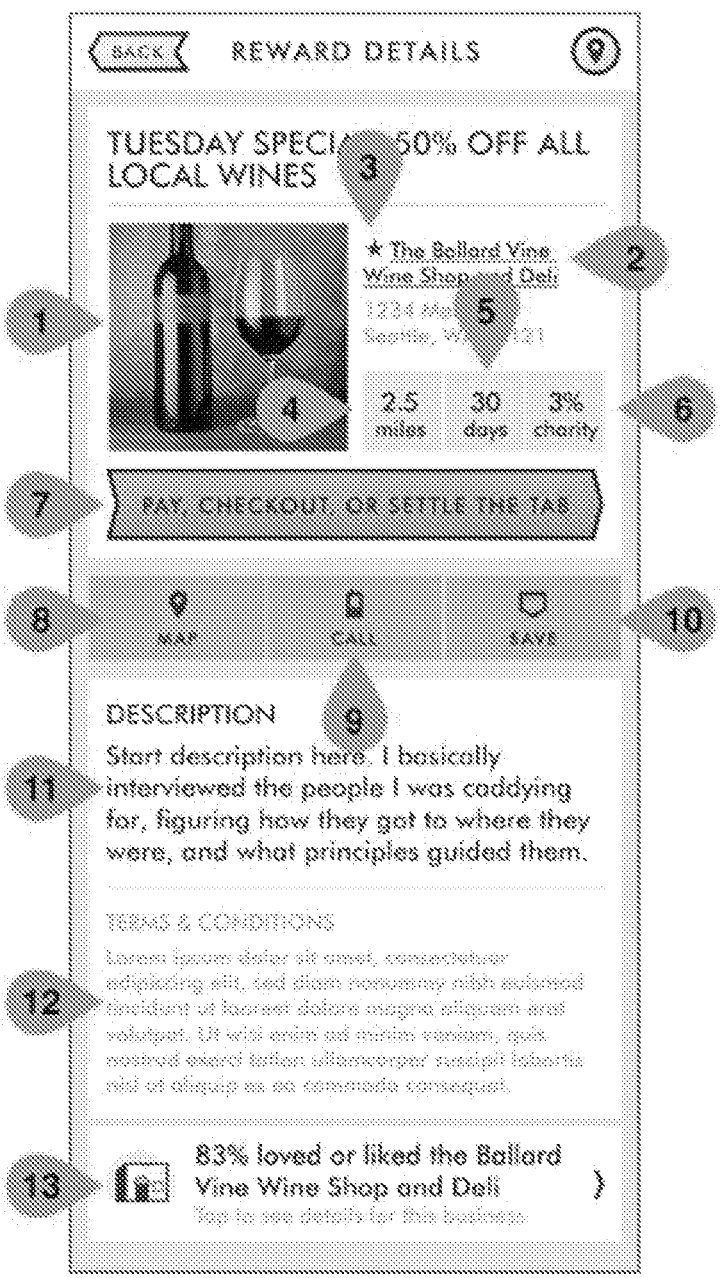
Figure 32:
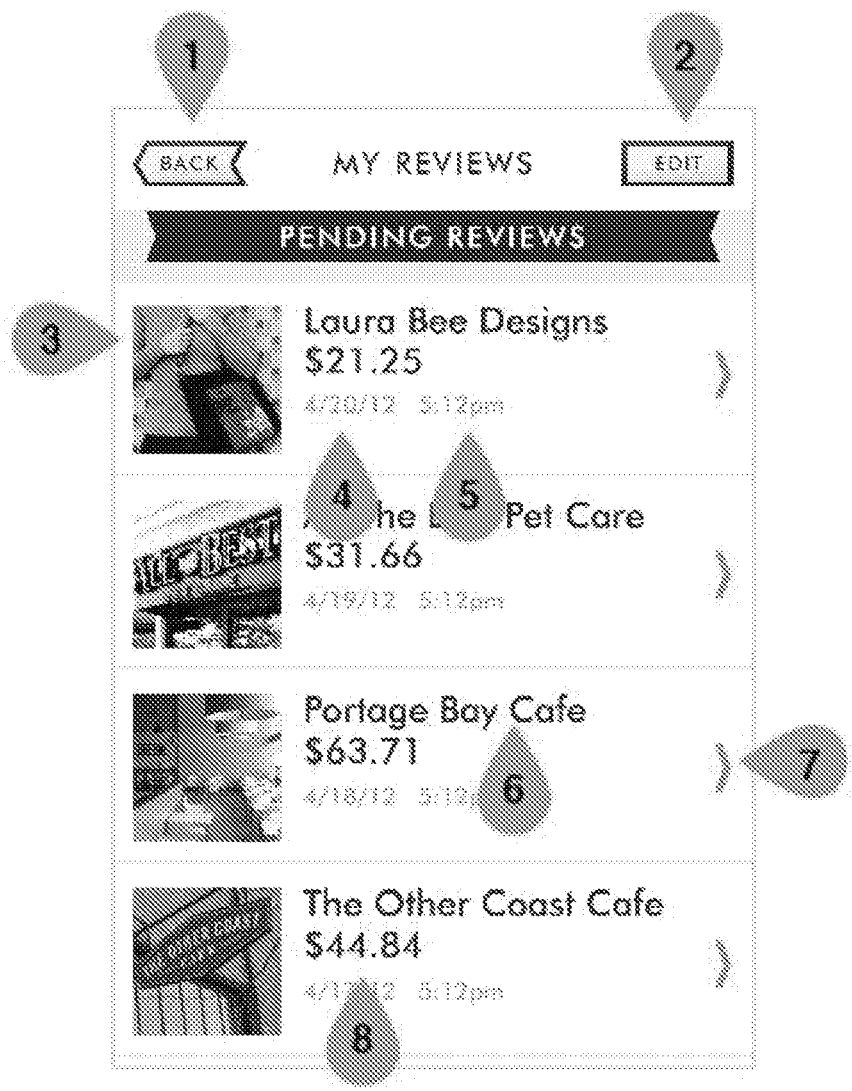
Figure 33:
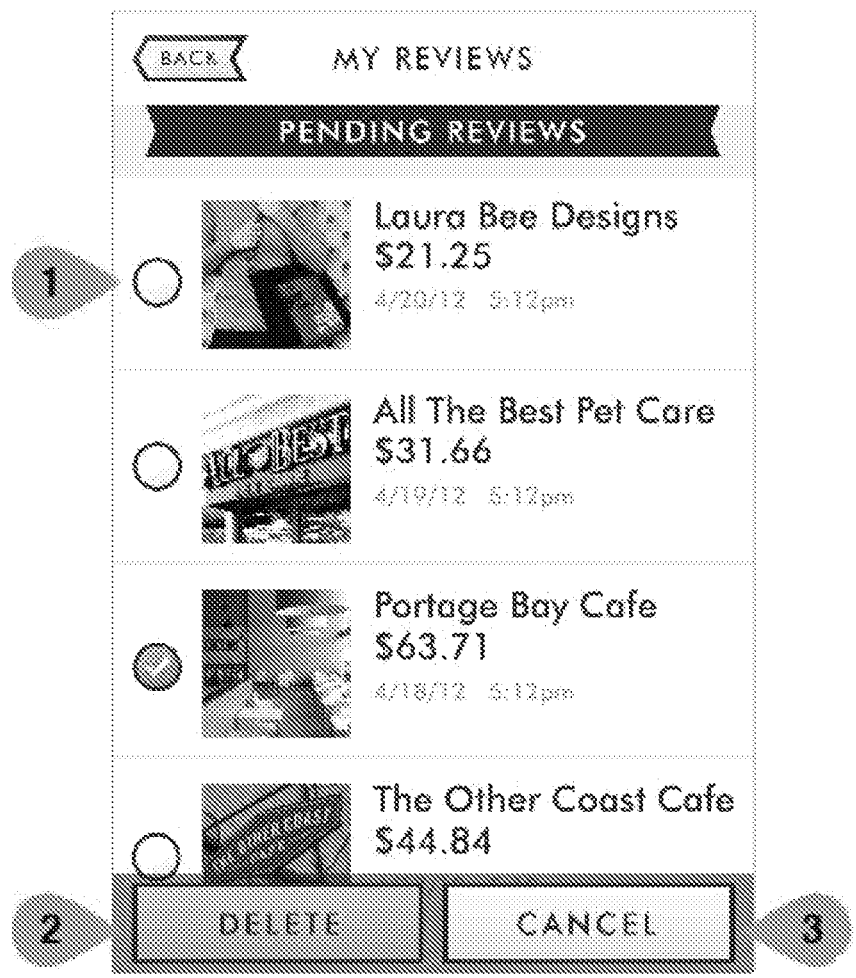
Figure 34:
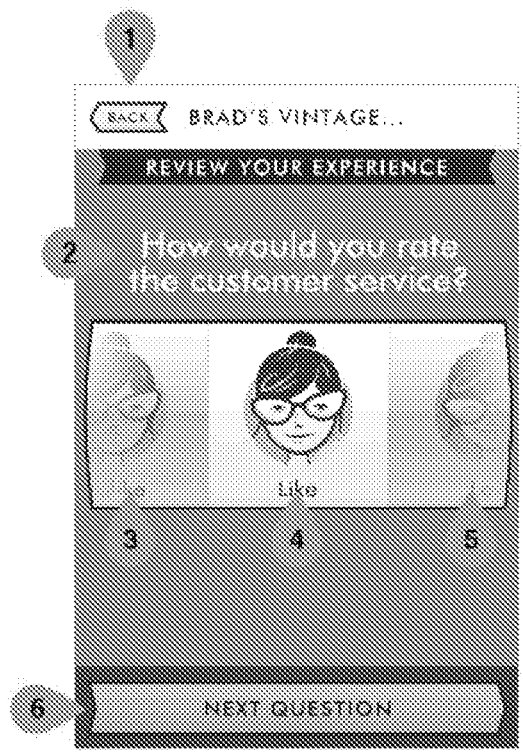
Figure 35:
Figure 36:
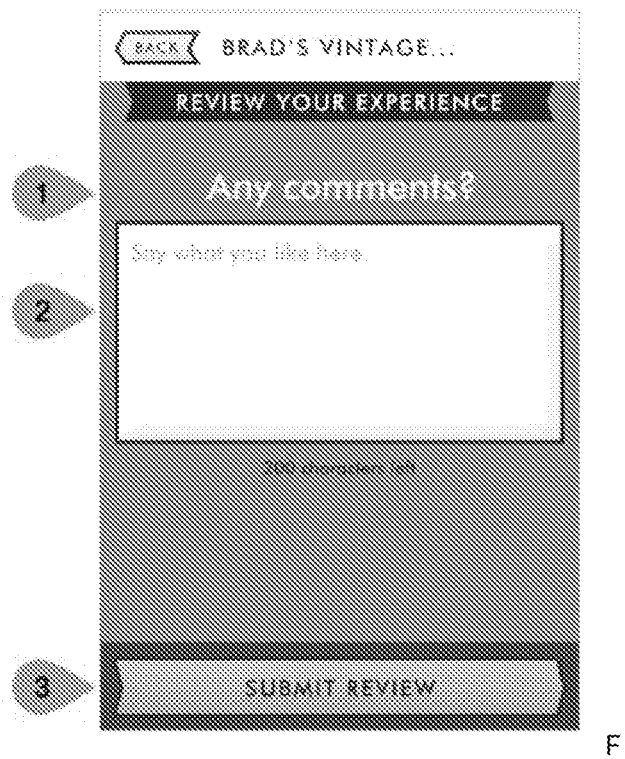
Figure 37:
Figure 38:
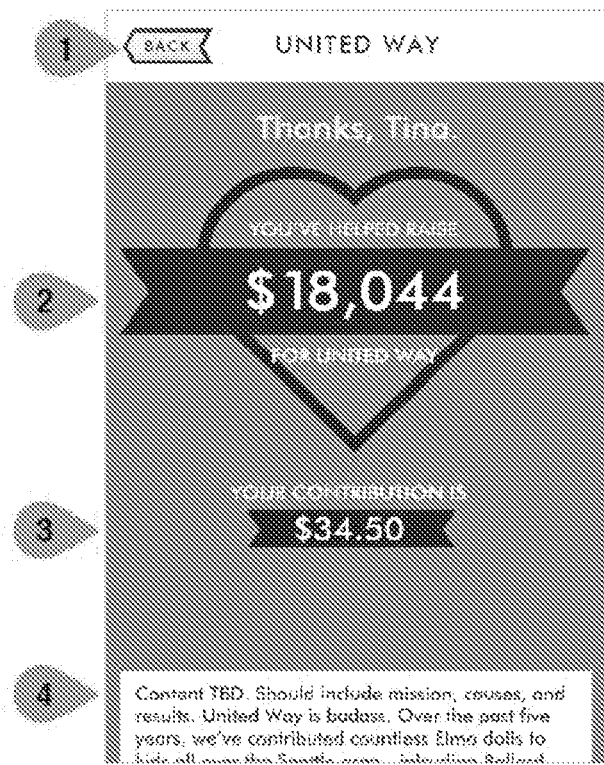
Figure 39:
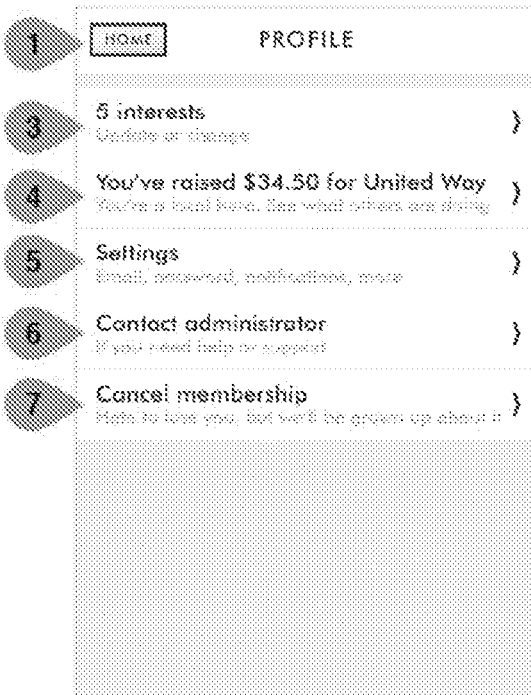
Figure 40:
Figure 41:
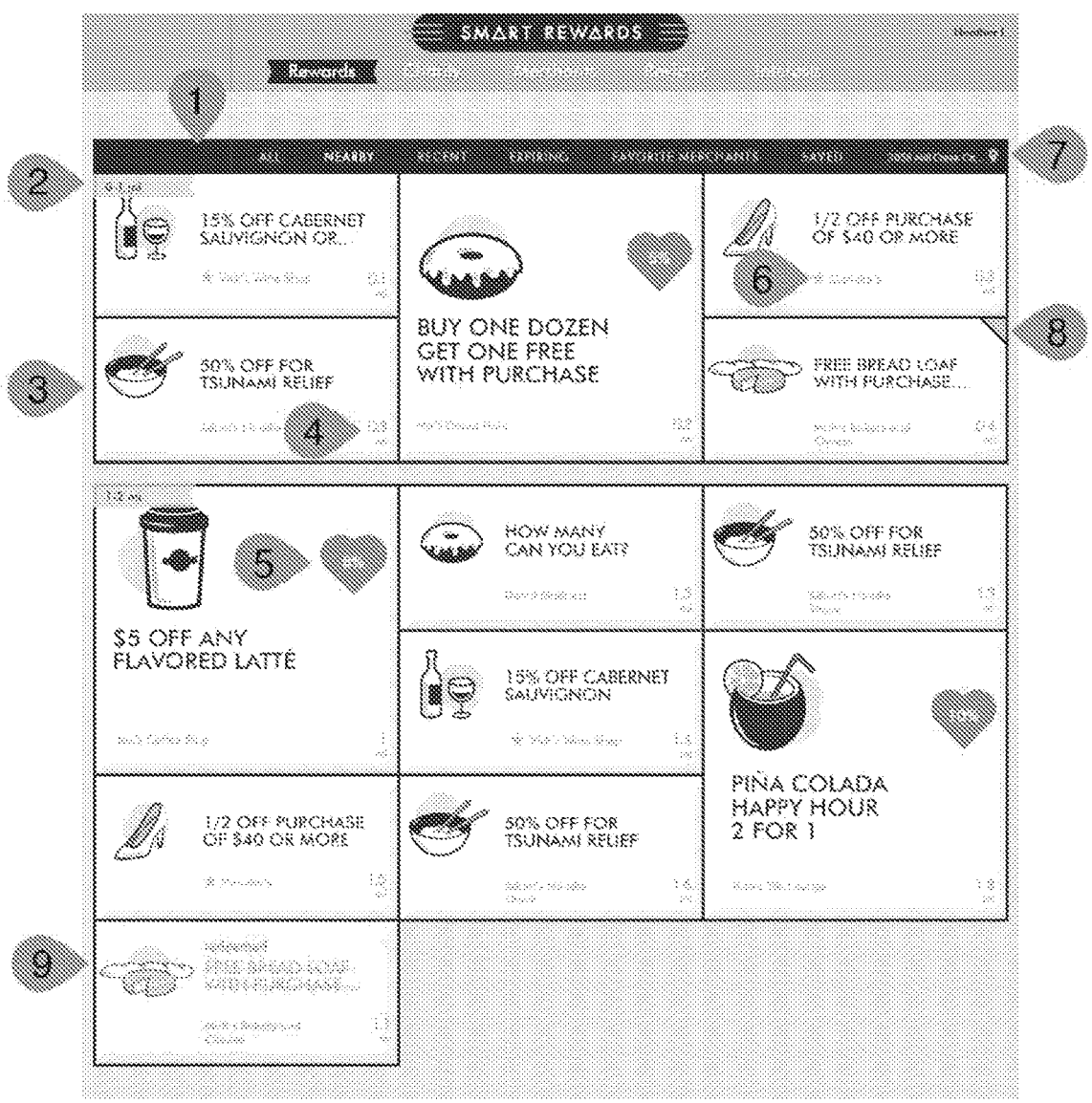
Figure 42:
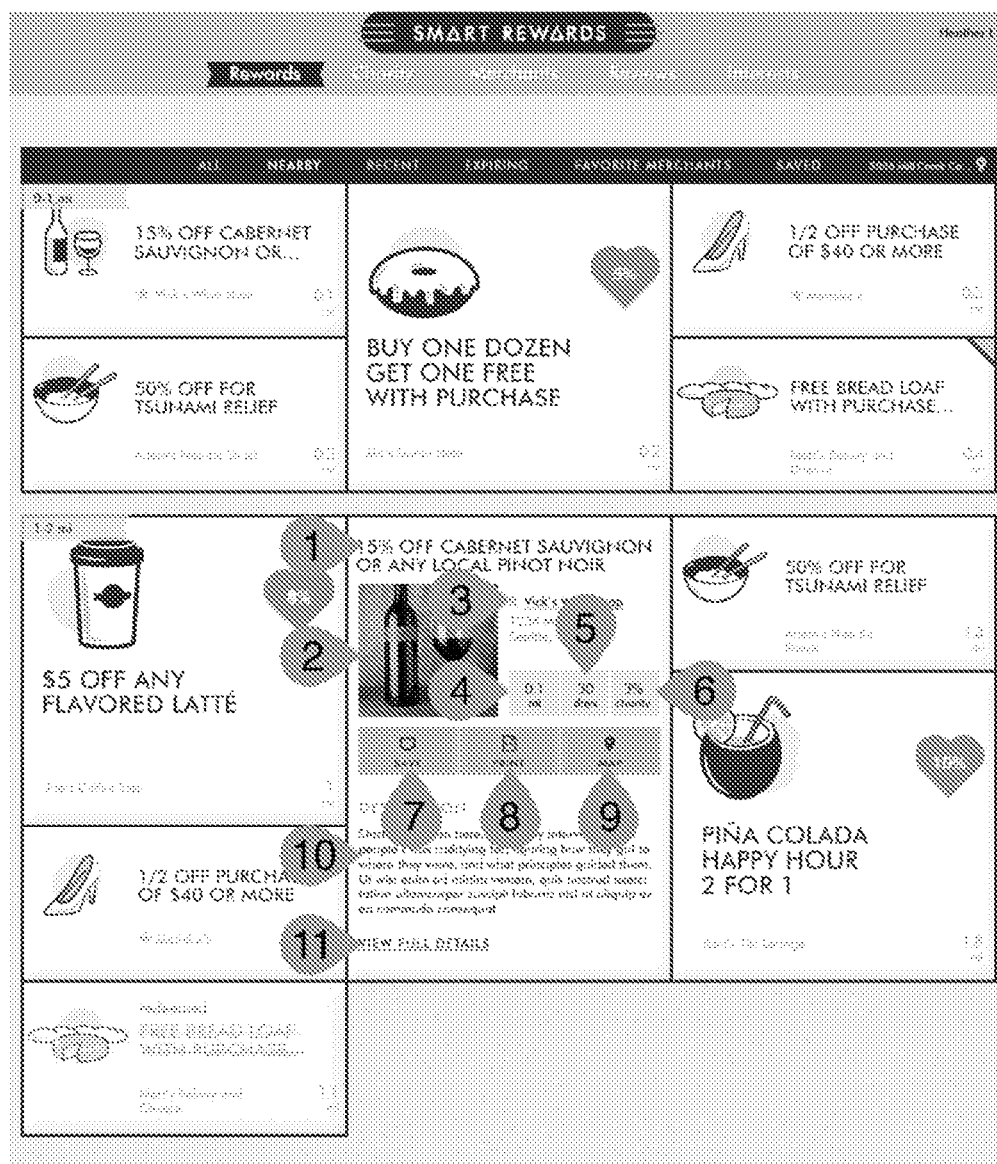
Figure 43:
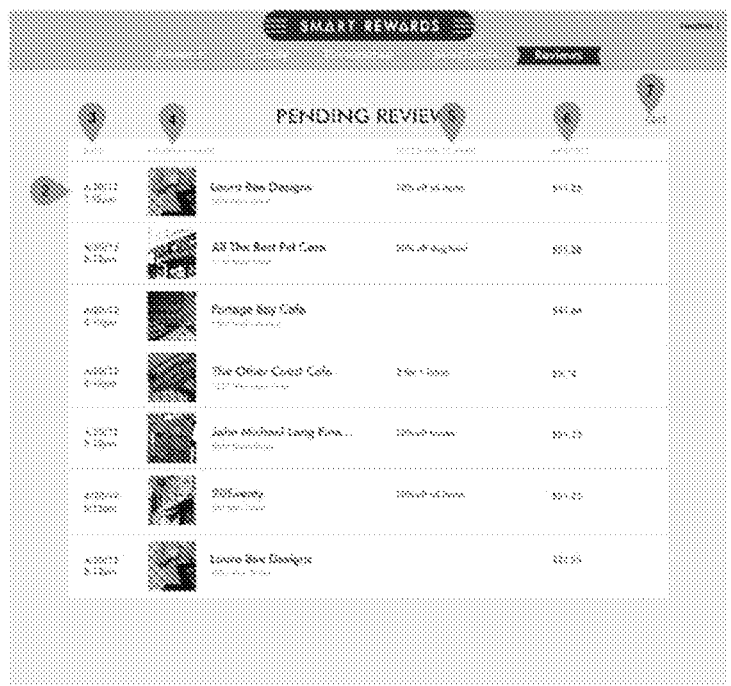
Figure 44:
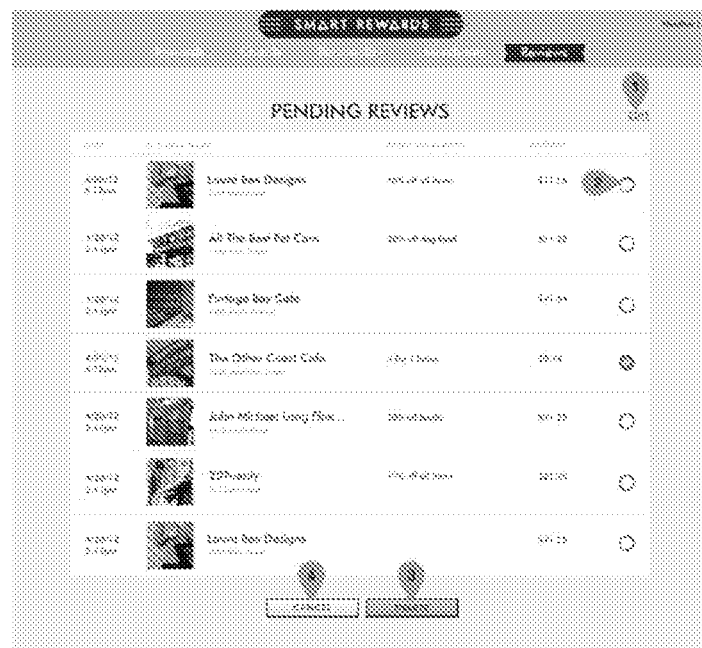
Figure 45:
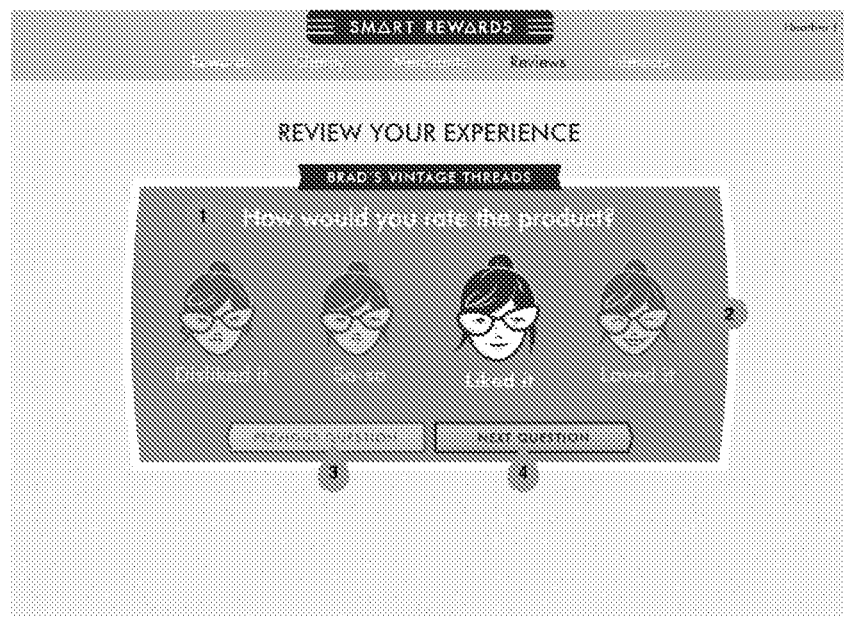
Figure 46:
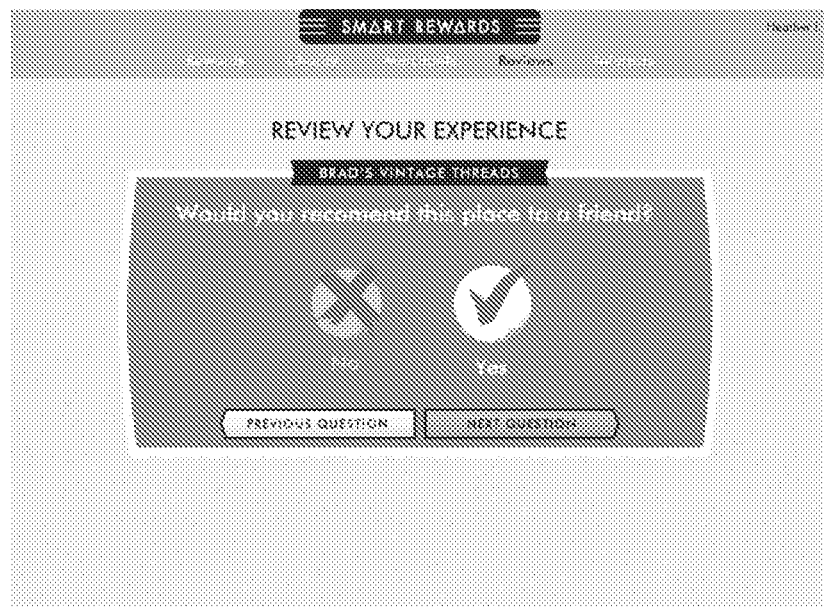
Figure 47:
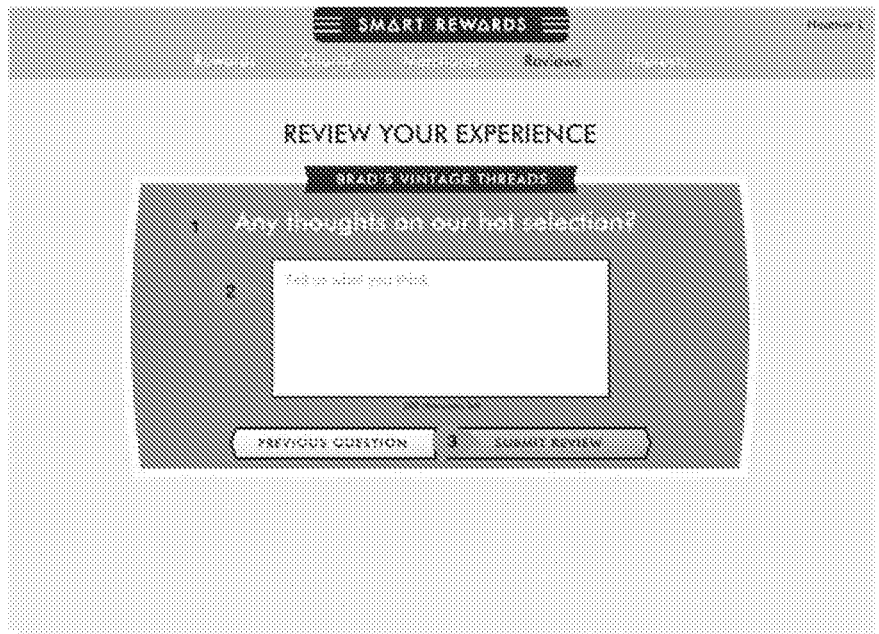
Figure 48:
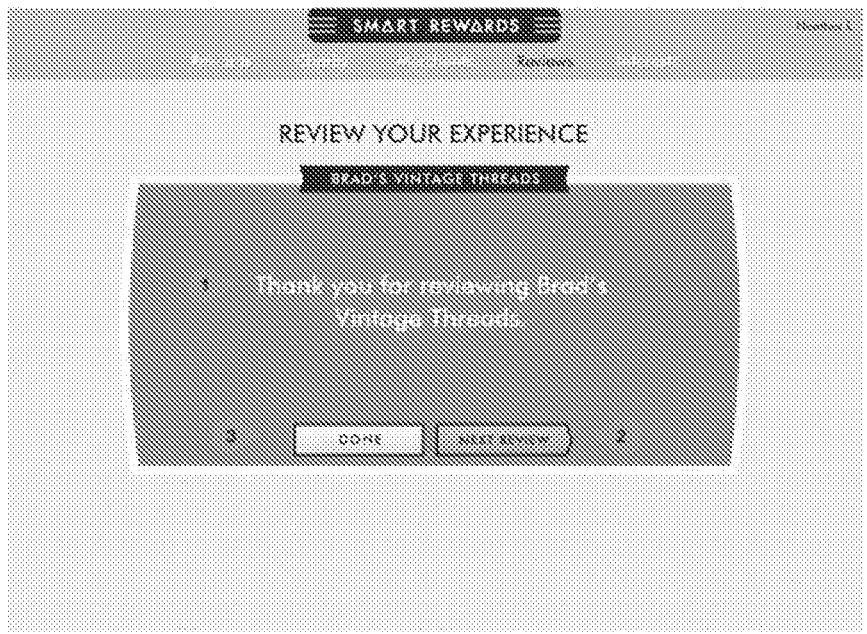
Figure 49:
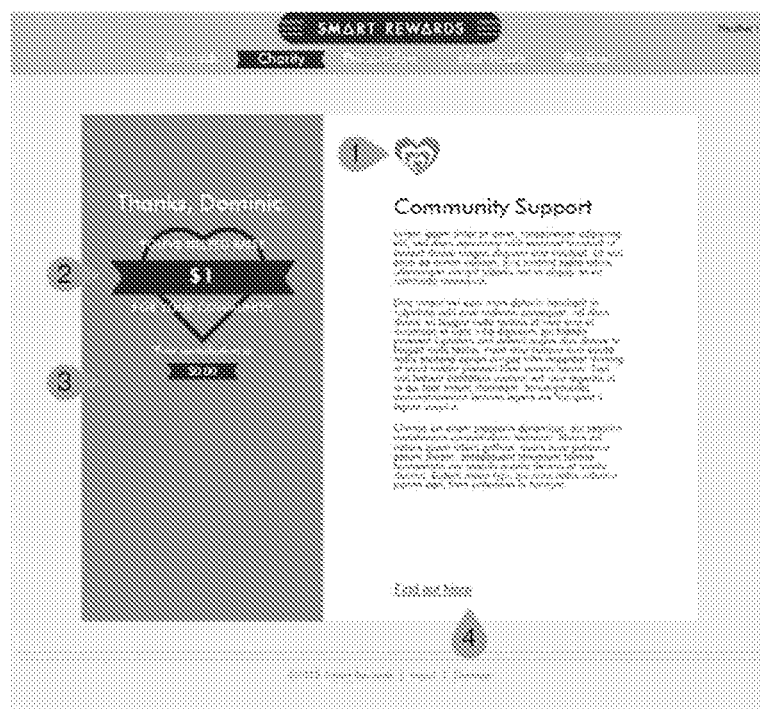
Figure 50:
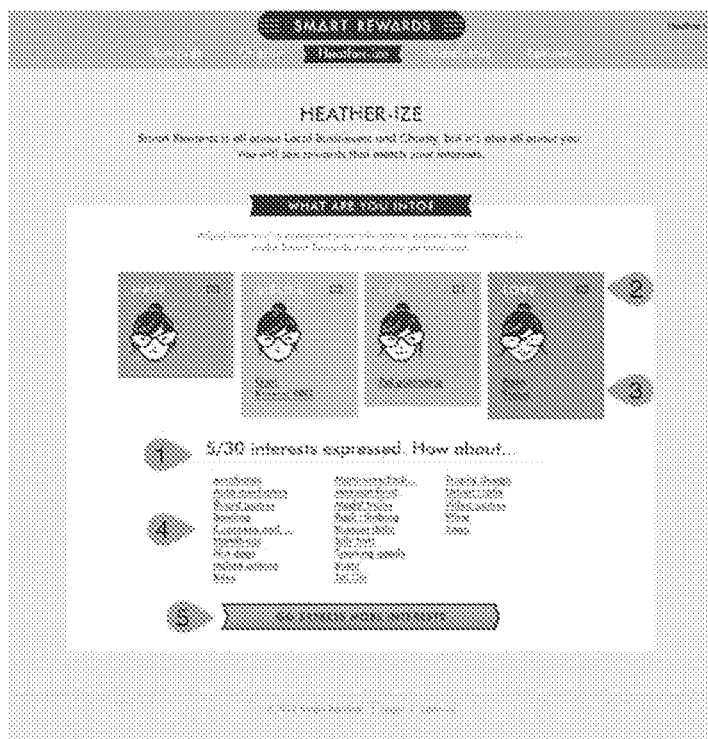
Figure 51:
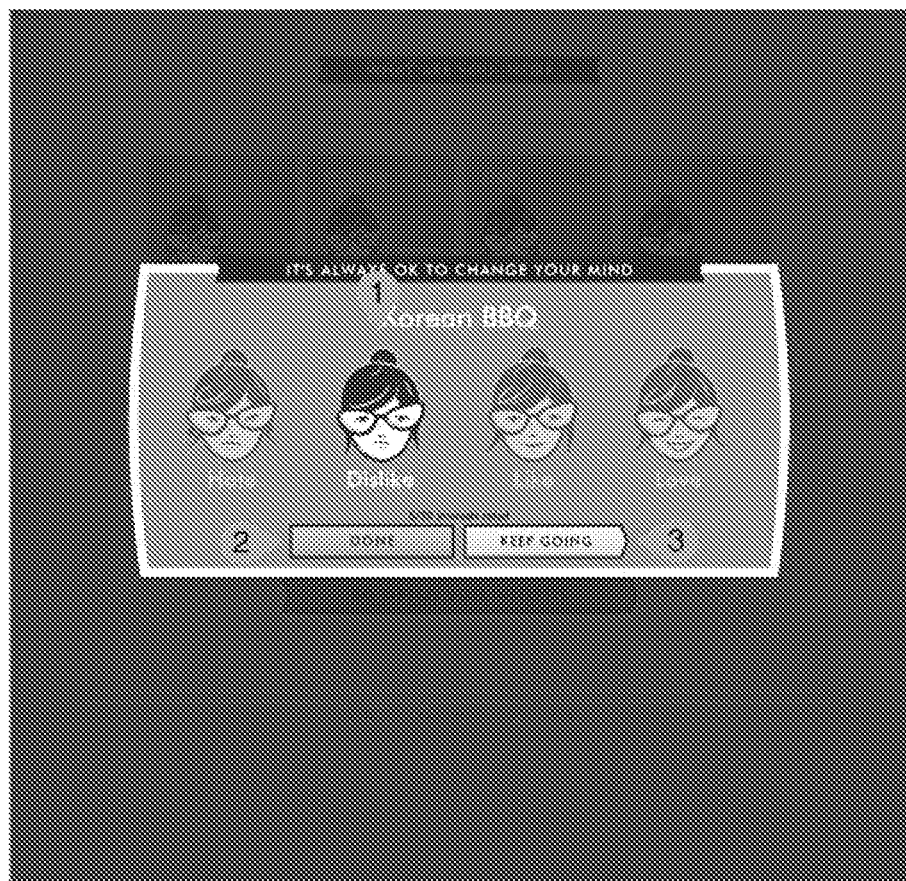
Figure 52:
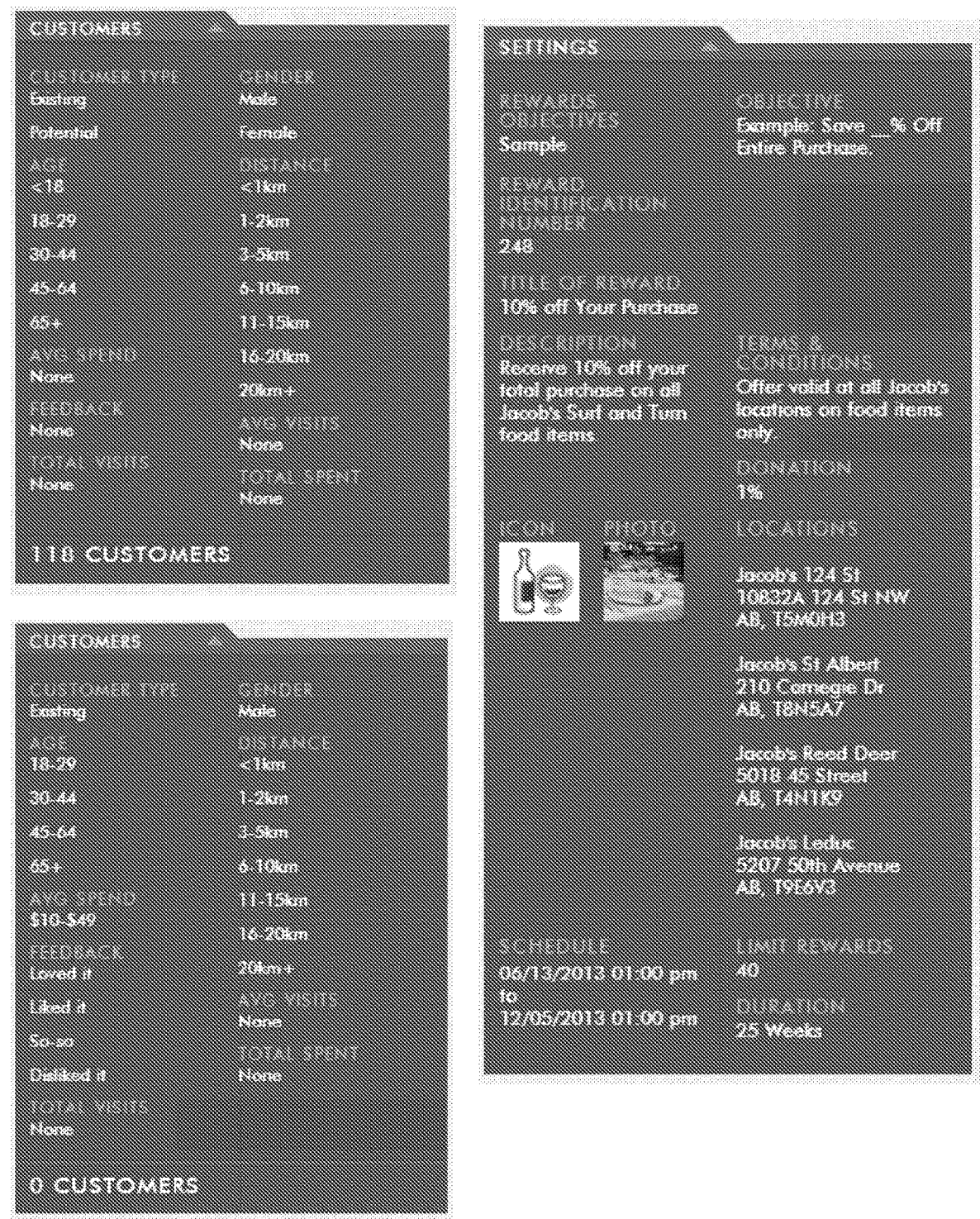
Figure 55:
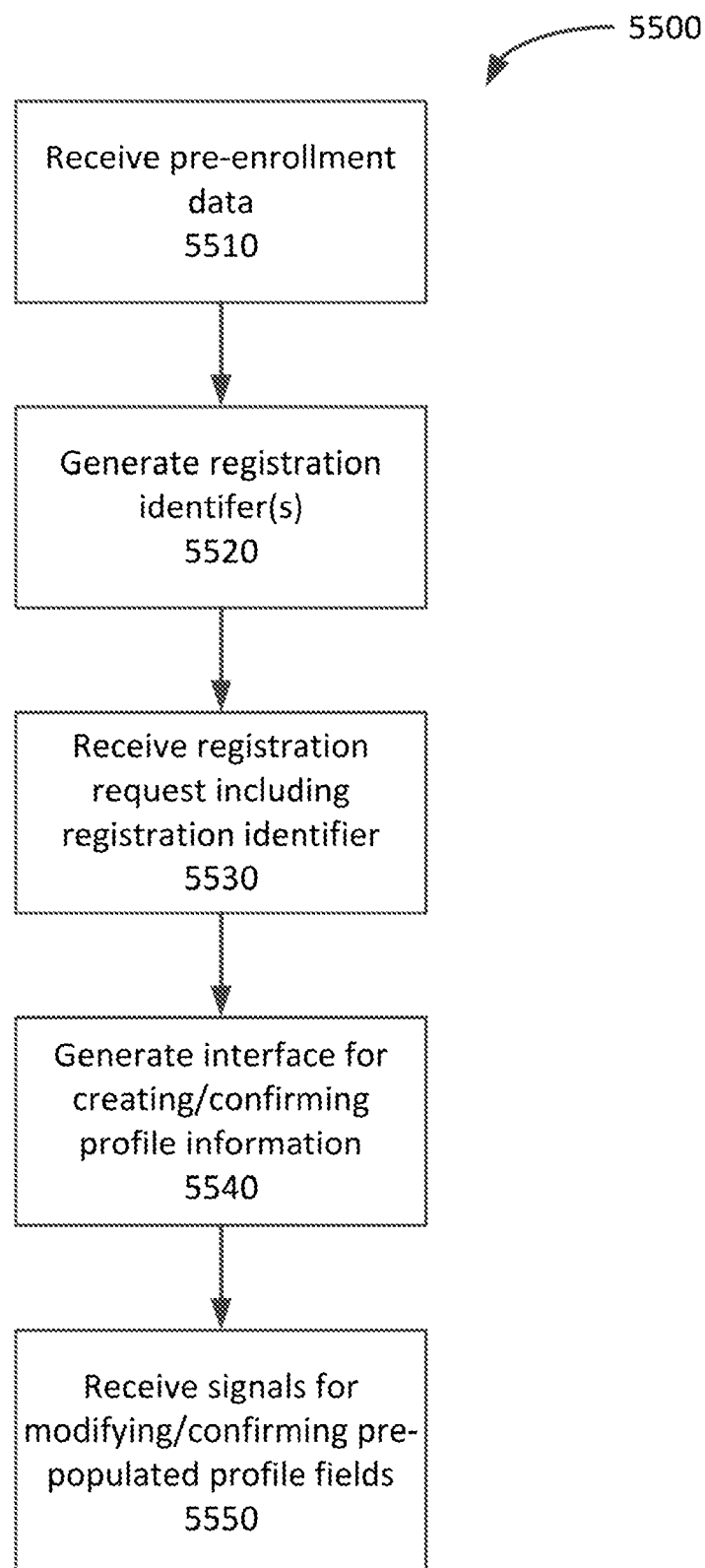
Figure 56:
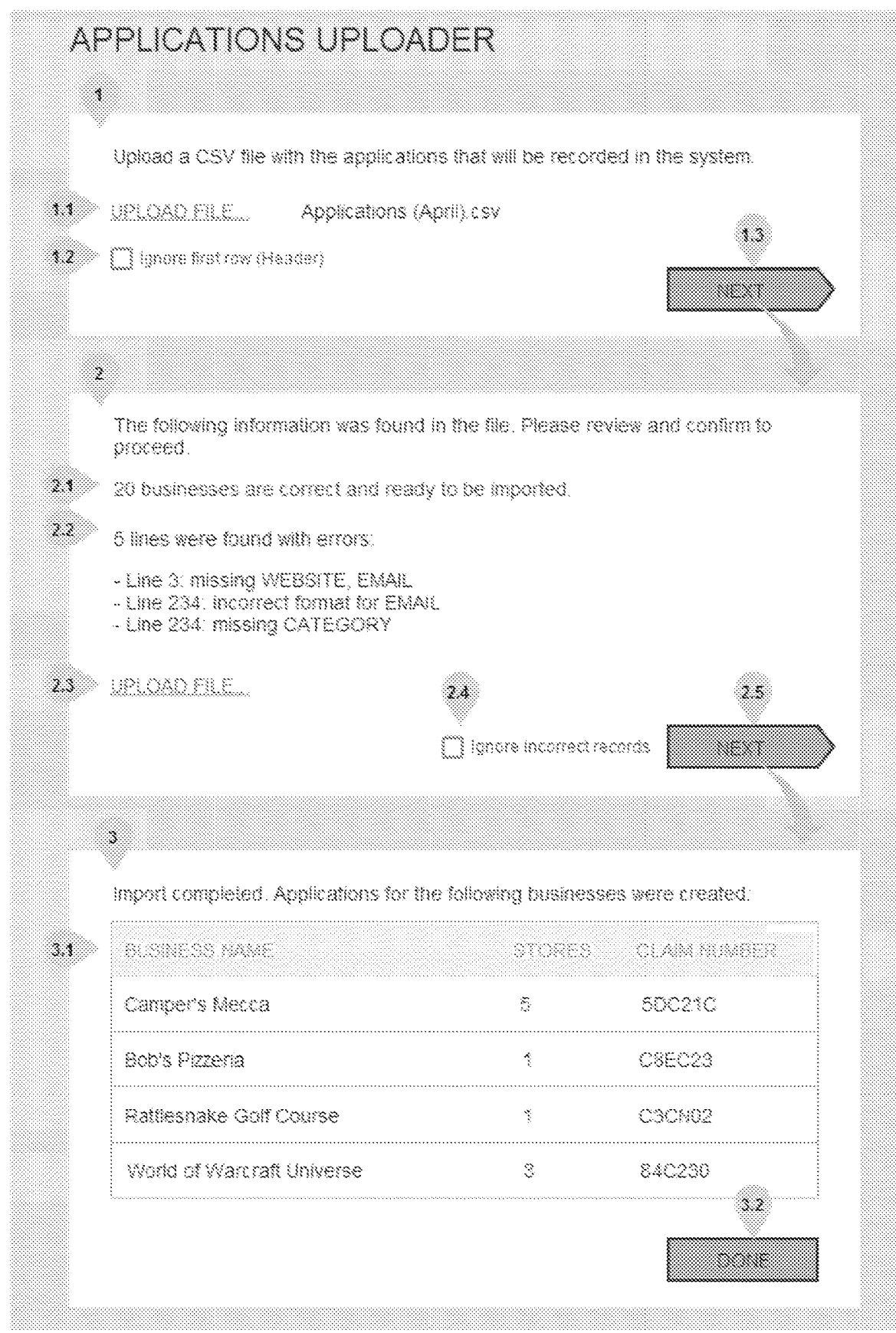
Figure 57:
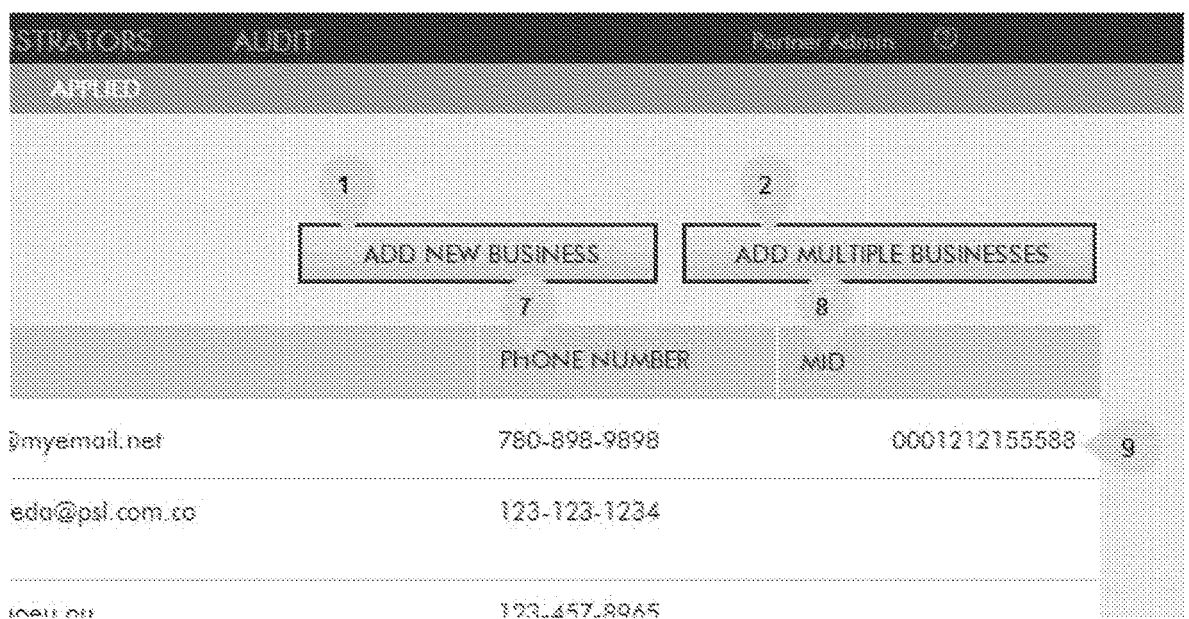
Figure 58:
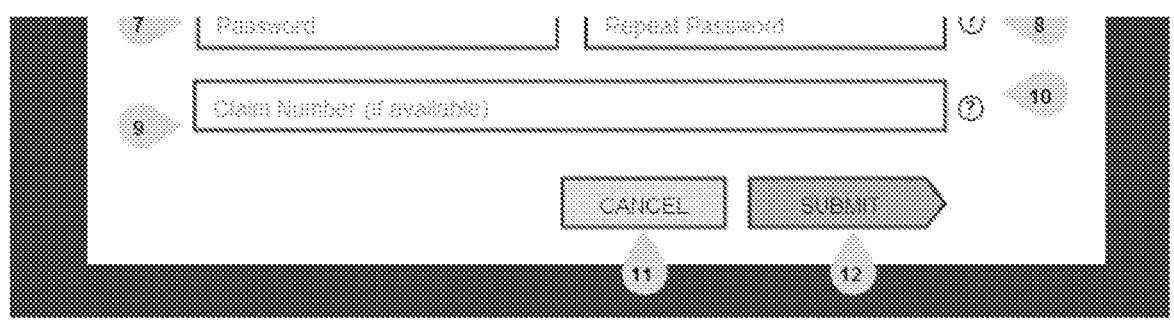
Figure 59:
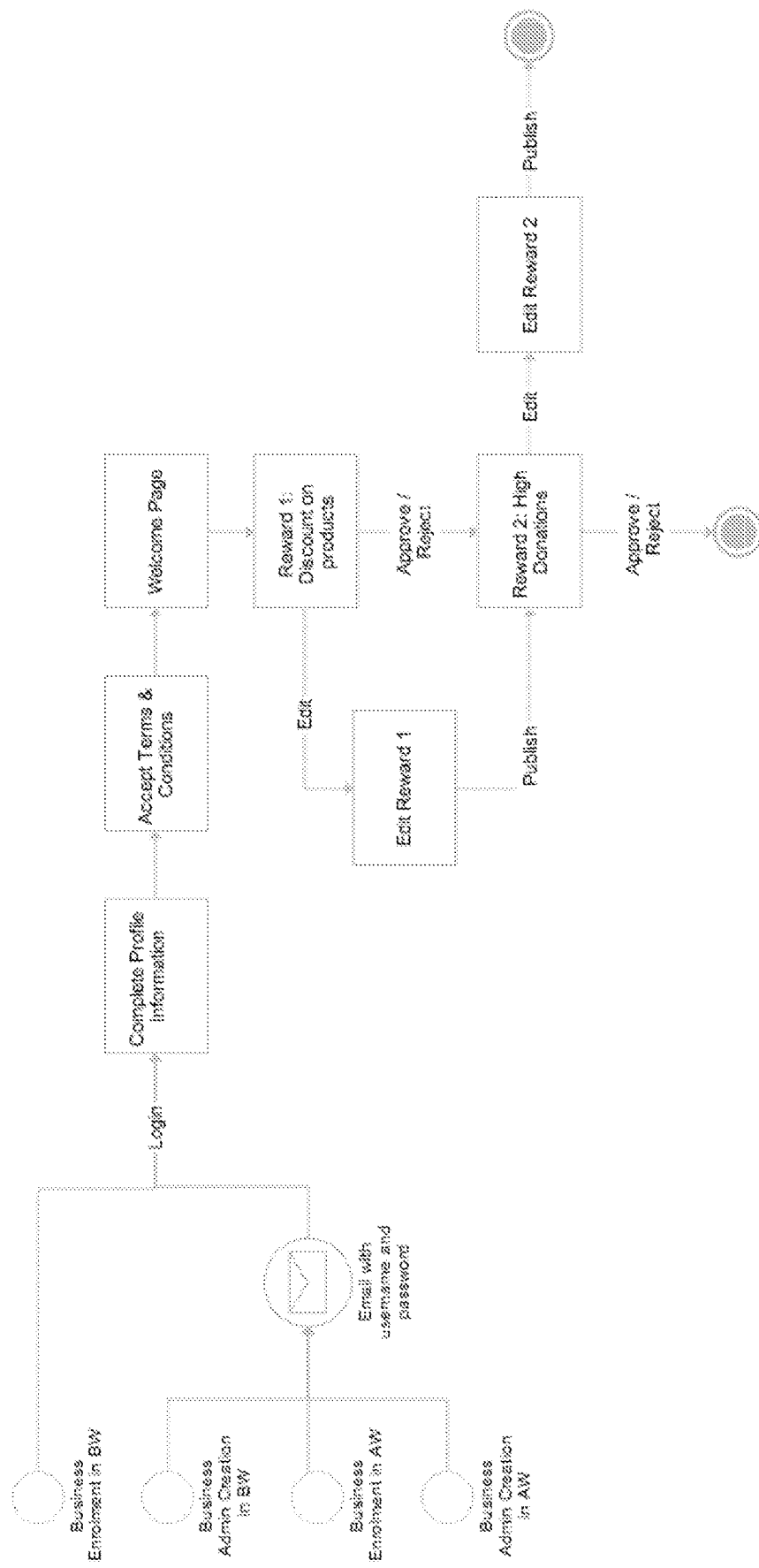
Figure 61:
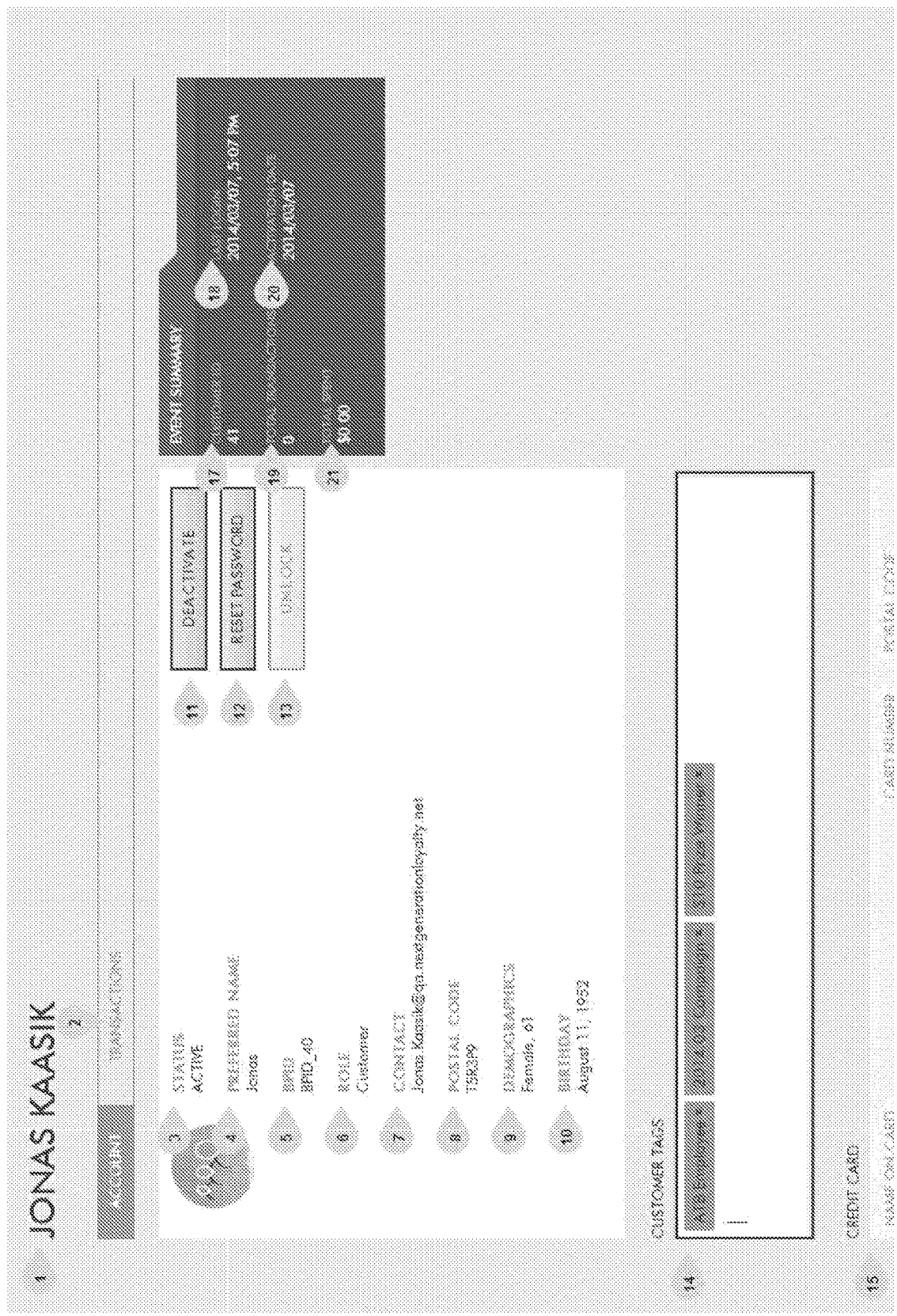
Figure 62:
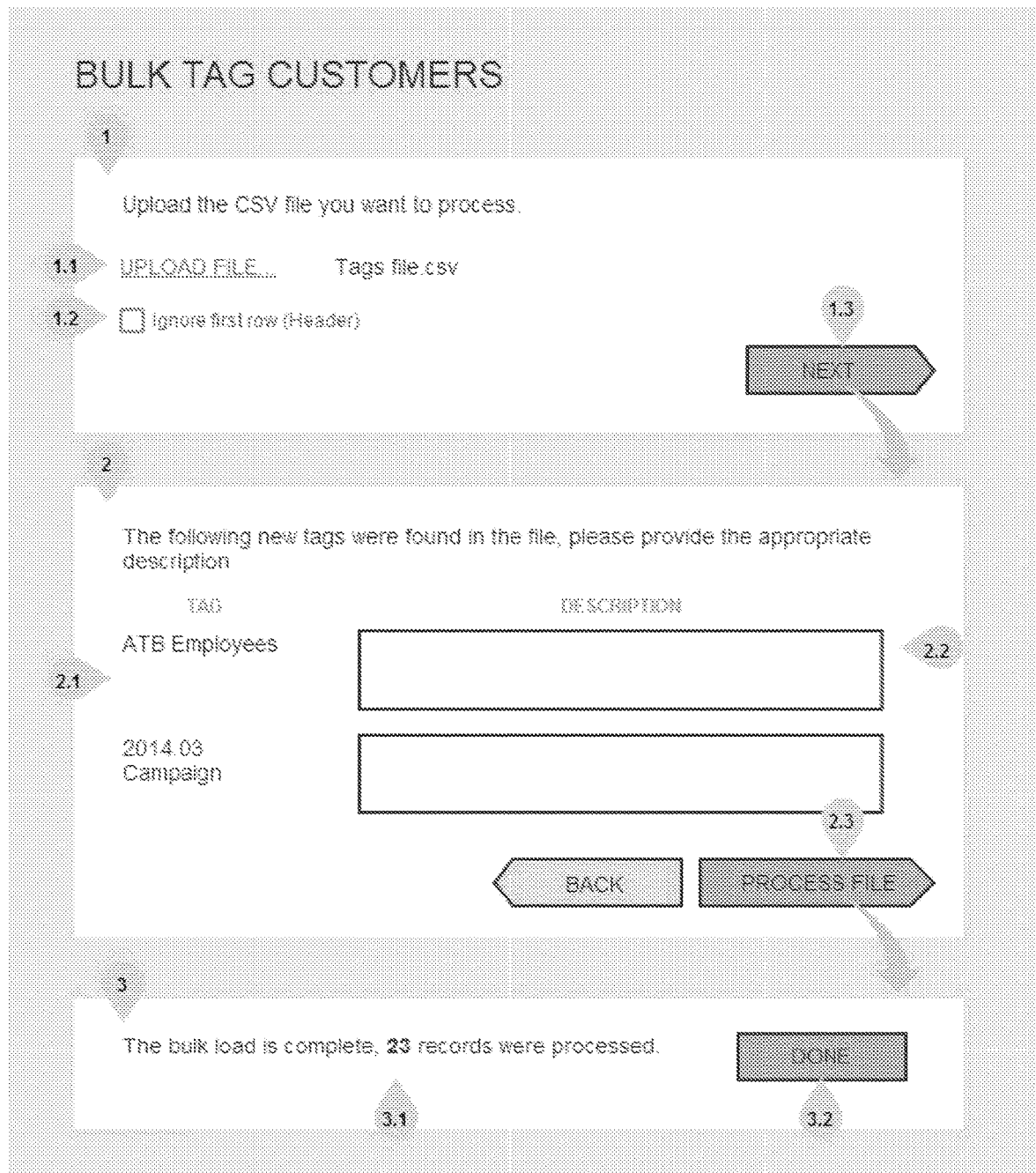
Figure 63A:
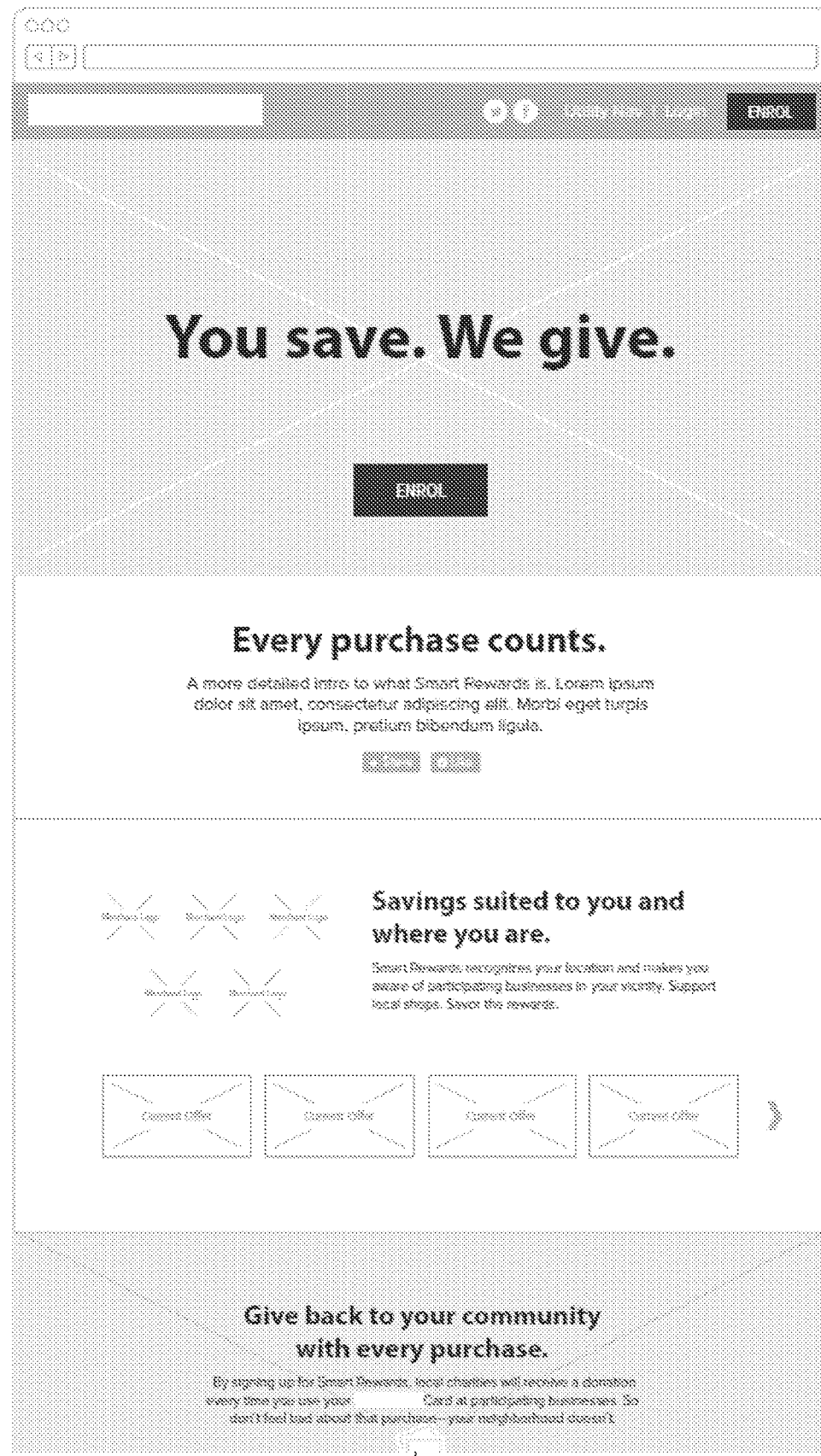
Figure 64A:
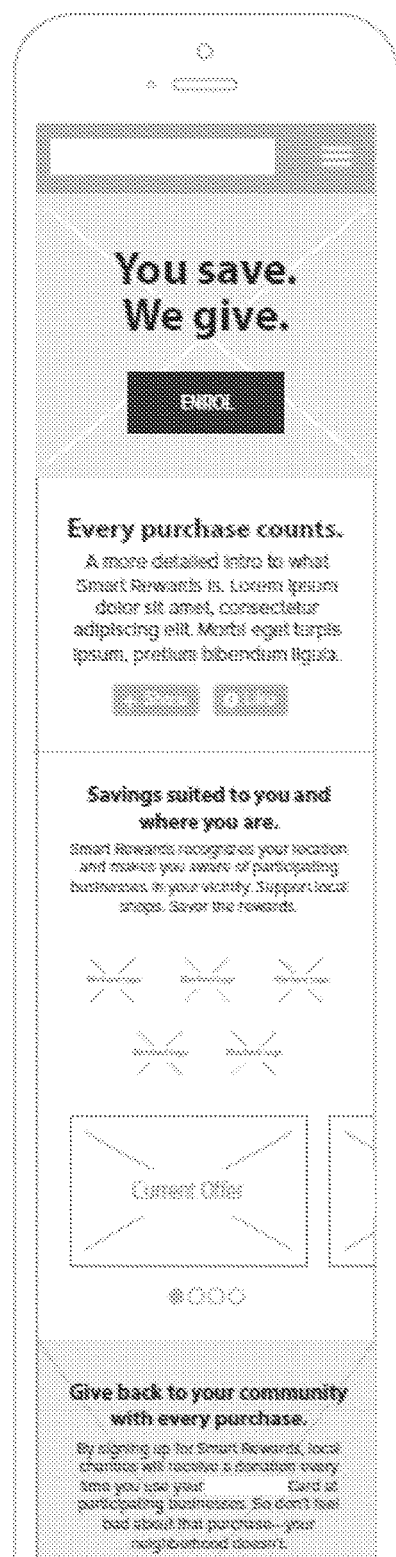

FIG. 14 displays an interface screen for a preview of the custom incentive in accordance with example embodiments;

FIG. 15 displays an interface screen for a preview of the custom incentive in a mobile format in accordance with example embodiments;

FIG. 16 displays an interface screen for a confirmation screen of the custom incentive in accordance with example embodiments;

FIG. 17 displays an interface screen for creating an event driven incentive in accordance with example embodiments;

FIG. 18 displays an interface screen for creating an event driven incentive with the objective of addressing negative feedback in accordance with example embodiments;

FIG. 19 displays an interface screen for creating an event driven incentive with the objective of rewarding spending in accordance with example embodiments;

FIG. 20 displays an interface screen for creating an event driven incentive with the objective of rewarding frequent visits in accordance with example embodiments;

FIG. 21 displays an interface screen for creating an incentive from a sample in accordance with example embodiments;

Figure 22A:
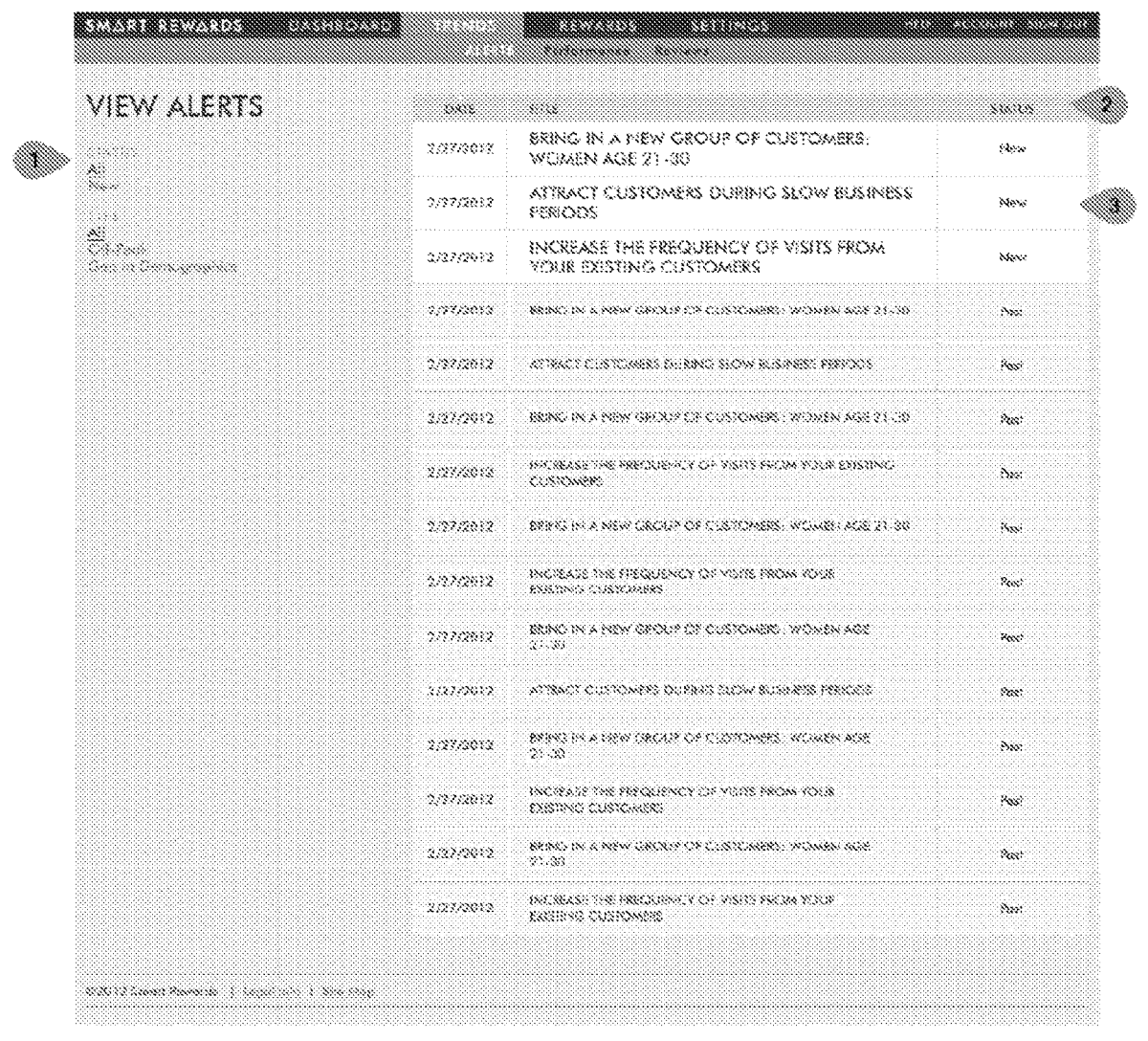

FIGS. 22A, 22B provide an interface screen with example alerts in accordance with example embodiments;

FIGS. 23A, 23B, 23C provide an interface screen with further example alerts in accordance with example embodiments;

FIGS. 24 and 25 provides an interface screen with customer demographics trends in accordance with example embodiments;

FIG. 26 provides an interface screen with customer performance trends in accordance with example embodiments;

FIGS. 27 and 28 provide an interface screen with a performance reward hover mechanism in accordance with example embodiments;

FIG. 29 illustrates an example interface for display on cardholder device in accordance with example embodiments;

FIG. 30 illustrates an example interface for display on cardholder device in a default view in accordance with example embodiments;

FIG. 31 illustrates an example interface for display on cardholder device in an expanded reward view in accordance with example embodiments;

FIG. 32 illustrates an example interface for display on cardholder device in an survey review view in accordance with example embodiments;

FIG. 33 illustrates an example interface for display on cardholder device in an remove survey items view in accordance with example embodiments;

FIG. 34 illustrates an example interface for display on cardholder device in rating questions view in accordance with example embodiments;

FIG. 35 illustrates an example interface for display on cardholder device to ask a survey question in accordance with example embodiments;

FIG. 36 illustrates another example interface for display on a cardholder device to ask a survey question in accordance with example embodiments;

FIG. 37 illustrates another example interface for display on a cardholder device to is response to receiving a survey or review in accordance with example embodiments;

FIG. 38 illustrates an example interface for display on a cardholder device to provide an aggregated view of donations in accordance with example embodiments;

FIG. 39 illustrates an example interface for display on a cardholder device to provide an Interest Indicator in accordance with example embodiments;

FIG. 40 illustrates an example interface for display on a cardholder device to provide an interest question in accordance with example embodiments;

FIG. 41 illustrates an example interface for display on a cardholder device to provide an overview of rewards in accordance with example embodiments;

FIG. 42 illustrates an example interface for display on a cardholder device to provide an overview of rewards in an expanded view in accordance with example embodiments;

FIG. 43 illustrates an example interface for display on a cardholder device to provide a transaction feedback survey in accordance with example embodiments;

FIG. 44 illustrates an example interface for display on a cardholder device to remove survey items in accordance with example embodiments;

FIG. 45 illustrates an example interface for display on a cardholder device to provide survey rating questions in accordance with example embodiments;

FIG. 46 illustrates another example interface for display on a cardholder device to provide survey rating questions in accordance with example embodiments;

FIG. 47 illustrates an example interface for display on a cardholder device to provide a review field in accordance with example embodiments;

FIG. 48 illustrates an example interface for display on a cardholder device to display when a review is complete in accordance with example embodiments;

FIG. 49 illustrates an example interface for display on a cardholder device to provide information regarding a charity and a donation in accordance with example embodiments;

FIG. 50 illustrates an example interface for display on a cardholder device to provide a list of Interest Questions in accordance with example embodiments;

FIG. 51 illustrates an example interface for display on a cardholder device to provide an Interest Question in accordance with example embodiments;

FIG. 52 illustrates example demographics summary panes and a settings summary pane in accordance with example embodiments;

FIGS. 53, 53A, 54 and 54A illustrate flow diagrams for creating a reward or incentive in accordance with example embodiments;

FIG. 55 illustrates a flowchart diagram of an example method for loyalty systems in accordance with example embodiments;

FIGS. 56, 57, and 58 illustrate at least portions of example interface screens in accordance with example embodiments;

FIG. 59 illustrates an example flowchart diagram in accordance with example embodiments;

FIGS. 60, 61, and 62 illustrate at least portions of example interface screens in accordance with example embodiments; and FIGS. 63A, 63B, 64A and 64B illustrate at least portions of example interface templates in accordance with example embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

DESCRIPTION OF VARIOUS EMBODIMENTS

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The extent to which merchants are willing to provide benefits, incentives, and rewards to cardholders in the context of a loyalty program is enhanced if means is provided to enable merchants to verify the commercial benefit derived by the merchants, and means are provided to tailor the benefits to particular cardholders based on cardholder preferences, spending habits, and the like. Benefits to cardholders may be increased, with resulting benefits to card issuers, if the merchants are given in accordance with embodiments described herein the tools to measure and monitor the effectiveness and incremental cost of their activities involving benefits to cardholders. There is a need for a method, system and computer program that enables merchants to monitor and verify the commercial benefit that they are deriving from benefits being provided to cardholders who are members of the a loyalty program, thereby encouraging the merchants to increase the level of benefits that they provide.

Systems and methods described herein may recommend incentives for merchants based on data mining and analysis of cardholder or member data collected by card issuers, for example. Systems and methods described herein may provide incentive performance indicators for merchants to discover trends in performance and monitor the impact of incentives.

Systems and methods described herein may provide systems and methods for providing alerts for a loyalty program provided by a loyalty system. The method may involve receiving (via a computer hardware input interface) transaction data comprising one or more cardholder attributes from cardholder data collected by one or more card issuers, identifying a merchant, identifying (via an alert engine provided by a persistent store) one or more events or trends by applying rules to the transaction data, and generating an alert notification for the merchant based on the one or more events or trends.

The cardholder attributes may include demographics, and the trends may be based on the demographics. The trend triggering the alert may relate to a slow period for the merchant (e.g. a time of day, a day of week), a gap in demographics for the merchant, a high spending threshold, a high number of visits threshold, and so on.

The alert may include a recommended incentive linked to the trend or event.

Systems and methods of embodiments described herein may enable creation or generation of incentives for a loyalty program provided by a loyalty system, wherein the loyalty program provides the incentives to cardholders (e.g. customers, members) in connection with transactions between the cardholders and one or more merchants associated with the loyalty system.

Systems and methods described herein may provide a merchant interface for management of incentive programs, for review of incentive performance indicators, and for managing alerts based on trends and events. Systems and methods described herein may provide dynamic and iterative incentive planning tools and workflows to obtain decision support in building incentives, such as recommendations of incentives, alerts, target cardholders, and the associated transactions. Systems and methods described herein may enable monitoring of the impact of incentives, in order to calibrate incentive attributes. Systems and methods described herein may provide incentive segmenting criteria and allows the user to modify the criteria and immediately and see a refresh of the various components of the "impact" display segments.

Systems and methods described herein may provide effective incentive performance discovery. Systems and methods described herein may identify incentive performance indicators, enable selection of attributes to filter the incentive performance indicators, switch the views of the incentive performance indicators based on the selection to discover trends in performance. The discovered trends may enable a merchant to modify incentive attributes and receive recommendations. The trends may trigger generation of alert notifications for merchants.

Systems and methods described herein may dynamically update data related to incentive performance in real time.

Systems and methods described herein may recommend incentives for merchants using a recommendation engine to assist a merchant in designing and offering incentives. A merchant may specify a "reward objective" and recommendations may be tailored based on the objective. The recommendations may also be based on data regarding different merchants, the number of customers that they have, average spend, purchasing history, demographics, and the like. An analytics engine may compare the merchant profile to performance of a particular type of incentive, consider geographic and demographic trends and so on. The recommendation engine may make more granular incentive recommendations on this basis. Alerts may be generated by the suggestion engine or recommendation engine which may be specific to the merchant's particular context. In some cases, use of collected data may be restricted, such as between competitors in the same geographic area. The recommendation engine can gather these cardholder insights or attributes in one geographic area and allow them to be used in another geographic area.

A recommendation engine may generate reward recommendations based on data relating to merchants. For example, recommendation engine may suggest the most relevant/effective rewards for a business or customer based on sales patterns, historical reward performance/redemptions, cardholder demographics/interests, and so on.

An alert may be associated with a trigger defining a business rule or threshold. An alert engine may mine the system data to determine whether a trigger is met and generates the associated alert. The business rules and thresholds for alert triggers may be default values or may be user configurable.

Systems and methods described herein may enable discovery of relationships between revenue, transactions, merchant, and cardholders. These relationships may be referred to as trends.

Systems and methods described herein may suggest a relevant incentive objective and based on the objective may suggest or recommend a particular segment of customers or cardholders to target. Optionally further suggestions for particular incentive attributes for targeting that segment based on performance of that attribute may be provided. Systems and methods described herein may consider interests of the targeted segment in that attribute (e.g. an interest profile may be determined up front and/or through customer feedback through the platform).

Systems and methods described herein may match redemptions to incentives. This may reduce the overhead associated with the platform.

Systems and methods described herein may provide an interface for cardholders to management their incentives, preferences, and attributes. Systems and methods described herein may provide a cardholder interface displaying functional tiles representing incentives in various combinations. There may be dynamic variance of tile size based on different dimensions of incentive relevance to the particular cardholder. Systems and methods described herein may perform a balancing between wanting to show relevant offers, and also offering the chance to cardholders to see new incentives that they may not have selected before so they can expand their understanding of what they consider to be of interest to them. The selections may result in an update to the interest profile for the cardholder. Previously redeemed incentives may also be displayed. This may serve as a reminder to the cardholder and may be engaging as this information demonstrates the relevance of the platform to the cardholder.

Systems and methods described herein may provide donations as an incentive or as part of incentive to an organization selected by the cardholder, merchant, card issuer, and the like. The pooled results of multiple incentives may provide community donations or "social network fundraising". The tile interface may be updated in real time and may track where members of a cardholder's social network are transacting, the types of incentives they are receiving, and, optionally, the community donation impact that results. This may provide strong motivation to other members of the same group to mimic the behavior of members of their social network. The tile interface may update in real-time to display the impact of a group, including based on different selected time periods.

Systems and methods described herein may include a semantic layer that analyzes feedback/comments received from cardholders automatically, and uses this information to automatically update recommendation engine functions and incentive performance information. A cascading interest analysis may be used to obtain active feedback by generating a list of related interests for selection by the cardholder. Systems and methods described herein may automatically update the incentive interest profile for the cardholder based on the selected interests. A semantic engine may be used to generate related interest labels.

The framework for an example loyalty system will now be described. A loyalty program may be linked to one or more card issuers, where financial and/or loyalty cards are provided to members of the loyalty program, referred to as cardholders. The loyalty card may refer to a physical card with an electronic device thereon, an electronic account associated with a member, and the like. The loyalty system is operable to enable the creation, implementation and management of one or more loyalty programs that provide benefits to members of the loyalty programs (e.g. cardholders) in connection with transactions between the members and one or more merchants associated with the loyalty system. One or more card issuers may register on the loyalty system. The operator of the loyalty system, the one or more card issuers, and the merchants may establish the rules for accrual and processing of benefits or incentives from the merchants to cardholders associated with the one or more card issuers in connection with transactions between the cardholders and the merchants with the loyalty system. One or more merchant acquirers register on the loyalty system associated with the one or more card issuers. Cardholders are registered as members of the loyalty program. Incentives may be defined by rules to accrue and process the benefits of cardholders in connection with the transactions between the cardholders and the merchants by operation of the loyalty system.

The loyalty system may increase transactions for the merchant by way of incentives, and may enable card issuers and merchants to share the risk and costs associated with directing loyalty programs to cardholders. The loyalty system may connect to systems associated with the card issuers and one or more associated merchant acquirers. On this basis, merchants may direct the loyalty programs or aspects thereof to specific cardholders based on BIN ranges, and based on geographic, transaction histories, demographics, and/or time based parameters.

A loyalty program may be linked to one or more card issuers, and thereby to their cardholders, by operation of a loyalty program platform or loyalty engine or loyalty system. Merchants associated with the loyalty system are provided with tools to customize one or more loyalty programs made available to cardholders or members of the loyalty program platform (customers and potential customers of the merchants).

The operator of the loyalty program platform may establish the rules regarding the accrual of benefits from merchants to the card issuers and/or cardholders, and establish a contractual relationship with the one or more card issuers, such contracts incorporating the rules applicable within the loyalty system in connection with the card issuers (as well as their cardholders). These rules include, for example, the term of the agreement, accrual periods, geographic area of operation (if applicable) and most importantly the particulars of the benefits or incentives (including per transaction benefits, convertibility of benefits, accrual periods, timing of obligation regarding realization of benefits etc.) accrued to cardholders and/or card issuers. These rules may be reinforced in the arrangements entered into between the operator of the loyalty system and the various merchants so as to define the terms under which benefits will be made available to cardholders and/or card issuers.

The operator of the loyalty system may establish independently the rules under which the merchant shall accrue benefits for cardholders and/or card issuers, generally independently of card issuer but in conformity with the arrangements entered between the operator of the loyalty system and the card issuer. The operator of the loyalty system may manage the aforesaid relationships, and provide access to a technology infrastructure that enables card issuers and merchants to focus on using the tools of the loyalty system to enhance their business, rather than spending extensive resources on administrative issues.

Typically, the merchants may agree to conform to commitments that they make to members that are displayed in a benefits area of a website associated with the members who are cardholders, and linked to the loyalty system. These commitments are generally made by merchants in connection with the customization of their loyalty programs by operation of the loyalty engine.

The merchant acquirer registers on the loyalty system, if the merchant acquirer is not already registered. The cardholders are registered as members on the loyalty system. This occurs in part as a result of promotion of the loyalty system to the cardholders by the card issuer, or by the merchant. In addition to the card issuer, in most cases there is also a "merchant acquirer", who is an entity that contracts with a merchant to process financial card transaction information, and that may receive unique data not received by the card issuer.

The loyalty system applies the aforementioned rules as they apply to each cardholder who is a member so as to process the applicable benefits or incentives based on applicable transactions entered into by the cardholder that are linked to the loyalty system, i.e. a qualifying transaction between a cardholder and a merchant, as determined by the aforesaid rules for the incentives. By application of such rules, the loyalty system processes the agreed to benefits for the cardholder and/or the card issuer. The processed incentive may be referred to as redemption.

Figure 1:
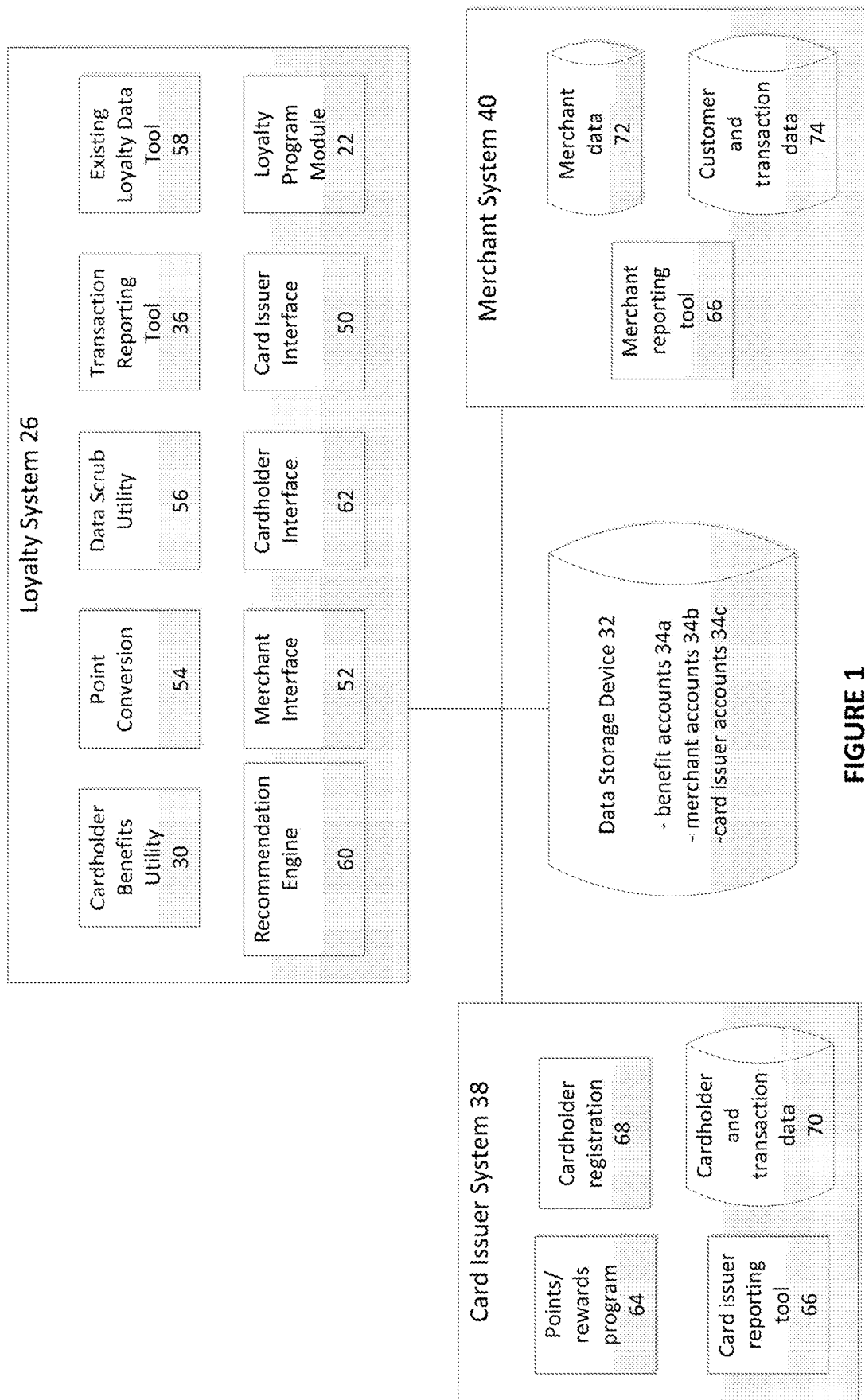

Referring now to FIG. 1, there is shown a loyalty system 26 interacting with a card issuer system 38 and a merchant system 40.

Loyalty system 26 may be implemented using a server and data storage devices 32 configured with database(s) or file system(s), or using multiple servers or groups of servers distributed over a wide geographic area and connected via a network. Loyalty system 26 may be connected to a data storage device 32 directly or via to a cloud based data storage device interface via network. Loyalty system 26 may reside on any networked computing device including a processor and memory, such as a personal computer, workstation, server, portable computer, mobile device, personal digital assistant, laptop, tablet, smart phone, WAP phone, an interactive television, video display terminals, gaming consoles, electronic reading device, and portable electronic devices or a combination of these. Loyalty system 26 may include one or more microprocessors that may be any type of processor, such as, for example, any type of general-purpose microprocessor or microcontroller, a digital signal processing (DSP) processor, an integrated circuit, a programmable read-only memory (PROM), or any combination thereof. Loyalty system 26 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like. Loyalty system 26 may include one or more input devices, such as a keyboard, mouse, camera, touch screen and a microphone, and may also include one or more output devices such as a display screen and a speaker. Loyalty system 26 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although only one loyalty system 26 is shown for clarity, there may be multiple loyalty systems 26 or groups of loyalty systems 26 distributed over a wide geographic area and connected via e.g. network. Loyalty system 26 may be connected to the Internet or other network in order to interact and connect with card issuer system 38 and merchant acquirer system 40.

Loyalty system 26 includes a cardholder benefits (e.g. incentives) processing utility 30. In one example of an implementation, the cardholder benefits processing utility 30 may be a software component of a web utility that provides a loyalty engine. Accordingly, cardholder benefits processing utility 30 may be referred to as a loyalty engine. The cardholder benefits processing utility 30 may be programmed to configure the data storage device database 32 with benefits accounts 34a of the various cardholders who are members.

The loyalty system 26 may be programmed to configure the data storage device 32 with merchant accounts 34b of the various merchants who are registered with loyalty system 26 to provide loyalty programs and offer incentives or benefits.

The loyalty system 26 may be programmed to configure the data storage device database 32 with card issuer accounts 34c of the various card issuers who are registered with loyalty system 26 to provide loyalty cards to cardholders for loyalty programs.

Access to different aspects and account records of the data storage device 32 may provided by an administration utility (not shown) that enables hierarchical access to the data storage device 32, depending on permissions assigned by the operator of the loyalty system, to each of members, merchants, card issuers and merchant acquirers. The purpose of providing this access is to provide transparency to the benefits being provided to members who are cardholders by operation of the loyalty system 26.

Loyalty system 26 further includes a reporting utility or transaction data reporting 36, which may be further linked to the cardholder benefits processing utility 30 and data storage device 32 to provide various reports of interest to merchants, merchant acquirers, card issuers and cardholders. For example, transaction data reporting 36 may permit merchants, merchant acquirers and card issuers to generate reports on measured performance of benefits or incentives provided to them by the loyalty system 26 in their sphere of interest. One of the purposes of the reporting utility 36 is to enable the organizations linked to the loyalty system 26 to calibrate their involvement (e.g. by merchants or card issuers calibrating the benefits that they provide) targeted to cardholders, and to review the results of their loyalty programs management by loyalty system 26.

Loyalty system 26 may include program module 22 which may be a hardware and software tool to manage the various loyalty programs managed by loyalty system 26. Loyalty programs may be particular to one or more card issuers or merchants, or a combination thereof.

In example embodiments described herein, card issuer system 38 is provided with tools to design and implement their own loyalty programs, including cross-promotional programs in conjunction with merchants. The card issuer system 38 may design and implement loyalty programs specific to a particular card issuer using card issuer interface 50.

In example embodiments described herein, merchant system 40 is provided with tools to design and implement their own loyalty programs, view reports regarding their loyalty programs, design and implement their own benefits or incentives, including cross-promotional programs and benefits in conjunction with card issuers. The merchant system 40 may design and implement loyalty programs and incentives using merchant interface 52.

Loyalty system 26 may be operable with any financial card that permits tracking of transaction information through card processing systems. Financial cards such as credit cards, debit cards, INTERAC cards, stored value cards, may be designated by a BIN number range. The BIN range identifies the financial card type and the issuing financial institution (e.g. card issuers). Card issuers typically market card types to certain segments of the population based upon demographic data such as credit scores, income, age, location, and anticipated card use. Because of this the BIN range may also represent a market or demographic segment of cardholders. For example, co-branded business travel cards may be marketed towards persons and organizations that typically utilize the specialized features of a travel card, such as points for travel and/or specialized services (e.g. travel insurance, lost baggage coverage) to facilitate needs and wants of persons who travel regularly. Another card, such as a TOYS R US card, for example, may be provided to young families. Each financial card therefore may be used to target particular consumer needs. The unique BIN range associated with each financial card may enable the use of a particular financial card to be identified within the loyalty system (below). This in turn enables merchants to target particular groups of members based on demographic data extrapolated from the financial card that they are using (by operation of the BIN range associated with their card), or more particularly demographic data associated with a sub-set of cardholders using a particular financial card, possibly as communicated by the card issuer. As will be described herein, loyalty system 26 may recommend incentives tailored to segments of customers, where the recommendation may be based on BIN range and other attributes of customers, such as spending habits, interests, needs, wants, charities, social habits, etc.

Embodiment described herein may utilize the BIN range of co-branded cards to develop additional transactions and associated incentives to selected groups of card holders and promote the use of certain financial cards for the transactions for the benefit of: cardholders, merchants, financial card issuers and merchant acquirers.

In accordance with the embodiments described herein, a card issuer system 38 and thereby one or more of its cardholders, are linked to the loyalty system 26. The loyalty programs provided by this loyalty system 26 may run in parallel with other loyalty and rewards programs. In accordance with embodiments described herein, costs of implementation may be very low for card issuer system 38 as it may interface with loyalty system 26 to access loyalty engine 30, etc. The loyalty system 26 is operable, via the Internet for example, to engage in real time data communications with a card issuer system 38 and/or a merchant system 40. Accordingly, seamless data flows between these systems can be established in order to enable the capture of financial transactions and cardholder data, and also the accrual of benefits or incentives based on data provided to the loyalty system 26 by each of the card issuer system 38 and the merchant acquirer system 40.

Loyalty system 26 is not only a loyalty system used by merchants but also becomes a secondary loyalty system for the card issuer for its cardholders. Loyalty system 26 is operable to provide system tools for the card issuer to receive payments from the merchants in connection with transactions between the merchants and the cardholders of the card issuer who are registered with the loyalty system 26. The card issuer may receive payment from the merchants indirectly through interchange fees collected by a merchant acquirer from the merchants at the time a transaction is processed on a financial card. In this particular embodiment the card issuer can receive payments and/or points from loyalty system merchants for transactions made by cardholders.

The card issuer may propose to encourage a specific demographic (as defined by a BIN range) to join the loyalty program by tailoring benefits and incentives to the specific segment of cardholders. Loyalty system 26 may recommend incentives based on attributes of the segment of cardholders. The merchants in the loyalty system 26 may agree to provide additional payments to the card issuer in the form of points or cash for transactions between merchants and cardholders of a selected BIN range (e.g. targeted segment) that have registered their financial card with the loyalty system 26 or opted in to the applicable loyalty program. By operation of the loyalty system 26, merchants may have the ability to vary the amount or the percentage of the transaction accrued and paid to the card issuer, or some other aspect of the benefit provided. The payment may be in the form of cash or redeemable points. The loyalty system 26 is operable to calculate the amount accrued to be paid to the card issuer for each cardholder who is a member by each merchant. The reporting facility provides visibility to the card issuer and the merchant in regard to the amounts accrued and subsequently paid at the end of the measurement period.

The amounts transferred to the card issuer may be redistributed by the card issuer to the cardholders in the form of extra points for transactions completed or the card issuer may retain a percentage of the amount transferred, for example, as an administration fee. In other words, the amounts transferred can then be accrued and distributed in accordance with the card issuer's own rules therefore.

In some circumstances the card issuer and the merchants of the loyalty system 26 may choose to offer special offers/ prizes (e.g. incentives) through the merchants and the loyalty system 26. The card issuer and the loyalty system pre-determine the conditions under which this occurs. Typically, the incentives are associated with conditional transactions with merchants (e.g. the purchase of a particular good or service is required in order to receive the special offer or prize). This encourages cardholders to conduct transactions with merchants. When a registered cardholder enters into such a transaction with a merchant in connection with the loyalty system 26, an amount owed by the card issuer to the merchant is recorded. At the end of the reporting period the system aggregates the amounts owed to merchants by the card issuer and settlement is made and then reimbursement funds are distributed to the respective merchants.

Loyalty system 26 may result in more transactions on the particular registered financial card of the card issuer, more individuals/businesses owning and using a financial card with a particular BIN range(s) and distribution of the cost of incentives provided to the customer by the card issuer and the merchant within the loyalty system 26. The amounts owed the merchants or to cardholder/card issuer are tracked within the loyalty system for the accounting period. Further, loyalty system 26 may recommend incentives particularly tailored to targeted segments of cardholders and potentially cardholders to further increase particular transactions. The recommended incentives and associated transactions are likely to be of interest to the targeted segment based on data mining and correlations of cardholder (and potential customer and cardholder) attributes.

The end result may be the accrual of benefits and incentives the to the benefits account 34, which then in is disbursed on a periodic basis to the applicable card issuers.

The operator of the loyalty system may enter into a contract with a financial institution that has a plurality of co-branded cards and seeks new customer base potential through the financial institution's co-branded card partners that have an interest in increasing transactions on their co-branded card by attracting merchants. In this case, it may be a business limitation that products and services associated with the loyalty program for the most part will not compete with the co-branded partner's business, i.e. that the businesses involved be complementary. The financial institution contacts and motivates its customer base (cardholders) to join the loyalty program and thereby provide the loyalty system 26 with a stream of new members. As stated earlier, the members joining the loyalty system through this referral source are associated with their co-branded card(s) within the loyalty system 26, each co-branded card being identified by different BIN number ranges and thereby historical demographics, credit score ranges and preferences associated with the particular card. Cardholders may individually join the loyalty program and register their card.

The loyalty system 26 may use the BIN number range and any associated demographic and credit score, along with geography and any customer preferences (e.g. cardholder attributes) to recommend special offers for loyalty programs of merchants to the individual cardholders (for example: unique product/service offerings to specifically tailored to customers). The loyalty system 26 is operable when a member with a co-branded card that is within a suitable BIN number range enters into a transaction with a merchant to record the applicable transaction information as cardholder attributes, aggregate said transaction information, and supply measured results to both the merchant and the card issuer.

Typically there is comity of interest between the merchants and the card issuers, in that merchants will be willing to provide the greatest incentives to the cardholders that the card issuers are most interested in providing incentives to. Accordingly, from a card issuer perspective, loyalty system 26 provides an efficient mechanism for maximizing benefits being provided to their preferred customers by having them register with a loyalty program where merchants, in the interest of promoting their own products/services, will automatically provide optimal benefits to these preferred customers.

For example, a new member, joining through a co-branded card reference, transacts with the registered financial card, and in the embodiment where the merchant and/or the co-branded issuer supply the additional benefit (which, typically being supplied through the normal co-branded card channels, consists of points, discounts or cash back). The amount paid by the merchant is usually based upon on one or more of the following: (1) the amount of the transaction; (2) the value of the transaction; and/or (3) the value of the transaction less an amount that was set as a pre-condition.

The card issuers may benefit financially from the transactions involving their financial cards in numerous ways: (1) cardholders carrying credit card balances; (2) maintaining customers using the incentives and selling other products/services to such customers; (3) acquiring new customers for such products/services using incentives; (4) financial incentives provided to financial institutions in exchange for promotional access to their customers; (5) interchange fees associated with transactions involving the financial cards; (6) yearly card fees; (7) transaction fees charged to the cardholder (if applicable); (8) currency exchange fees; (9) fees payable to the card issuer by merchants (generally tied to BIN ranges); (10) augmentation of card issuer's loyalty program (reduction of costs associated with card issuer's loyalty program, i.e. replacement of card issuer paid benefits with merchant paid benefits; and (11) revenue from merchant acquirer for additional transactions involving the merchant and the merchant acquirer; (12) customer tailored incentives through recommendation engine.

The merchant acquirer may receive the benefits of: (1) additional merchants who join their processing system to increase their access to a BIN range of cardholders; (2) additional revenue from merchants (participation fees); (3) increased revenue from additional merchant transactions; (4) ability to differentiate over other merchant acquirers based on the ability to provide access to the loyalty system. Merchant system 40 may also refer to a merchant acquirer system 40.

Loyalty system 26 provides for a linkage of a data between the merchant systems 40 and card issuers systems 38, and thereby their cardholders, facilitated through the loyalty system 26 technology that enables a card issuer to include its cardholders in a secondary loyalty system that supplements any card issuer point system. Although only one card issuer system 38 is shown in FIG. 1 for simplicity, there may be multiple card issuer systems 38 connected to loyalty system 26. Although only one merchant system 40 (or merchant acquirer system 40) is shown in FIG. 1 for simplicity, there may be multiple merchant systems 40 connected to loyalty system 26.

Loyalty and customer acquisition programs may be required to continually acquire new members, preferably at a low cost, e.g. through organic growth or through a partnership with various customer sources, including card issuers. Card issuer system 38 may retain cardholder databases of transaction information and other cardholder benefits, which may include data from other loyalty program operators and with participating merchants. Loyalty system 26 may access the cardholder databases to detect cardholder attributes in order to recommend incentives.

In the card transaction process, the card issuer generally has access to the following transaction information: (1) cardholder name; (2) card number; (3) date of transaction; (4) merchant ID; (5) amount of purchase; and (6) BIN number. Other information may also be accessible such as demographic, geographic, and credit score information relating the cardholder. This information may be stored in cardholder databases and accessed by loyalty system 26.

Some financial institutions have both card issuing and merchant acquiring business lines and loyalty system 26 may enable the two lines to work together for common benefit. The merchant acquirers may have access to following additional information that may not be generally available to the card issuer: (1) the time of the transaction; (2) the terminal ID (within a merchant system); and (3) the fee rates charged the merchant based upon the financial card and how the financial card is used (e.g. internet transaction vs. verified signature). Loyalty system 26 may access this information (e.g. cardholder attributes) to recommend incentives.

Loyalty system 26 is operable to link the card issuer, the cardholder, the merchant acquirer and the merchants such that the loyalty system 26 is operable to match time of day data (or other common variables) of a transaction with other information provided by the card issuer to the loyalty system 26. This functionality allows merchants to offer time of day or otherwise tailored special offers (e.g. incentives) to specific cardholders who are members of the loyalty system.

Loyalty system 26 is operable to match the terminal ID information obtained from the merchant processor with the transaction information obtained from the card issuer. This allows a merchant and/or a card issuer to tailor benefits to specific geographic locations, and enables loyalty system 26 to recommend incentives for specific geographic locations and other cardholder attributes.

Loyalty system 26 enables each of the merchants, members and card issuers to track the accrual of benefits by means of financial card transactions that in connection with the loyalty system 26 result in the accrual of loyalty benefits (e.g. incentives).

Loyalty system 26 is operable to store the data items mentioned above (and other similar data items) to the data storage device 32 and apply same against transactions between participating members and participating merchants. Loyalty system 26 may use the data items to recommend incentives and corresponding transactions.

The following provides an example transaction process. A cardholder who is a member transacts with a merchant using their financial card. The merchant transaction data is then usually settled by the merchant acquirer. The member transaction data (e.g. cardholder attributes) is then preferably transmitted to the loyalty system 26. This member transaction data usually includes the data items described above. This data is then stored to the data storage device 32, which may include a relational database. The rules defined for the cardholder within the loyalty system are then applied to the merchant transaction data.

As stated earlier, an agreement is entered into between the card issuer and the operator of the loyalty system on behalf of the merchants. The agreement may extend to one or more accounting periods. The agreement generally establishes the expected relationship and flow of funds between the financial institution and the merchants based on anticipated transactions, as well as the additional incentives that will be provided to the cardholders for transactions linked to the loyalty system and who will be the party covering the costs of such additional incentives and how. The agreement generally covers group of financial cards, identified by a BIN range. Also as stated earlier, cardholders are encouraged by the card issuer to join the loyalty program for additional cash rewards, points and/or special offers.

Prior to the beginning of an accounting period, and after cardholders have registered their particular financial card with the loyalty system, the agreement between the cardholder and the loyalty system may be implemented by the merchants who set the offers and incentives that will be made to cardholders of certain BIN ranges (these are examples of the merchant rules).

When a cardholder transacts with one of merchants under the applicable loyalty program, the loyalty system 26 is operable to review the benefits applicable to the BIN number and either 1) accrue the points/cash discount (less the administration amount paid to the card issuer) to the cardholder from the transaction, by reflecting such accrual in the benefits account for the cardholder. The cardholder is notified of the award of points, and the card issuer is notified of the accrual set aside by the loyalty system to be paid by the merchant at the end of the accounting period. These amounts are separate from the amounts paid to the card issuer through the interchange system, unless a special rate for the loyalty system has been established and applied by the merchant acquirer.

The loyalty system accrues the points/special cash back awards for each cardholder and what is owed the card issuer by the merchant. Merchants generally pay cash or cash in lieu of points as a reward to the card issuer. Different incentives/rewards can apply to different BIN ranges by a single merchant or by a group of merchants.

In summary, the merchant rules applicable for a specific accrual period are applied so as to update the benefit account 34 for the particular cardholder, for example. Generally speaking, the loyalty system 26 is operable to, after an accrual period has come to an end, to verify the accrued amounts in the benefit accounts 34. These can then be accessed and displayed by members or cardholders.

After an accrual period is closed, the loyalty system 26 may then permit members to access the loyalty system 26 to engage in a number of transactions in connection with their accrued benefits such as redemption, conversion of fees to points etc.

A particular process for conversion of fees to points will be described as an illustrative example with reference to the point conversion utility 54. The point conversion utility 54 enables enhancement of a card issuer's exiting loyalty programs based upon points or cash back cardholder benefits created by cardholder use in connection with a loyalty program and provided by incentives offered to cardholder. The point conversion utility 54 may allow the card issuer to reward their cardholders in the same format as under their existing cardholder program. These points and rewards are examples of incentives.

For instance, some existing financial cards have points or cash reward systems or a combination of both to promote financial card use. The cardholder may accumulate points and cash rewards for later use. The loyalty system 26 allows for the card issuer to take all or a portion of existing fees developed from financial card use and apply them to cardholder points or cash. Alternatively, the loyalty system 26 could be utilized by card issuer to create an additional source of revenue from the merchant fees by not converting all of the collected fees and giving the benefit to the financial card holders.

The fee and point information may be transferred to the card issuer at "X" days after the end of an accumulation period. The information is later integrated by existing financial card issuer software to consolidate the point and/or fees that are passed on to the cardholder.

The conversion from points to fees is accommodated by comparing the transaction data of identified cardholders against rule-sets created and maintained by the card issuer. The rule-sets may, for example, contain the following information regarding transaction data: 1. Transaction Amount 2. Transaction Date 3. Transaction Time 4. Merchant ID 5. Card Holder ID 6. Card BIN number.

An example of a card issuer rule-set includes: Card Holder Bin number "1111" minimum qualifying transaction with Merchant "A" is $100.00; No Maximum qualifying transaction or conversion restrictions exist; The transaction must occur between 00:00:00-00:07:00 EST; The transaction must occur between Jan. 1, 2004 and Jan. 15, 2004; Card Issuer would like to give card holder 1.0 point for every dollar transacted with merchant "A"; Merchant "A" Card Holder Id 0-10000 Card Holder BIN Number "2222"; Minimum qualifying transaction with Merchant "A" is $100.00; Maximum qualifying transaction amount is $1000.00; Transaction must occur between 00:00:00-00:07:00 EST; Transaction must occur between Jan. 1, 2004 and Jan. 15, 2004; Card Issuer would like to give card holder 1.0 point for every dollar transacted with merchant "A"; Merchant "A" Card Holder Id 0-10000; Card Holder BIN Number "3333"; Min. qualifying transaction with Merchant "A" is $100.00; Maximum qualify transaction amount is $10,000.00; Transaction must occur between 00:00:00-00:07:00 EST; Transaction must occur between Jan. 1, 2004 and Jan. 15, 2004; Card Issuer would like to record card holder $0.01 benefits for every dollar transacted with merchant "A"; and Merchant "A" Card Holder Id 0-10000.

In another example of the related transaction detail: Card Holder BIN number "1111"; Transaction Amount: $104.00; Transaction Date: Jan. 1, 2004; Transaction Time: 00:00:12; Merchant: "A"; and Card Holder ID: 1.

The example result may be that system 26 would calculate 100 points for the transaction detail and record the transaction information and related conversion amount 100 points as cardholder attributes in storage device 32.

In yet another example of the processing of a transaction: Transaction Detail Card Holder BIN Number "2222" Transaction Amount: $90.00 Transaction Date: Jan. 1, 2004 Transaction Time: 00:00:12 Merchant: "B" Card Holder ID: 999999=.

The example result may be that system 26 would NOT create any points for the transaction because the transaction failed to meet the criteria for point conversion for the transaction detail Merchant "B" is not part of the conversion rule-set Card holder is not part of any existing rule-sets.

In yet another example of the processing of a transaction: Transaction Detail Card Holder BIN Number "3333" Transaction Amount: $900.00 Transaction Date: Jan. 1, 2004 Transaction Time: 00:00:12 Merchant: "A" Card Holder ID: 999999.

The example result may be that system 26 would record $0.90 of benefit associated with the above transaction information tied to the card holder ID number of "999999".

An example process in connection with the generation of reports based on the contents of data storage device 32 will now be described. A system administrator of the operator of the loyalty system may access certain reports in connection with merchant activity in connection with particular BIN ranges. Similar processes and system implementations may be used to generate other reports of information accessible to card issuers, merchants, members or merchant acquirers. The loyalty system 26 is operable to generate reports for card issuers to track the use and monitor the results of financial card use with identified merchants.

For instance a card issuer may wish to view the status of conversion of points to fees. The loyalty system 26 may allow for a System Administrator to log in and generate reports regarding the amount of fees that have been converted to points to monitor the effectiveness of the applicable loyalty program.

As an illustrative and non-limiting example, the System Administrator enters the following parameters for report generation on behalf of the card issuer: 1) Start Date 2) End Date 3) BIN Number 4) Financial Institution ID 5) Merchant ID 6) Transaction Time 7) Transaction Terminal ID 8) Report Type. The loyalty system 26 may return the data associated with the transaction(s) to monitor the points and fees collected and converted to allow the card issuer to view data regarding the status of the system.

A card issuer may want to know which merchants are supporting a particular financial card to judge the effectiveness of the business relationship between the merchant and the cardholders. By examining the transaction information the card issuer can judge the effectiveness of having particular merchants within the loyalty system, based on collected merchant fees. A cardholder may elect to charge the merchant additional fee amounts as the merchant receives strong support from the cardholders of a particular card issuer.

The described reporting functionality can also be used to track the data necessary to integrate the data of points and fees held within the loyalty system for a given time period. A card issuer may elect to view the information to keep current information regarding benefits that are due to the cardholders.

By examining the data of accumulated points and fees a card issuer may elect to alter the conversion rules to give more benefits to the cardholders and thereby create more demand for a financial card use at a particular merchant(s). This type of reporting can also be used to prove the value to the merchants and cardholders derived from card use at an identified merchant(s).

Merchants may generally view only the information regarding the transactions that were made with identified cardholders. The loyalty system 26 may allow for a System Administrator to see the following information: 1) Time range of transactions 2) Date range of transactions 3) BIN Range of transactions 4) Summary amounts of transactions.

The loyalty system 26 may generally restrict the information that the merchant can view by providing summary data only. The summary data protects the cardholders from direct exposure of private cardholder information, while allowing the merchant to view the status of the program. The loyalty system 26 may use summary data to recommend incentives or raw data.

For instance a merchant may wish to know how certain cards identified by BIN number are contributing to his sales. By comparing this information with historical reports and current internal customer payment methods a merchant can judge which financial card types are providing the most benefit for his organization.

An example process for customizing loyalty programs involving cardholders will now be described, and specifically a system administrator for the operator of the loyalty system may adjust the parameters associated with reward generation and change incentives (based on e.g. recommended incentives) in connection with specific members.

The cardholder benefits processing utility 30 may be further configured for processing financial transactions (or transaction utility (not shown) that is operable to conduct electronic transactions between loyalty system 26 and the card issuer system 38) possibly also between the loyalty system 26 and the merchant acquirer system 40.

The cost of acquiring new customers is generally quite high, and this is a cost that merchants tend to monitor very closely. Particularly if a merchant's relationship with card issuers by operation of loyalty system 26 permits the merchant to acquire a new customer through the card issuer, merchants will generally be willing to provide to the cardholder and/or to the card issuer relatively significant incentives in consideration of obtaining the new customer. Loyalty system 26 may enable a merchant to target incentives to particular sub-groups of cardholders, depending on their interest (e.g. cardholder attributes) to merchant.

For example, a cardholder whose BIN number is associated with the program may go to a merchant who is also associated with the program. Within the loyalty system 26, the cardholder may be given a code to be presented at the merchant's location that reflects a discount offer (e.g. incentive). Upon payment, the cardholder receives a discount on monies owed. The cardholder in the above example is also given an additional item (e.g. a further incentive) from the merchant's inventory as recognition for the cardholder being a member of the applicable loyalty program.

After the cardholder transaction has been completed, the transaction data is relayed to the loyalty system 26 and the cardholder benefits processing utility 34 is operable to automatically offer prize entries as a follow up to the cardholder's purchase (e.g. a further incentive), based on the loyalty program rules defined by the merchant.

After the cardholder transaction has been completed the transaction data may be relayed to the loyalty system 26. The loyalty system 26 defines in accordance with a particular loyalty program a set of rules to complement existing points programs by converting the transaction data (e.g. identified merchant, amount of transaction, date of transaction, time of transaction) to convert the transaction into points in connection with the applicable card issuer's BIN range point program and based upon parameters set by each participating merchant. For instance, the system 26 may convert transaction incentives or prizes within the loyalty program to points provided through the card issuer to the cardholder based on a pre-determined formula (usually based on an arrangement between the card issuer and the merchants, facilitated by the operator of the loyalty system). The loyalty system 26 would for example convert a $100.00 spent by a cardholder under a loyalty program into 100 points if the transaction was completed between the hours of 00:00:00 and 12:00:00 Monday through Friday and 50 points at any other time for the particular card used at a particular merchant.

The cardholder in the above example visits a merchant participating in the loyalty system 26. The cardholder chooses to use the financial card that is registered with the loyalty system 26 over other financial cards, and completes a transaction. The loyalty system 26 identifies the merchant, the date, the amount and optionally the time of day and the terminal ID and also establishes any accrued benefits including points, prizes or discounted offers. The card issuer in this case receives additional revenue from increased card use as the cardholder chooses the registered card issuers' card over another financial card.

The loyalty system 26 allows for the existing point programs operated by the card issuer to be identified and supported within the loyalty system 26. This occurs when, after conversion of incentives (for example) into points, the card issuer then applies additional incentives through its own point system thereby creating an enhanced points program.

It is possible that the card issuer would charge the operator of the loyalty system 26 (or the merchants themselves) for access to BIN ranges of cardholders, and other attributes of cardholders. The charges could depend on the efforts expended by the card issuer to encourage cardholders to enroll in the loyalty program. Or, the card issuer may elect to charge differing amounts for loyalty system 26 access depending on the demographics and other attributes of particular cardholders.

A card issuer increases its revenue by offering incentives to consumers to use a particular financial card with a greater number of merchants. Merchants associated with the loyalty system 26 provide incremental incentives to cardholders in certain BIN ranges. This way the card issuer and the loyalty system 26 cooperate to bring more business to the common group.

The card issuers may elect to charge the cardholders an annual fee to carry a financial card that is associated with a particular BIN range, and thereby also eligible for certain richer benefits in connection with a loyalty program. The additional annual fees represent an important source of additional revenue to the card issuer.

As previously stated, a merchant belonging to the loyalty system 26 may choose to offer rewards/incentives based upon time of day and date. The incentives may also be based on a particular good or service. The merchant's merchant acquirer provides selected information relating to particular BIN ranges, transactions, dates and times (e.g. attributes). The loyalty system identifies the merchant, the time of day and the date and applies differential incentives either through the loyalty system or in the form of differential points transferred to the card issuer for the cardholder.

The merchant through the loyalty system 26 contracts with the merchant acquirer for anticipated additional transactions from a particular set of BIN numbers. The merchant acquirer is rewarded for the service in the form of a transaction fee or monthly fee through the loyalty system. The merchant may pay a differential rate for an access to a particular BIN as the cardholders to a particular BIN may offer a greater opportunity for transactions.

A merchant acquirer may realize additional revenues due to differing transaction fees associated with differing BIN number acceptance as a form of payment by a participating merchant. The merchant acquirer may elect to charge differing transaction fees for acceptance of cards within certain BIN range of a participating card issuer.

Loyalty system 26 may provide an opportunity for merchants, and for card issuers if they are willing, to efficiently operate and maintain their own loyalty program that provides the ability to share customers through cross-promotion between card issuers and merchants, and also cross-promotion between merchants involving cardholders who become members. Loyalty system 26 may enable card issuers and merchants to obtain direct customer feedback and to perceive measured results regarding customer transactions at each merchant, including bases on analysis of BIN number ranges by operation of the loyalty system of the present invention.

The card issuers may be provided with an economic interest to motivate the cardholders to become members of the loyalty system and to transact with merchants in order for the cardholders who are members to obtain benefits from the merchants (or from the card issuer based on an arrangement with the merchants). Recommended incentives tailored to a target segment may be a mechanism to increase transactions by cardholders. Again, customers of a co-branded card for example may be identified within the loyalty system 26 by means of their financial card BIN range number through the registration process, thereby enabling subsequent transactions involving particular cardholders and particular merchants to be tracked and measured results to be proven to card issuers and merchants alike.

Benefits or incentives may be accrued on behalf of members (including members who are cardholders) in a number of ways. The benefits themselves can vary. For example, pre-set benefit application or payment rates are associated with particular transactions associated with the loyalty system 26.

Within the loyalty system 26, merchants may be motivated to develop new and innovative loyalty programs (through the use of recommended incentives) that will automatically be accessible to cardholders. This saves the card issuer the time and resources generally required to devise new loyalty programs and enter into associated arrangements with their partners, often separately for each program.

Loyalty system 26 may provide a means of generating financial transactions and/or customers for financial institutions or merchants, or both.

Loyalty system 26 may provide flexibility in the arrangements made by the merchants, or in fact in some bases between the merchants and the card issuers, as it relates to the benefits provided to cardholders who become members. These arrangements can define the pre-determined benefits associated with particular transactions, e.g. a per transaction benefit to the cardholder or in fact to the card issuer. As such, loyalty system 26 may provide a potential source of new revenue for the card issuer to the extent that not all of the benefits earmarked for cardholders' transactions is actually passed on to the cardholders.

It may be open to the card issuer to also provide benefits or incentives to cardholders in connection with transactions associated with the loyalty system. For example, card issuers may want to enhance incentives available from merchants in connection with specific transactions with incentives that they are themselves providing because for example the impact of client retention of a preferred customer who is a golfer might be enhanced if an incentive from the card issuer is provided specifically in connection with a transaction that brings happiness to the golfer, i.e. golf. The loyalty system 26 can assist with incentives by recommending incentives for target segment(s). Alternatively, the card issuer could "top up" benefits provided by merchants, thereby enhancing the merchant's relationship with the cardholder who is a member, if the merchant is a customer of the card issuer or a related entity of the card issuer.

Consequently, the loyalty system 26, at little or no additional cost, can be used as a means of generating additional new business for the card issuer.

Loyalty system 26 may effectively permit some merchants who would otherwise not be able to enter into co-branded card type arrangements (e.g. because of start up costs or because of the merchant is a regional retailer where the merchant might not otherwise be attractive to a large financial institution) to provide loyalty programs. Accordingly, loyalty system 26 may allow regional merchants to compete better against national chains that may have more resources to dedicate to building loyalty programs.

Loyalty system 26 may provide a loyalty program with a low cost way to acquire customers and pay for them over future transactions. It may also provide the co-branded partner the ability to expand transactions on the current card base, both from the initial referrals and subsequent transactions resulting from cross promotional offers within the loyalty system among other merchants.

A financial card can be moved to the front of the wallet to be used for more transactions, where the cardholder is motivated to use the card based on incentives that are recommended for the particular cardholder based on associated attributes.

Cardholders of selected co-branded financial cards may become members where the co-branded partners' service or product is not really competitive with the loyalty system merchants. Accordingly, use of co-branded cards in connection with the described loyalty system 26 may protect transaction market share for both the card issuer and co-branded partners' market share.

The card issuer, the co-branded partner and the merchants of the loyalty program may increase their customer transactions through sharing customers.

Flexibility may be provided to card issuers and merchants to devise, implement, and then measure the effectiveness of, various cross-promotional initiatives, can dramatically increase the returns on investment of card issuers and merchants alike, in connection with their customer retention and customer acquisition activities. Further, the loyalty system 26 may facilitate this process by providing recommended incentives for various loyalty programs.

Other implementations and extensions may be implemented by loyalty system 26. For example, various security methods and technologies for restricting access to resources of the loyalty system 26 to those authorized to do so by the operator of the loyalty system 26 may be used. Loyalty system 26 may use various existing and future technologies to process payments by operation of the transaction utility 38. Loyalty system 26 may provide various tools and interfaces for interacting with the loyalty system. The system 26 may also allow for robust reporting which may include comparative reports of member affinity or of transaction history with participating merchants. In other words, member transaction history may be different for differing groups of members based on member affinity.

Data storage device 32 maintains benefits accounts 34*a*, merchant accounts 34*b*, card issuer accounts 34*c* for storing attributes regarding merchants, cardholders and card issuers. The attributes may be used to determine incentives to offer in relation to various loyalty programs.

Loyalty system 26 may include a card issuer system 38 which may be configured with various computing applications, such as a points/rewards program 64, cardholder registration 68, card issuer reporting tool 66, and a data storage device with cardholder and transaction data 70. The points/rewards program 64 may manage loyalty programs offered by card issuer system 38 independently or in conjunction with loyalty system 26. Existing loyalty data tool 58 may interact with points/rewards program 64 regarding loyalty programs offered by card issuer system 38. The points/rewards program 64 may populate cardholder and transaction data 70 based on data collected from loyalty programs. Cardholder registration 68 may enable cardholders to register for financial cards with card issuer. Cardholder registration 68 may populate cardholder and transaction data 70 based on data collected from registration. The card issuer reporting tool 66 may generate reports based on cardholder and transaction data 70 and data maintained by loyalty system 26 as part of data storage device 32. Data storage device 32 may maintain a copy of cardholder and transaction data 70, or may contain separate data. Data scrub utility 56 may normalize, scrub, convert and perform other operations on data received from card issuer system 38. Loyalty program module 22 may be used to create and manage various loyalty programs for card issuer system 38 and may interact with points/rewards program 64.

Loyalty system 26 may include a merchant interface 52 for interacting with merchant system 40 and generating various interfaces for display on merchant system 40. The merchant interface 52 may provide a mechanism for merchant system 40 to create, customize, and manage loyalty programs and incentives. Data scrub utility 56 may normalize, scrub, convert and perform other operations on data received from merchant system 40.

Merchant system 40 may be configured with various computing applications, such as merchant reporting tool 66 for generating reports regarding loyalty programs and for displaying interfaces received from merchant interface 52 to create, customize, and manage loyalty programs and incentives. A computing application may correspond to hardware and software modules comprising computer executable instructions to configure physical hardware to perform various functions and discernible results. A computing application may be a computer software or hardware application designed to help the user to perform specific functions, and may include an application plug-in, a widget, instant messaging application, mobile device application, e-mail application, online telephony application, java application, web page, or web object residing, executing, running or rendered on the merchant system 40. Merchant system 40 is operable to authenticate merchants (using a login, unique identifier, and password for example) prior to providing access to applications and loyalty system 40. Merchant system 40 may be different types of devices and may serve one user or multiple merchants. For example, merchant system 40 may be a merchant acquirer system 40 may serve multiple merchants. Although merchant system 40 is depicted with various components in FIG. 1 as a non-limiting illustrative example, merchant system 40 may contain additional or different components, such as point of sale system or other transaction processing system.

Merchant system 40 may include one or more input devices, such as a keyboard, mouse, camera, touch screen and a microphone, and may also include one or more output devices such as a display screen and a speaker. Merchant system 40 has a network interface in order to communicate with other components, to serve an application and other applications, and perform other computing applications by connecting to network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Although only one merchant system 40 is shown for clarity, there may be multiple merchant systems 40 or groups of merchant systems 40 distributed over a wide geographic area and connected via e.g. network.

Merchant system 40 includes data storage devices storing merchant data 72 particular to the merchant, such as geographic location, inventory records, historical records, and the like. Data storage devices may also store customer and transaction data 74 such as customer names, addresses, contact information, target potential customers, transaction details, and so on.

Figure 3:
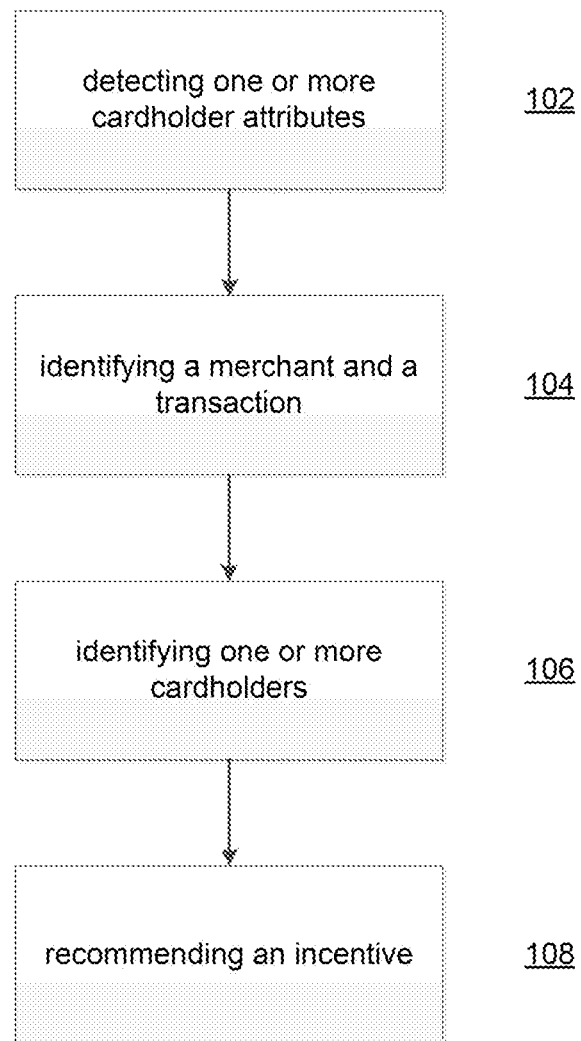

Reference will now be made to FIG. 3 which provides a flowchart diagram of an example method 100 for recommending incentives. Recommendation engine 60 (FIG. 1) may be configured to implement method 100 and interact with various components of loyalty system 26, data storage device 32, card issuer system 38, and merchant system 40.

At 102, recommendation engine 60 is operable to detect one or more cardholder attributes from cardholder data collected by one or more card issuers. The cardholder attributes may relate to cardholders, customer, members, potential cardholders, potential customer, potential members, and so on. Example attributes include BIN range, distance between cardholder and merchant, spending (total, average monthly, etc.), type (existing, potential), age, gender, feedback, visits (total, average per month), number of transactions, type, products purchased, services purchased, transaction history, zip code, location, favorite merchants, preferences, interests, redeemed incentives, charitable preferences, unused incentives, settings, etc. The attributes may be received from card issuer system 38 or data storage device 32.

At 104, recommendation engine 60 is operable to identify a merchant and a transaction. The merchant may initiate the recommendation process and may be identified by recommendation engine 60 at this step. The merchant may specify a transaction or the recommendation engine 60 may suggest transactions based on the cardholder attributes. Step 104 may occur prior to 102 or after 106. For example, the attributes may be identified based on the transaction and the merchant.

At 106, recommendation engine 60 is operable to identify one or more cardholders. The cardholders may be identified based on the attributes selected at 102, or may be otherwise identified. Step 106 may occur prior to 102 or 104, or concurrently with 102. The incentive will target the identified cardholders. For example, they may be of a particular age and gender, and have particular shopping habits. These may be used to identify the attributes and correlate to interests and preferences of other similar cardholders.

Recommendation engine 60 is operable to identify the cardholders based on similarity between their attributes and the detected one or more cardholder attributes. The cardholder attributes may include demographics, and recommendation engine 60 is operable to identify the one or more cardholders based on the demographics.

The merchant may be associated with merchant attributes (e.g. location, products, services), and the one or more cardholders may be identified based on the merchant attributes.

At 108, recommendation engine 60 is operable to recommend incentives for the identified one or more cardholders based on the one or more cardholder attributes. The recommended incentive defines a benefit provided by the merchant to the cardholder upon the occurrence of the transaction between the merchant and the cardholder. The incentive may be for a particular product or service identified to be of interest to the cardholders, and may be valid for a particular time that the cardholder is likely to redeem the incentive. For example, the incentive may be a discount on golf wear at a golf club on a Wednesday night when data analysis reveals that the cardholder typically golfs on Wednesday night at the golf club. This may encourage the cardholder to spend more money on their visit.

Figure 2:
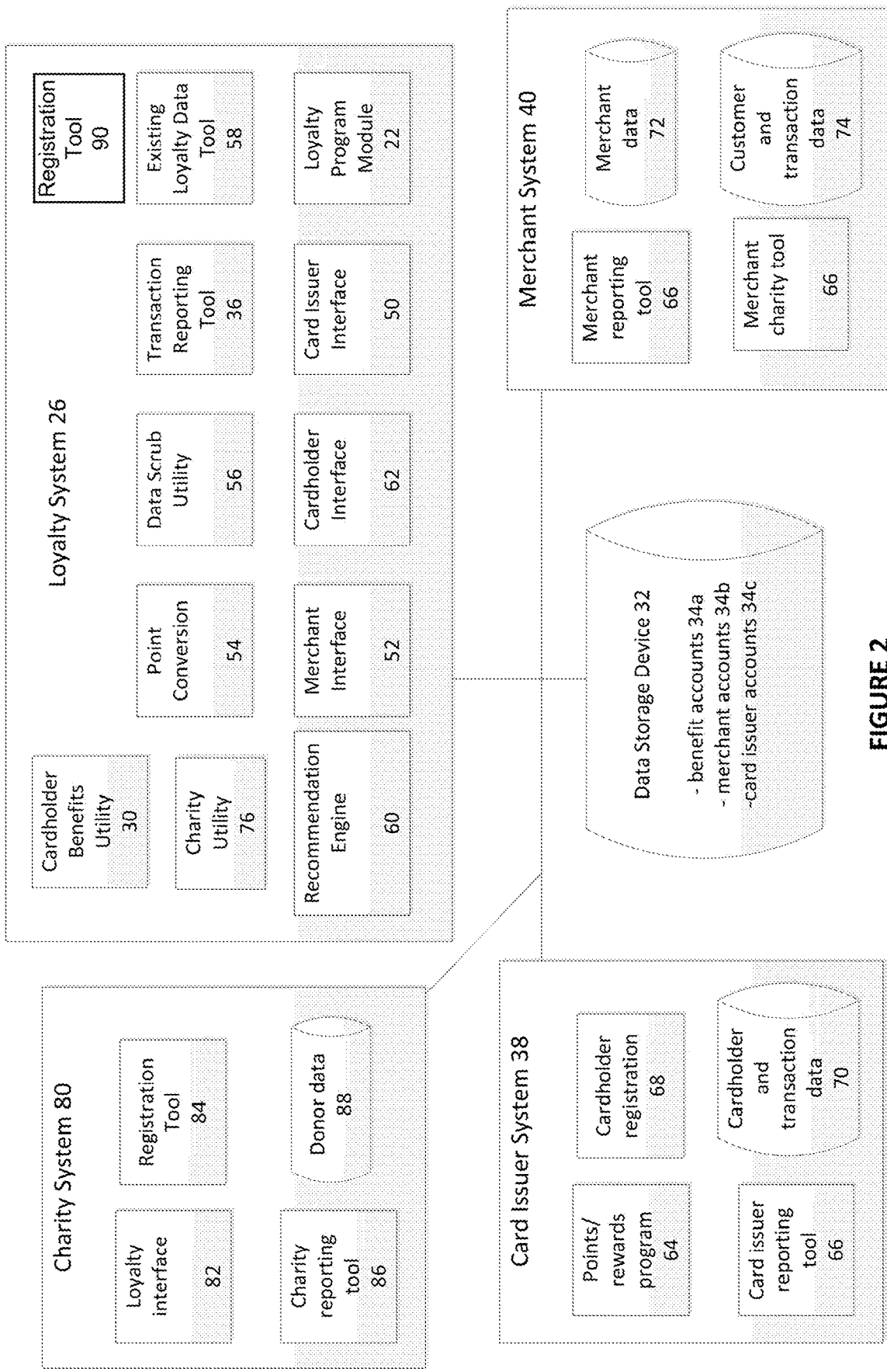
Figure 4:
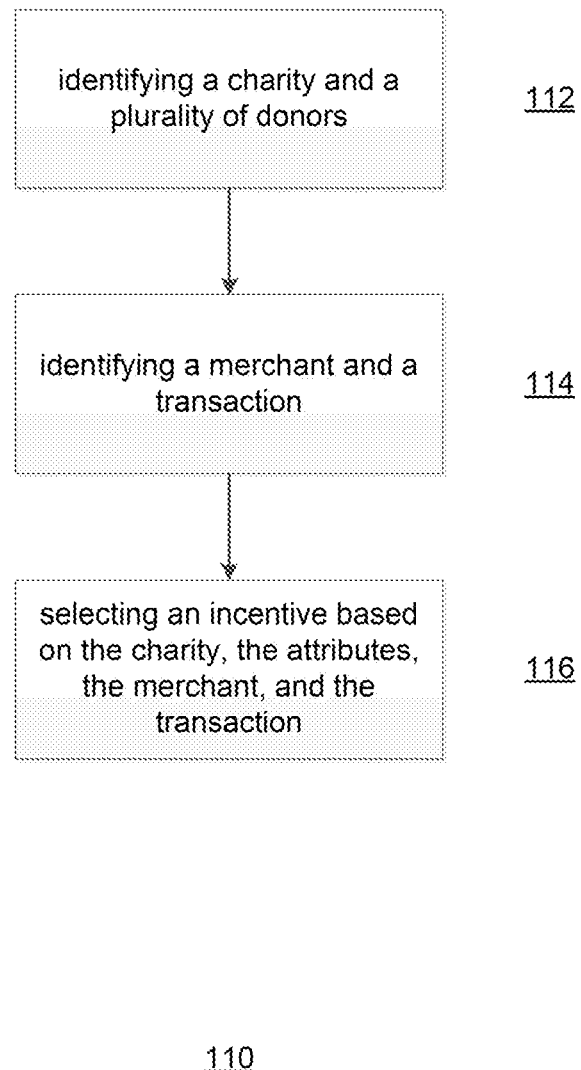

Reference will now be made to FIGS. 2 and 4 which provide a schematic of a system and a flowchart diagram of an example method 110 for providing charitable incentives.

Loyalty system 26 (and in particular charity utility 76) may interact with a charity system 80 to provide charitable incentives. For example, an incentive may result in a donation to a charity from the merchant, card issuer, card holder, and so on. Charity system 80 may include a data storage device with donor data 88. Charity system 80 may include a loyalty interface for generating interfaces populated with data from loyalty system 26.

For example, a correlation may be made between donor data and benefits accounts 34*a* or card holder data 70 to determine whether any donors are also cardholders. If so, then recommendation engine 60 may recommend an incentive with a donation portion to the charity associated with charity system 80.

Charity system 84 may include a registration tool 84 to register users to become donors, and potentially cardholders of a loyalty program created by loyalty system 26. The registration tool 84 provides a mechanism to collect attributes regarding donors.

At 112, charity system 80 or charity utility 76 is operable to identifying donors associated with a charity. The donors may be cardholders or potential cardholders for a loyalty program provided by loyalty system 26. The donors are associated with attributes, such as the example attributes described herein in relation to cardholders.

Charity system 80 or charity utility 76 is operable to determine which donors are cardholders and which are not. Charity system 80 or charity utility 76 are operable to invite those donors which are not cardholders to participate in a loyalty program offering incentives that include donations to the charity. These may be recommended incentives based on their past donations.

At 114, charity system 80 or charity utility 76 is operable to identify a merchant and a transaction. This may occur prior to 112 or after in different embodiments. The charity system 80 may contact a merchant upon detecting that a subset of donors are also customers, potential customers, or cardholders to arrange for an incentive provided by merchant that includes a donation to the charity. The transaction may identify a good or service of interest to the donors based on the attributes.

At 116, charity system 80 or charity utility 76 is operable to select an incentive based on the charity, the attributes, the merchant, and the transaction. The incentive defines a benefit provided by the merchant to the charity upon the occurrence of a transaction involving the merchant and one or more donors. In this way, a donor is motivated to transact with the merchant using a cardholder by the card issuer due to the donation provided to their preferred charity. The charity system 80 or charity utility 76 may contact donors encouraging them to register for a card associated with a card issuer and transact with a merchant, as this may result in an increase in donations to the charity. The card issuer and the merchant may have access to a new set of potential customers via charity system 80. The loyalty system 26 may consider the buying patterns of donors to recommend incentives with a donation component. This also allows merchants to see what customers are also donors and tailor incentives accordingly.

The charity system 80 may be used to manage events and the attendee list may also receive the recommended incentive. This may increase transactions for both merchants and card issuers, as well as increase donations if there is an additional incentive offered by merchant or card issuers. The merchant, charity or card issuer may set a donation rate which may be a fixed or proportional amount. For example, a percentage of the transaction amount may be given as a donation.

Merchant system 40 is operable to display various interfaces to interact with loyalty system 26.

Figure 5:
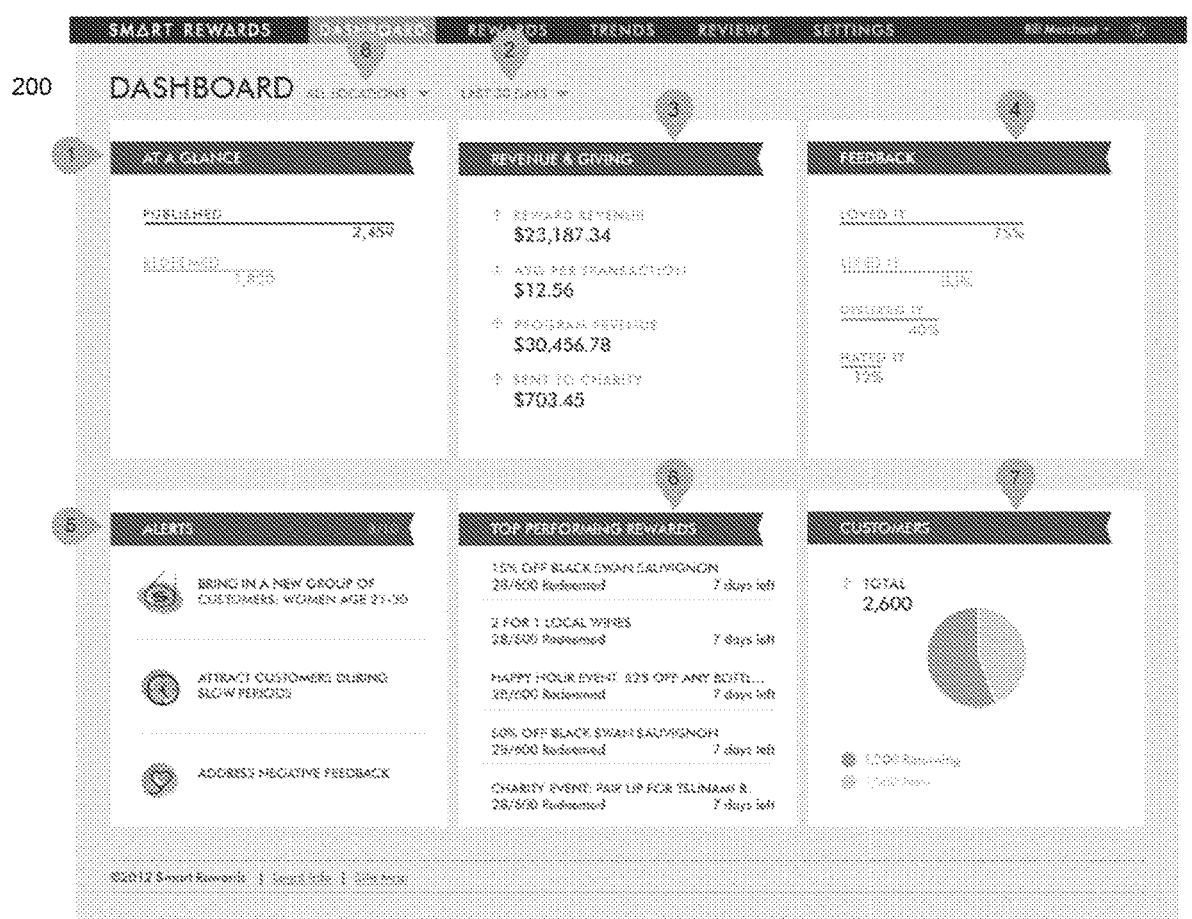
FIG. 5 shows an example screen of a merchant dashboard 200 in accordance with example embodiments.

FIG. 5 shows an example screen of a merchant dashboard 200. The merchant dashboard 200 displays various reports in a tile configuration to give the merchant a snapshot of various features and functionalities. The AT A GLANCE (1) offers a graphical bar-chart providing a comparison of published and redeemed rewards (which may be referred to as incentives). Alongside the graph are the numerical values associated with each item. Clicking anywhere in the tile displays a detailed summary of the rewards, or an incentive list.

The DURATION DROP DOWN control (2) provides the merchant with options for adjusting the time period during which the displayed information pertains. For example, the time period may be "last 30 days". When the Merchant selects an option, the page updates to reflect that time period. If a merchant has only been on the program for 2 days their default will be "last 7 days", until the loyalty system 26 has more data available.

The REVENUE & GIVING panel (3) offers 4 dynamic data fields, for the selected time-period. These include: Reward Revenue; Average per Transaction amount; Program Revenue shows total transactions (including reward related transactions); and Sent to Charity. As will be explained herein with reference to FIG. 2, loyalty system 26 may provide additional functionality relating to charities and donations. For example, an incentive may provide that a merchant may make a donation to a charity for each transaction during a particular time period. This may incent customers to transact with the merchant for that time period if they are interested in supporting a particular charity. The charity may be in the same geographic area as the merchant and customer which may increase community support. A summary of the total amount provided to a charity for the time period may be shown as part of dashboard 200.

There are trending indicators that indicate how this data is currently performing in relation to the previously selected time period, i.e. last 30 days in this wireframe. For example, an up arrow indicates the current figures are higher than previous corresponding time-period and a down arrow indicates the current figures are lower than previous corresponding time-period.

Clicking anywhere in the tile may trigger the display of a Trends Performance page.

The FEEDBACK panel (4) offers aggregated feedback corresponding to feedback from customers, i.e. Loved it, Liked it, Disliked it, and Hated it. Clicking anywhere in the tile may trigger the display of a Merchant Reviews List page.

The ALERTS panel (5) offers the most recent alerts. An alert may be associated with a trigger defining a business rule or threshold. An alert engine may mine and process the system data to determine whether a trigger is met and generates the associated alert. The triggers may relate to trends. The business rules and thresholds for alert triggers may be default values or may be user configurable. Accordingly, the ALERTS panel (5) may display triggered alerts. Alerts provide a notification to a user of system (e.g. a merchant) regarding data analytics, observed trends, events, and so on. The alert notification may include one or more suggested objectives for an incentive, one or more suggested incentives, trends, and other information regarding customers and transactions.

For example, trend alerts may be generated to identify time ranges or days of the week when the merchant is historically not busy (e.g. by analyzing data for the merchant or data averages from other similar businesses and merchants). The alert may include suggested incentives targeting the time ranges or days of the week when the merchant is historically not busy.

Alerts may be generated to notify the merchant of an occurrence of an event, such as negative feedback received via reviews, social media platforms, and so on. An alert for negative feedback or other event may or may not include a reward suggestion.

Trend alerts may be generated to notify the merchant of a customer who has achieved a high spending threshold. The high spending threshold may relate to a single visit or may aggregate spending from multiple visits for a predefined or infinite period of time. An alert for negative feedback may or may not include a reward suggestion.

Trend alerts may be generated to notify the merchant of a customer who has achieved a high number of visits threshold. The high number of visits threshold may be compared to an aggregated number of visits over a predefined or infinite period of time.

These are non-limiting examples and other alerts may be triggered and generated by system.

The panel may only display a few alerts of all available alerts. For example, 3/10 is an indicator of the number of alerts shown in the tile vs. total alerts. Clicking one of the alerts displays may trigger the display of an alert page. Clicking the title bar may trigger the display of a Manage Alert List. If no Alerts are available, a "no alerts" message displays in the tile.

The TOP PERFORMING REWARDS panel (6) is a mini list-control module of the Manage Rewards page. The list shows the top 5 most redeemed rewards in the selected timeframe (in this image: 30 days). This enables the merchant to view successful rewards (e.g. incentives). The successful rewards may be used by loyalty system 26 to recommend rewards and incentives to tailor and customize a loyalty program for the merchant. Clicking one of the rewards may trigger the display of a corresponding Reward Details page. Clicking the Top Performing Rewards title bar displays Rewards List page, for example. If no Active Rewards are available, a button to 'create a reward' displays.

The CUSTOMERS panel (7) provides a pie-chart view of new vs returning customers. There are three numerical values represented here: new, returning, and total number of customers. There is a trending indicator next to total customers that describes if there has been an increase or decrease in customers during the selected time period. Clicking anywhere in the tile may trigger the display of a Trends Demographics page.

The LOCATION DROP DOWN: item (8) at the top, in this example, gives a default selection of All Locations. Selecting a particular location displays reviews for that location only. A merchant may have stores in multiple locations. When the merchant has only one location, the location drop-down may not be shown. The Location selection persists on the Dashboard 200, even if another Location is selected on a different page (i.e. Trends Performance) Locations may be sorted by the street address.

Accordingly, the dashboard 200 provides a summary report of data collected and managed by loyalty system 26. The merchant reporting tool 66 may be used to provide data to loyalty system 26 and received data from loyalty system 26. The dashboard 200 enables a merchant to easily and effectively review aspects and results of one or more loyalty programs. This is a non-limiting example and other configurations and controls may be provided by dashboard 200. A merchant may tailor and customize dashboard.

Figure 6:
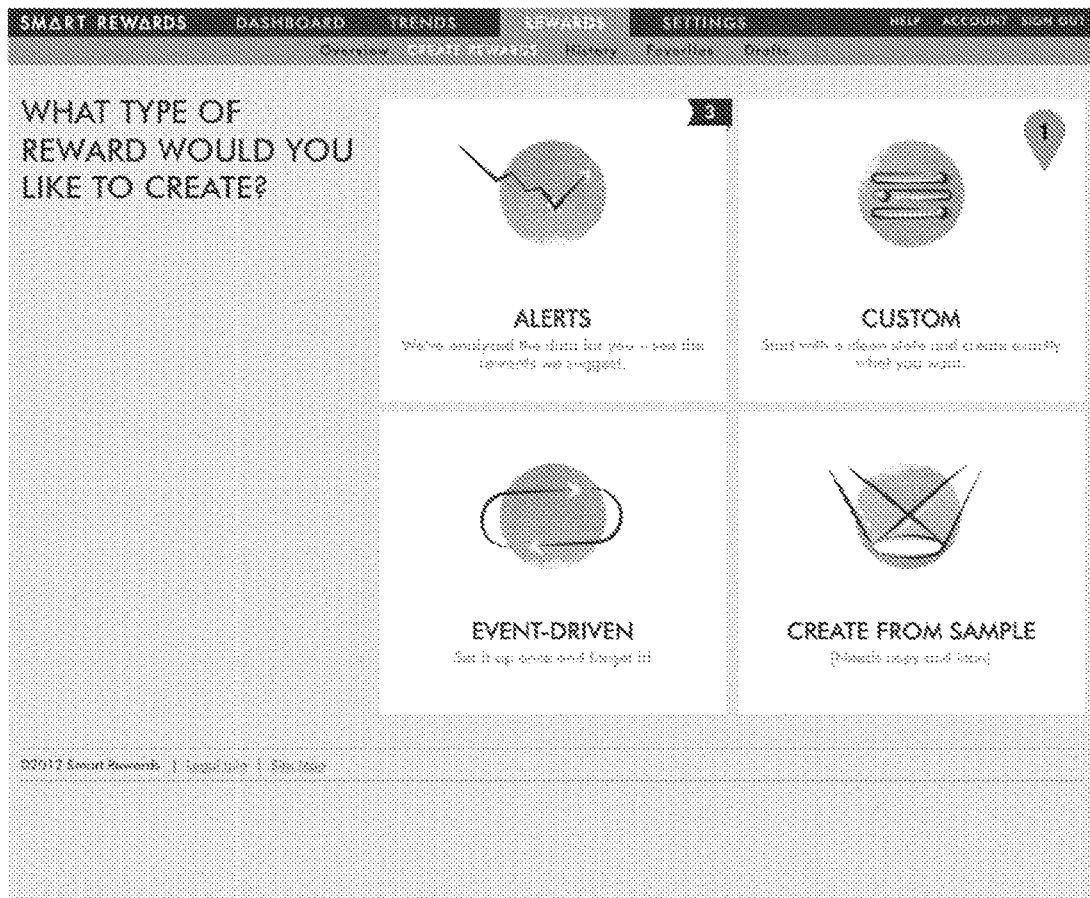
FIG. 6 illustrates an example interface for creating incentives and rewards for one or more loyalty programs in accordance with example embodiments.

FIG. 6 illustrates an example interface for creating incentives for one or more loyalty programs. An incentive may be referred to herein as a reward or a benefit. The example interface provides four example types of incentives that may be created: (a) Alerts (e.g. recommended incentives based on data analysis, trends based on thresholds, trends based on events), (b) Custom; (c) Event-Driven, and (d) Create From Sample. The example interface asks the user the question "What Type of Reward Would You Like to Create?"

Selecting "CUSTOM" displays an objectives screen for selecting an objective for the custom incentive.

Figure 7:
FIG. 7 illustrates an example interface for choosing an objective for the custom incentive in accordance with example embodiments.

FIG. 7 illustrates an example interface for choosing an objective for the custom incentive. The example interface provides three sample button items to select from to Choose an Objective for the Reward (e.g. Incentive):

Item (1) Increase Spending Button.
Item (2) Bring in New Customers Button.
Item (3) Start from Scratch Button (e.g. a custom objective can be entered).

For the custom objective a user may start creating a reward without any pre-selected fields.

Figure 8A:
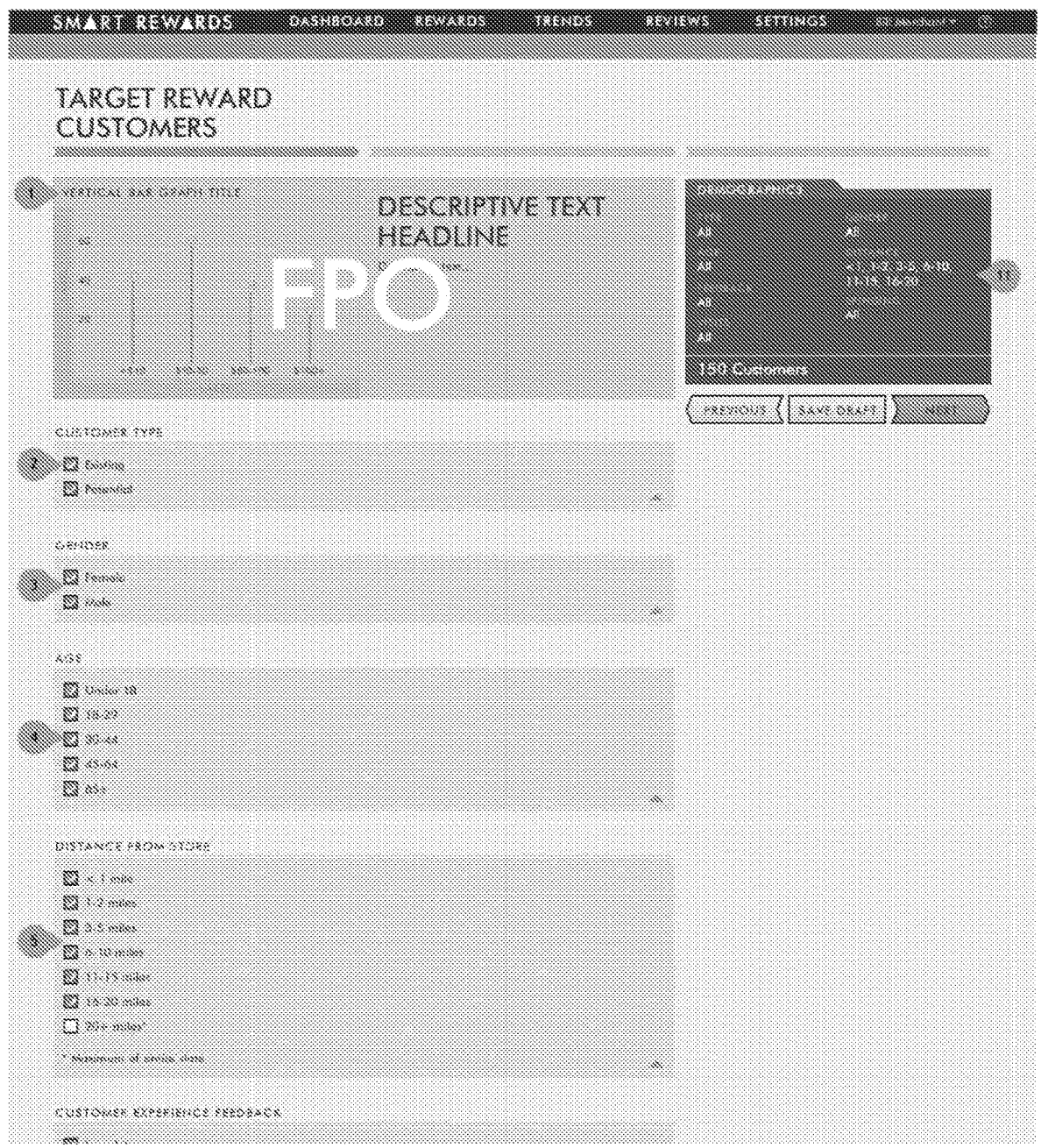
FIGS. 8a and 8b illustrate an example interface for targeting customers with the incentive in accordance with example embodiments.
Figure 8B:

FIGS. 8a and 8b illustrate an example interface for targeting customers with the incentive. The interface displays a demographics screen to enable the user to target particular customers with their incentive. The demographics include particular attributes about customers.

For example, the Demographics screen allows Merchants to target a reward to a specific group of cardholders, members, or customers. The population defined at this screen determines which Members are eligible to receive the reward in this example.

The interface enables to merchant user to filter the population based on selected customer attributes. Filters are displayed and hidden depending on the chosen objective. In some examples, only relevant filters are displayed. The visual displays the default filter order.

Item 1 illustrates a graph and descriptive text guide to assist the user in understanding what customer segment they should target. This is based on the objective chosen for the incentive. The graph may be a data visualization that displays the recommended target segment. In some examples, creating an objective from scratch may not have a graph and descriptive text. The example graph may illustrate the average monthly spending for customers, such as less than $10, between $10-$50, between $50-$100, and over $100. This may enable a merchant user to tailor the award based on the average spending of customers. For example, the merchant may want to target customers that spend between $50-$100 monthly with an incentive. Average monthly spending is an example customer or cardholder attribute.

Item 2 enables selection of a Customer Type filter to allow merchants to define/limit the general group of customers that will receive a specific incentive. Existing customers are Members that have previously purchased from the Merchant. Potential customers are Members that have never purchased from the Merchant but are in the Merchant's region(s). Customer type is another example customer or cardholder attribute.

Item 3 enables selection of a Gender filter to allow merchants to limit the reward recipients to the chosen gender(s). Gender is a further example customer or cardholder attribute.

Item 4 enables selection of an Age filter to allow merchants to limit the reward recipients to the chosen age groups. A business rule may implement the filtering mechanism. Age is an example customer or cardholder attribute.

Item 5 enables selection of a distance from store filter to allow merchants to limit reward recipients by the distance of their home address from a store location. The maximum distance from a location may be the region (State) it is located in. Distance from store is an example customer or cardholder attribute.

Item 6 enables selection of a Customer Experience Feedback Filter to allow merchants to limit reward recipients by how they rated their experience for a location or multiple locations. "No Feedback" indicates customers who have not left any feedback for that business. This may only be displayed if "Existing" customer type is selected and "Potential" is unselected, as potential customers may not have provided any feedback. Customer Feedback is an example customer or cardholder attribute.

Item 7 enables selection of an Average Monthly Spending filter to allow merchants to limit the reward recipients by their monthly average amount spent at the Merchant. This may only be displayed if "Existing" customer type is selected and "Potential" is unselected. Average Monthly Spending is an example customer or cardholder attribute.

Item 8 enables selection of a Customer visits filter to allow merchants to limit reward recipients by their number of visits. This allows targeting of customers based on how many times they have visited a business. This may only be displayed if "Existing" customer type is selected and "Potential" is unselected. Customer visits is an example customer or cardholder attribute.

Item 9 enables selection of a Total spent filter to allow merchants to limit reward recipients by the total amount they have spent at one or more location. This allows the targeting of customers who have spent over a certain threshold amount. This may only be displayed if "Existing" customer type is selected and "Potential" is unselected. Total spent is an example customer or cardholder attribute.

Item 10 enables selection of a Total Visits filter to allow merchants to limit reward recipients by the total number of visits to one or more locations. This allows the targeting of customers who have visited over a certain threshold amount. This may only be displayed if "Existing" customer type is selected and "Potential" is unselected. Total visits is an example customer or cardholder attribute.

Item 11 (FIG. 8a) is a Demographic Summary Pane to provide a summary view of demographics (e.g. attributes) of the targeted customers for the reward. This displays a summary for all filters that have selected values. If all values for a filter are selected "All" filters are displayed, otherwise the selected values may be displayed in a comma-separated list.

The customer count at the bottom of the pane is dynamic and updates in real-time in response to selections. As the user selects different values the count changes to expose how many Members would receive the reward. This would involve the loyalty system 26 being operable to rapidly calculate the recipients, taking into account system filters and Member preferences/attributes. This functionality may be conditional on the Merchant categories and sub-categories being able to match the Member preferred store categories.

Business rules may govern the display of the summary pane. For example, if the summary pane fits on the screen, it may lock at the top when a user starts scrolling down so it has 10 px spacing between its top edge and the top of the screen. When a user scrolls all the way to the top, it relaxes so it does not cover the navigation. If the summary pane does not fit on the screen, it may lock to the bottom of the screen when a user starts scrolling so that there is 10 px spacing between the buttons below the pane and the bottom of the screen. It should never overlap the footer either.

FIG. 52 illustrates further examples of demographics summary panes providing a summary view of demographics (e.g. attributes) of the targeted customers for a reward. FIG. 52 further illustrates a settings summary pane providing a summary view of settings for a reward. The settings shown are based on selections by the user or automatic configurations and recommendations by the loyalty system 26.

Figure 9:
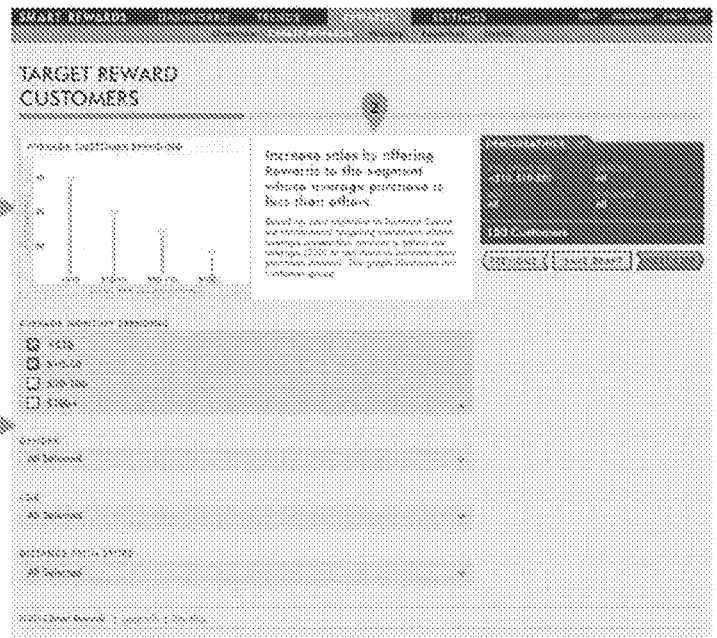
FIG. 9 illustrates an interface screen for a custom incentive with the object to increase spending in accordance with example embodiments.

FIG. 9 illustrates an interface screen for a custom incentive with the object to increase spending. This is a variation of the Demographics screen in the case where "Increase Spend" was selected on the "Create Custom Rewards Menu" screen. Three items may be show on this screen as an illustrative example.

Item 1 illustrates a graph of average customer spending. This graph displays the average monthly spending of all customers. The customer population that spends less than the average monthly of $50 spending is highlighted.

Item 2 illustrates Descriptive text. This text explains the graph and gives recommendations on types of members to target. For example, the objective of this incentive may be to increase sales by offering rewards to the segment whose average is less than the others. The incentive may target customers who spend less than a $50 average to get them to increase their spending.

Item 3 illustrates additional Filters (e.g. gender, age, distance from store). These are the filters that are displayed for the Increase Spending objective.

The Average Monthly Spending filter is expanded by default, with the two lowest spending values checked as this example targets customers who spend less than a $50 average to get them to increase their spending. The Gender, Age, and Distance filters are collapsed by default, with all values selected, for this example.

Figure 10:
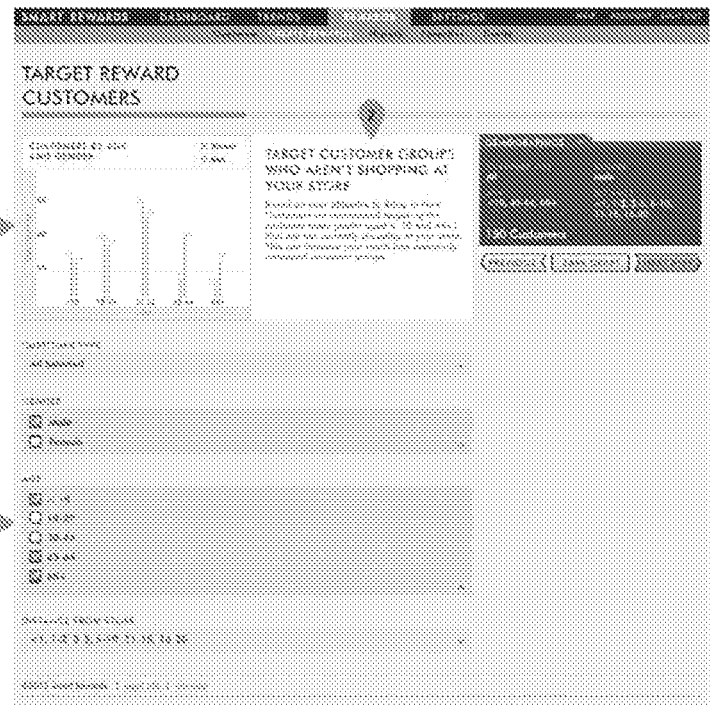
FIG. 10 illustrates an interface screen for a custom incentive with the object to bring in new customers to one or more locations in accordance with example embodiments.

FIG. 10 illustrates an interface screen for a custom incentive with the object to bring in new customers to one or more locations. This is a variation of the Demographics screen in the case where "Bring In New Customers" was selected on the "Create Custom Rewards Menu" screen.

Item 1 illustrates a Graph of customers by their age and gender. This graph displays the breakdown of the Merchant's customers by age groups and gender. The graph illustrates the number of each customer by age group and gender.

Item 2 illustrates Descriptive text. This text explains the graph and gives recommendations on types of members to target. For example, the objective of this incentive may be to target customer groups who are not shopping at one or more locations.

Item 3 illustrates additional Filters (e.g. gender, age, distance from store). These are the filters that are displayed for the Attract New Customers objective. The Gender filter is expanded by default with the gender with fewer members pre-selected by the loyalty system 26. The Age filter is expanded by default with the age values pre-selected by the loyalty system 26. The Customer Type and Distance filters are collapsed by default. Customer Type has all values selected and Distance has all values selected except for 20+(the state wide value) for this example.

Example Filters include:
Customer Type: values: Current, Potential
Gender: values: Men, Women
Age: values: <18, 18-30, 31-45, 46-65, >65
Area: values: entry fields for zip codes
Customer Spending (Previous 2 Months): values: <$10, $10-$50, $51-$100, >$100
Customer Visits (Previous 2 Months): values: <1, 1-4, 5-10, >10
Feedback: values: Love, Like, So-so, Dislike
The filters may also be referred to as attributes herein.

Figure 11:
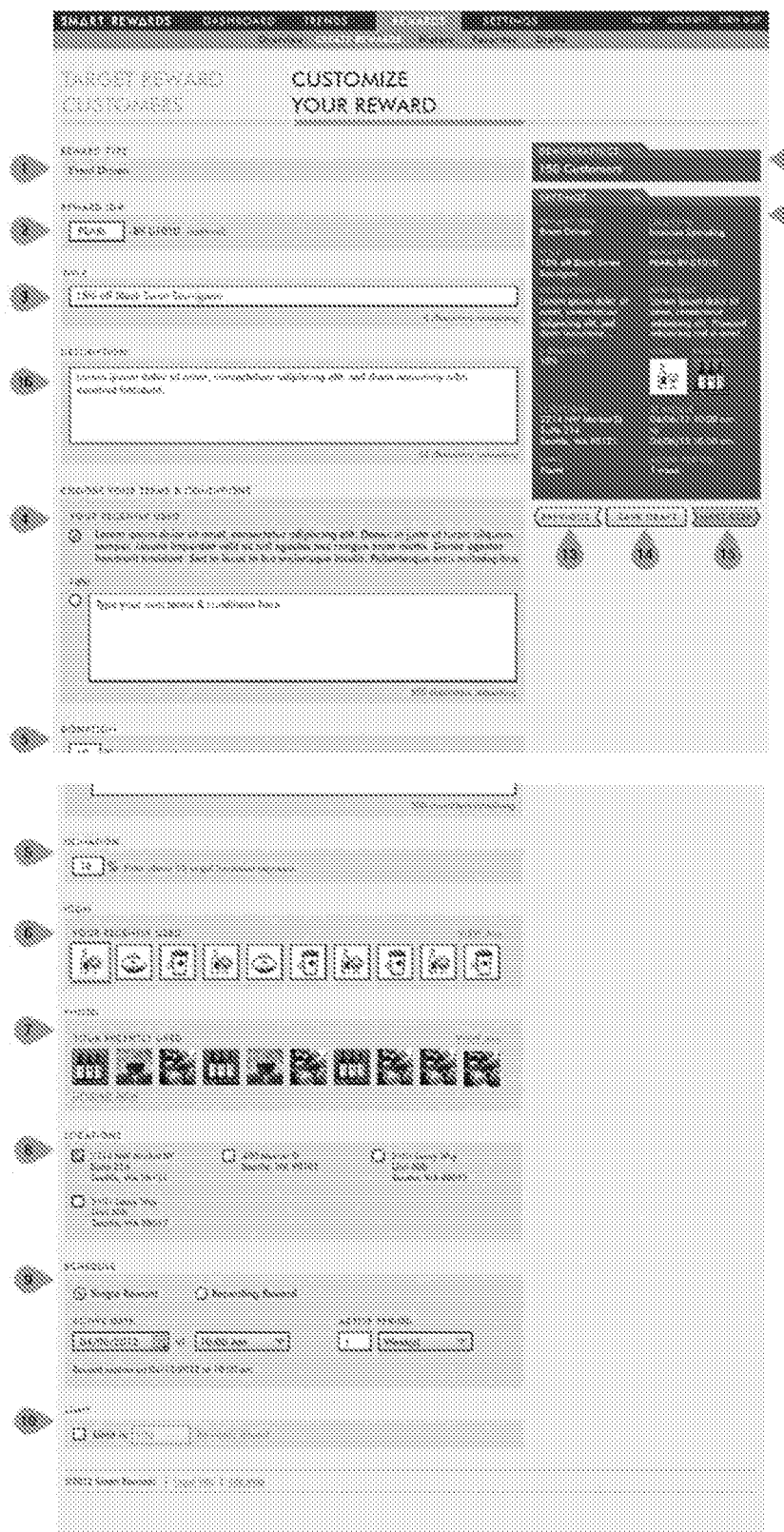
FIG. 11 illustrates an interface screen for customizing an incentive in accordance with example embodiments.

FIG. 11 illustrates an interface screen for customizing an incentive.

Item 1 illustrates the type of reward that is being created. In this example the reward is an event driven reward.

Item 2 illustrates the Reward ID. The reward ID may be pre-populated by the loyalty system 26 and is the same as the barcode number for the incentive to create a linking between them. The reward ID may not be edited. The prefix may be optional and the Merchant may add an alphanumeric prefix to the reward ID.

Item 3 illustrates the Reward title which is a short description of the reward.

Item 4 illustrates the Terms & Conditions (fine print) for the incentive. The field may default to the previously used Terms & Conditions. There may be a character limit, such as 500 items.

Item 5 illustrates a Donation option. The donation allows the merchant to enter a donation rate for the reward. This donation may be provided to a charity (as described in relation to FIG. 2). In this example 18% of the incentive value or transaction total may be donated to charity.

Item 6 illustrates Icons for the incentive. A user can select from a series of stock icons. The first one may be selected by default. Selection will cause a highlight to appear around the icon.

Item 7 illustrates a Photo for the incentive. A user can select from a number of recently used images or upload a new image. If recently used images exist, the first one may be selected by default.

Item 8 displays the addresses for all store locations. The Merchant can select one or multiple locations. The first location may be selected by default.

Item 9 illustrates the Schedule section which may allow the Merchant to set the Start/Publish date and the period a reward is valid for. A single reward may be selected by default. The incentive may also be a repeating reward. There may be an active date for the reward and an active period.

Item 10 illustrates the Limit which may set the total amount of people that can redeem a reward. This may add an additional text in the description and fine text that indicates that the number of redemptions is limited. Note: Limit may be a synonym for "Throttle."

Item 11 illustrates the Demographics Pane. The default state may be collapsed, and this may be expanded by selecting the expansion indicator.

Item 12 illustrates the Summary module which may be a floating element that may be always visible when users scroll up/down, and shows how the reward is being built. As the user enters information into the fields in the body of the page, that information may be propagated into the reward summary.

The summary pane may scroll vertically with the screen making it always visible/available. The functionality is nuanced to change alignment with the top or bottom of the window if the window is smaller than the summary vertical size.

Item 13 illustrates the "Previous" button to display the previous screen.

Item 14 illustrates the Save Draft button. When a Merchant selects "Save Draft", the state of the reward is changed to draft and the selections are saved.

Item 15 illustrates the "Next Step" button to display to the Preview Screen for the incentive.

There may be a Description field which provides a detailed description of the reward.

Figure 12:
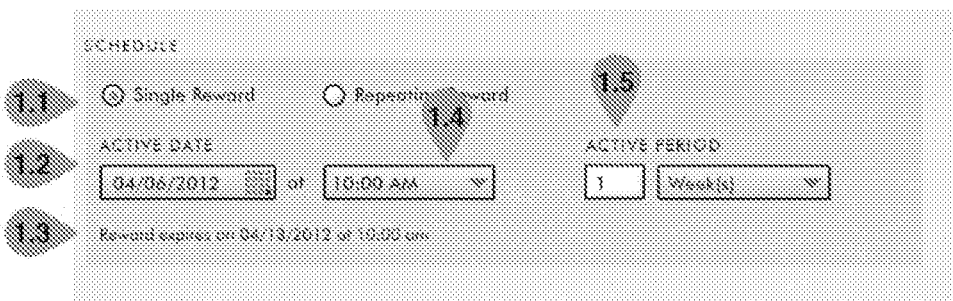
FIG. 12 illustrates an interface screen for customizing a reward schedule where the reward is a single reward (e.g. may be redeemed a single time) in accordance with example embodiments.

FIG. 12 illustrates an interface screen for customizing a reward schedule where the reward is a single reward. The example interface illustrates five example configurations.

Item 1.1 provides a Reward type. The default value in this example is Single (e.g. available for a single time). Any changes may be retained for the duration that the screen is displayed. Switching between Single and Repeating rewards displays the previously chosen values for each type.

Item 1.2 provides an Active Date. The default value may be the current date. This sets the date that the reward will become active. Both single and repeating rewards types start at this date.

Item 1.3 provides a Schedule Description, which may be a dynamic text string that displays the date and time the single reward will expire.

Item 1.4 provides an Active Time. The default value may be the beginning of the current hour. This works in conjunction with the Active Date to set the date and time that the reward will be published to customers and becomes active. The time drop down gives times in 1 hour increments e.g. 1:00 am, 2:00 am . . . 11:00 pm, 12:00 pm. All dates and times may be based on the merchant's time zone.

Item 1.5 provides an Active period. The default value for single and repeating rewards may be one week. This may be the amount of time (e.g. period of time) the reward is active. The text entry box will only allow entry of integers greater than 0. The values in the dropdown are: Day(s) and Week(s).

Figure 13:
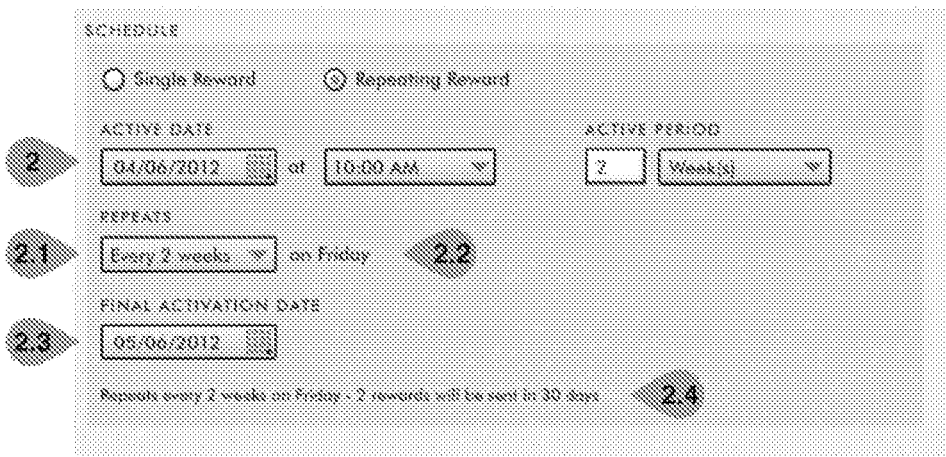
FIG. 13 illustrates an interface screen for customizing a reward schedule where the reward is a repeating reward (e.g. may be available multiple times) in accordance with example embodiments.

FIG. 13 illustrates an interface screen for customizing a reward schedule where the reward is a repeating reward (e.g. may be available multiple times). The example interface illustrates five example configurations.

The repeating of a reward allows the Merchant to automatically set a reward to re-publish on a regular basis. Repeating creates a new reward that is almost identical to the original, the only difference would be the publish and expiration date. The first reward becomes active on the start date and all subsequent rewards occur after the first reward has expired. Repeating rewards may not overlap.

Item 2 provides an Active Date. For repeating rewards the Final Activation date may be highlighted in the date picker for the Active Date.

Item 2.1 sets a repeating occurrence schedule. The default value may be "Every week" when Repeating reward is selected. This determines how often a reward will repeat. This value is always greater than the Active Period value. Options that are less than the Active Period may be disabled.

If the Merchant changes the Active Period value, the repeating occurrence schedule value may be re-set to an option that is equal to or greater than the Active Period value. Options include Every week; Every 2 weeks; Every Month; Every 3 months; Every 6 months.

Item 2.2 provides a Weekly Repeats Text. This value automatically updates to match the day of the week that the merchant selects as their Active Date.

For example, if Apr. 6, 2012 is a Friday "Every 2 weeks [selected] 'on Friday'". This is calculated as <same day of the week at the selected Active Date>. When the merchant switches the 'Active date' to the 7th, the text changes to ' on Saturday'.

Item 2.3 provides a Final Activation Date. Default value may be 6 months from the current date. This sets the last day that the reward can be repeated. This does not include the Active period. For example, a reward could repeat on the Final Activation Date and would still be active for the duration of the Active period. The Final Activation Date may not be set to precede the Active Date. The Active Date may be highlighted in the Date picker for the Final Activation Date.

Item 2.4 provides a Schedule Description, which may be a dynamic text string that displays repeating occurrence schedules and the count of rewards that will become active between the Active Date and the Final Activation Date.

FIG. 14 displays an interface screen for a preview of the custom incentive.

The Review and Publish screen allows Merchants to preview the reward, and publish the reward to customers.

Item 1 provides a reward preview button where selection changes the type of preview that is displayed in the preview area. This example shows a mobile version and a full screen version.

Item 2 provides a Reward Preview illustration to preview how the reward will look when published.

Item 3 provides an Edit button which triggers the display of the Customize screen with the data pre-populated. The Publish button displays the Confirm screen to confirm publication.

FIG. 15 displays an interface screen for a preview of the custom incentive in a mobile format.

FIG. 16 displays an interface screen for a confirmation screen of the custom incentive. This screen may display once the reward has been created and reading for publication.

Item 1 provides a Selecting View Reward button which triggers display of the Manage Rewards screen (e.g. reward details screen for the reward).

Item 2 provides a Go to Dashboard button to trigger the display the Dashboard 200 screen.

FIG. 17 displays an interface screen for creating an event driven incentive (as referred to in FIG. 6).

The event driven incentive may be tailored to recommend objectives by loyalty system 36 based on events. The example objectives shown are (a) address negative feedback, (b) reward spending, and (c) reward frequent visits.

FIG. 18 displays an interface screen for creating an event driven incentive with the objective of addressing negative feedback.

Item 1 provides a graph of customer reviews. This graph displays customer responses to the customer experience survey question. It displays the totals for each response. Disliked and Hated responses are highlighted for this example.

Item 2 provides descriptive text. This text explains the graph and gives recommendations on types of members to target.

Item 3 provides a feedback filter. This allows the choice of targeting Members who chose Disliked or Hated for the customer experience survey question.

FIG. 19 displays an interface screen for creating an event driven incentive with the objective of rewarding spending.

Item 1 provides a graph of customer spending. This graph displays the total cumulative spending of all customers. The highest spending customer group is highlighted.

Item 2 provides descriptive text. This text explains the graph and gives recommendations on types of members to target.

Item 3 provides a Total spent filter. This allows the targeting of customers who have spent over a certain threshold amount.

FIG. 20 displays an interface screen for creating an event driven incentive with the objective of rewarding frequent visits.

Item 1 provides a graph of customers visits. This graph displays the breakdown of customers by their total number of transactions (cumulative). The high frequency buckets are highlighted in this example.

Item 2 provides descriptive text. This text explains the graph and gives recommendations on types of members to target.

Item 3 provides a Total Visits filter. This allows the targeting of customers who have visited over a certain threshold amount.

There may be a Customize screen for automatic or event-driven rewards which may be similar to the Customize screen for "Custom" rewards (described herein).

The Preview screen for automatic rewards may be the same or similar to the Preview screen for "Custom" rewards (described herein).

The Confirmation screen for automatic rewards may be the same or similar to the Customize screen for "Custom" rewards (above).

FIG. 21 displays an interface screen for creating an incentive from a sample.

A menu of option buttons may be displayed. Selecting one of the buttons on this page will take the user to the "Custom Reward—Demographics Screen" (described herein). On the "Customize Screen", the title and description fields will be pre-filled with the text based on the sample.

Item 1 provides the Page Title.

Item 2 provides a sample reward with a Reward Title (e.g. 10% off [product]) and a Reward Description (e.g. Receive 10% off this product with this reward).

Item 3 provides another sample reward with a Reward Title (e.g. Happy Hour) and a Reward Description (e.g. Come in between [time] and [time] for 10% off of purchase).

Item 4 provides a further sample reward with a Reward Title (e.g. Buy One, Get One Free) and a Reward Description (e.g. Buy one product and receive an additional product of equal or lesser value, free of charge).

Item 5 provides another sample reward with a Reward Title (e.g. 10% off Purchaser) and a Reward Description (e.g. Receive 10% off your total in-store purchase on all items).

Item 6 provides a further sample reward with a Reward Title (e.g. Charity Happy Hour) and a Reward Description (e.g. Come in between [time] and [time] and we will donate 5% of purchase total to [charity]).

FIG. 22A provides an interface screen with example trend alerts. The interface may enable a merchant to view and manage alerts. Alerts provide a notification to a user of system (e.g. a merchant) regarding data analytics. The alert notification may include one or more suggested objectives for an incentive, one or more suggested incentives, trends, and other information regarding customers and transactions.

For example, the suggested objectives may be to attract a new group of customers (e.g. targeted demographic, gap in demographic of existing customers), bring in more customer during off peak or slow periods, increase the frequency of visits or spending from existing customers, and so on. Each alert may be associated with a date and status (new, past).

For the objective to bring in more customer during off peak or slow periods an trend alert may be generated to identify time ranges or days of the week when the merchant is historically not busy (e.g. by analyzing data for the merchant or data averages from other similar businesses and merchants). The alert may include suggested incentives targeting the time ranges or days of the week when the merchant is historically not busy.

Another objective may be to respond or be notified of particular events. Trend alerts may be generated to notify the merchant of negative feedback received via reviews, social media platforms, and so on. An alert for negative feedback may or may not include a reward suggestion.

For the objective to increase or reward spending from existing customers, trend alerts may be generated to notify the merchant of a customer who has achieved a high spending threshold, or is below a low spending threshold. The high or low spending threshold may relate to a single visit or may aggregate spending from multiple visits for a predefined or infinite period of time. An alert for high or low spending threshold may or may not include a reward suggestion.

For the objective to increase the frequency of visits from existing customers, trend alerts may be generated to notify the merchant of a customer who has achieved a high number of visits threshold. The high number of visits threshold may be compared to an aggregated number of visits over a predefined or infinite period of time.

The Manage Alerts interface screen allows the merchant to see a listing of all alerts. The default sort is by date, with the newest alerts at the top of the list. This may be user configurable. Dismissed alerts are displayed below alerts that have not been dismissed, for example.

A Filter Section (1) may allow merchants to select a set of Alerts within a category. That is, each alert may be associated with a different category. If the Merchant has no alerts within a category, that category is not displayed.

Status filter may filter alerts based on the associated status. Clicking one of the status filters may display only the alerts with that Status. The default Status is "All". This may be user configurable.

Alert Type filter may filter alerts based on alert type. Clicking one of the alert type options displays only that type of alert. The default option is "All". This may be user configurable. If the Merchant has no alerts of a certain type, that option is not displayed.

Headers (2) (e.g. date, title, status) may allow for sorting by their respective field. Clicking on the header sorts ascending on first selection. Selecting a second time sorts in descending order.

Alerts (3) may be associated with a date, title, and status. Clicking anywhere on an Alert may trigger the display of the Alert Details.

Alerts may be associated with a status. The status may be New by default. Alerts that have been viewed, dismissed or have been used to create a reward or incentive have a status of Past.

An alert may provide a notification of an event or data analytics trend that may or may not be used to generate an incentive. An alert may or may not include a recommended incentive.

A merchant may want to view a list of current and past alerts. A merchant may want to be able to sort the list of alerts that they have received by new or all, or other parameter or attribute. A merchant may want to be able to dismiss an alert that they do not want to take action on. A merchant may want to view the details of past or current alerts.

FIG. 22B provides an interface screen for a First Time Merchant Message, which mat display for the new Merchant that has never had an alert.

FIG. 23A provides an interface screen with an example trend alert, which may include recommendations for incentives. The example trend alert may relate to the objective of bringing in or targeting a group of customer by e.g. demographic data analysis. This illustrative and non-limiting example targets women under age 18 and men between age 30 and 44.

Loyalty system 26 may include a recommendation engine 60 to recommend incentives targeting customers having particular attributes. This example provides an indication to merchants of gap in their customer demographics to recommend incentives to fill those gaps. Recommendations may be referred to herein as alerts. A type of alert may be a suggestion or recommendation for an incentive, for example. The suggestion may be based on data analytics based on rules configuring thresholds or triggers.

Item 1 provides Alert Pagination. This displays the index of the current recommendation and the total number of recommendation.

Item 2 provides Alert Type. Displays the type of alert. Examples include a gap in demographics, slow-time trend, reward repeats, etc.

Alert Triggers may define alert types and recommendations using business rules. Examples may include increase your per-transaction average, bring in a new group of customers. The Alert Trigger may be compared to data collected by system and defined by a rule. If the data collected by the system matches a rule then the corresponding alert may be triggered and generated.

Item 3 provides an Alert description. The alert description may be generated by loyalty system 26 based on a set number of type of alerts and associated description data. The descriptions may be generic with tailoring from the loyalty system 26 e.g. customer counts, or may be used defined.

Item 4 provides an Alert visualization. This displays visualizations that are appropriate to the type of reward. The graph is based on the Merchant's and/or Card Issuer data to help clarify the type of alert/issue.

Item 5 provides a Create reward or incentive button. This button takes the user to the appropriate demographics screen in the Create Custom Rewards. It pre-populates the demographics and setting screens with options based on the recommendation for the incentive. System may associate recommendations for incentives with alerts and objectives. When an alert triggers then the associated incentive may be provided in the alert as a recommendation. For example, the objective associated with a recommendation may be to increase per-transaction spending average, bring in or target a new group of customers, increase frequency of visits, and so on.

Creating a reward from an alert or viewing an alert may change the alert status to Past. The recommendation may be provided in a notification message to prompt for the user's attention. Creating a reward or incentive may be response to an alert.

Item 6 provides a Dismiss button. This may change the status of the Alert to Past. The dismiss button displays the next alert in the system. If it is the last alert and the dismiss button is clicked, the previous screen is displayed. Dismissed alerts may be tagged as past and sorted by date as with all other past alerts. On the alert detail page, a merchant may dismiss the alert by e.g. clicking the dismiss button, which may change the status of the alert from New to Past. Clicking the dismiss button may sort the alert by date with the other past alerts. Clicking the dismiss button may change the visual appearance of the button to indicate that the alert has been dismissed.

The interface provides a merchant with a view of a list of current and past alerts.

There are different actions the merchant can take that will update the status of an alert from 'new' to 'past.' For example, viewing an alert in the detailed page view may update the status of an alert. As another example, pressing the 'dismiss' button may update the status of an alert. 'New' and 'past' are examples only and other statuses may be 'saved', 'flag', and so on, so merchants will be able to view alerts in detail while bookmarking them for later action.

System is operable to identify trends (also referred to as alerts) using data analytic techniques and a rules engine defining rules for thresholds, events, and so on. An example event for alert notification includes customer feedback.

An alert may also provide an automated suggested reward (event-driven rewards). Merchants may receive notifications about automated rewards that are sent out on their behalf based on system events (for example, event-driven one such as system recognition of a demographic gap) or a merchant-set schedule (for example, a repeated reward). The types of events that merchants will be able to create automated rewards (via e.g. rules managed by the rules engine) for include negative feedback related reward, frequent visits reward, spending threshold reward, and so on.

The interface for alerts and rewards may provide a summary of the rewards sent and redeemed. When rewards are sent out on behalf of a merchant notification may be added to the interface as an alert, for example. The interface may show all rewards sent, with the most recent one at the top, for example. Rewards that are automatically sent may be indicated with an icon or other indicia to set them apart from other rewards.

A merchant may receive negative feedback and a reward may be automatically sent to the provider of the feedback. There may be a verification mechanism to ensure that this is not manipulated by a customer to receive additional rewards or incentives based on false feedback.

A merchant may click on the icon related to the feedback reward alert to view the details page and from there can create a Reward or Automated reward to respond. For example, a merchant may set up automated reward for 'negative feedback' and when the merchant receives a new instance of negative feedback a reward is sent out on the merchant's behalf. There may be a 'history' section where the merchant sees when and why a reward was sent on his behalf.

There may be various interfaces to collect and display the various types of notifications or alerts, such as for each of the specific type of notification (e.g. automated rewards alerts, feedback alerts, system-identified trends for, gaps in demographics trend alerts, slow time trend alerts, and so on. Trends may be identified based on comparison data from the merchant over time, and compared with merchants in their region, or historical data for the same merchant, and so on.

There may be a dedicated interface for trends alerts observed by the system such as slow time and gap in demographics, negative feedback trends (e.g. x times of negative feedback received within timeframe y, or in a more generic way such as 'Change in review feedback rating'). System calculates gender related alert algorithms based on male and female gender designations in order to trigger alerts about gaps in coverage of the market segment. This may ensure that only cardholders in the gender groups are factored into alerts. Cardholders within the group may not be accounted for as a distinct group in demographic alerts.

There may also be an event alert interface, such as for customer feedback. Merchants may receive notifications when new customer feedback has been received. The system may not discriminate between the nature of the feedback received (in other words, it may not count only 'hate' responses or only 'love' responses). Any time a new piece of feedback is received, a notification counter on the 'feedback' module within the merchant dashboard may increase. In other embodiments, an alert may be generated for specific types of feedback (e.g. negative). The merchant can view the review and decide to send a reward to an individual or to create an event-driven (automated) reward.

An alert may be triggered by the system when the percentage of business customers of a particular gender is significantly different than the baseline of cardholders of that gender within the region. An alert may be triggered by the system when the percentage of business customers of a particular gender is significantly different than the baseline of cardholders of these respective genders within the region. An alert may be triggered by the system if the percentage of business customers of a particular gender and within a particular age range is significantly different than the baseline of cardholders in the region within both groups. An alert may be triggered if the percentage of business customers of a particular gender and within a particular age range is significantly different than the baseline of cardholders in the region within these respective gender groups.

Interface may provide a merchant with a Gap in Demographics Alert and a view a graph representing the number of customers by age group and gender across a period of time so that the merchant can make a decision about creating a Gap in Demographics reward or incentive which may be provided as a recommendation. On the Alert Detail screen for a gap in Demographics alert, a merchant may be able to view a graph representing the number of customers for one store by age group and gender. The Y axis may represent the number of member customers for that merchant. The X axis may represent age by age buckets. For example, age may be grouped as: 18-29, 30-44, 45-64, 65+. Each age group may display two different bar graphs rising vertically from the x axis, associated to gender. A key may be displayed that explains the bar graph that represents each gender bar. For example, one set of bar graphs represents the number of members who are women and are an age that falls within the respective age group range. A second set of bar graphs represents the number of members who are men AND are an age that falls within the respective age group range. The graph pulls data from all member customers of the store who are currently active and have an activation date earlier than an overall time period (e.g. 3 months ago). A gap in demographics may be defined using a rule to trigger generation of an alert. If the percentage of a merchant's customers of a particular gender is significantly different than the baseline of members of that gender within the region, then system may issue an alert to the merchant. If the percentage of a merchant's customers within a particular age range is significantly different than the baseline of members within that age range within the region, then system may issue an alert to the merchant. If the percentage of a merchant's customers within a particular age range AND gender is significantly different than the baseline of members within that age range AND gender within the region, then system may issue an alert to the merchant. These are examples only.

System may use a Chi-square test to test to identify gaps, such as whether the observed percentage of a merchant's customers within a particular group is consistent with the known percentage of customers within that particular group in the region. Let O1 refer to Observed value (# of merchant's customers within a particular group), E1 refer to Expected value (% of customers in region within particular group * merchants total customers), O2 refer to the Merchant total number minus O1, where E2 may equal the Merchant total number minus E1. The chi-square calculation may be based on the following:

$$(O1-E1)^2/E1+(O2-E2)^2/E2$$

An example illustrative rule may provide that if chi-square is greater than 3.84 and O1 is less than E1 then system may identify Gap in Demographics and generate an alert. This is an example threshold value to indicate a significant difference. In order for chi-square test to be performed, two conditions may be met: merchant must have at least 25 customers AND O1 is less than E1. If merchant has 25 customers and one segment is 0, that segment may be also recognized as a gap.

Demographic gap alerts may be sent out periodically (e.g. weekly) until the gap no longer exists, for example. System may count a member as a merchant's customer if that customer has transacted at that merchant in last 3 months.

System may maintain transaction data from every member at each merchant: number of transactions, dollar spend. System may maintain demographic data for every member: age, gender, zip code. A member may be counted as active if there has been activity either on the account or if there has been a transaction in the last year, or other defined time period.

System may continually identify the baseline demographic distributions for a region. For example, system may calculate a percentage in each age range (0-17, 18-29, 30-44, 45-64, 65+), a percentage male or female, a percentage male or female in each age range (0-17, 18-29, 30-44, 45-64, 65+), and so on. System may calculate demographic distribution for each merchant's customers. As another example, system may calculate a total number in each age range (0-17, 18-29, 30-44, 45-64, 65+), a total number male or female, a total number male or female in each age range (0-17, 18-29, 30-44, 45-64, 65+), a total number of merchant's customers, and so on.

System may generate different types of trend alerts, such as a slow time of day or date of week alert. For a time of day alert, if the average dollar volume per hour for a particular hour of the day is below the overall average dollar volume per hour for all hours, then system may identify a slow time of day and generate an alert. As an illustrative example, system may calculate an overall average number of transactions per hour for all hours for the last 3 months (i.e. total number of transactions/total hours of operation in last 3 months). System may also calculate the average transaction dollar volume per hour that the merchant store is open for last 3 months. (total number of transactions for each 1 hour period across all days in the last 3 months/total number of days that merchant store was open at for that 1 hour period in last 3 months). For a day of the week alert, system may calculate an overall average number of transactions per day for all hours for the last 3 months. (i.e. total number of transactions/total days of operation in last 3 months), as an illustrative example. System may also calculate an average transaction dollar volume per day that the merchant store is open for last 3 months. (total number of transactions for each day of the week the merchant is open across all days in the last 3 months/total number of days that merchant store was open at for that specific day of the week in last 3 months). If the daily average differs from the overall average then system may generate an alert. Calculations may only include the hours within which the merchant store is open for business (i.e. if merchant store is open 9 AM-5 PM on Mondays through Fridays, 9 AM-8 PM on Saturdays, and 10 AM-4 PM on Sundays, only those hours should be used). If there are multiple slow times of day, identify the two with the biggest differences from the average.

Alerts may be issued for each store or merchant periodically, such as once a week until the merchant has taken action or the underlying data has changed and a reported slow period is no longer a slow period.

FIG. 23B provides an interface screen with further example recommendations or alerts. This example targets off peak times. The trigger may define a threshold spending or number of visits, and data analytics may determine a time-of-day or day-of-week range where the historical spending is below the trigger threshold.

Alert chart can be either Transactions by Time-of-Day (as shown) or Transactions by Day-of-Week (in which case the header may be "Transactions Per Day"). The graph may enable a user or loyalty system 26 to determine slow or off peak times. The chart may display the off peak current data with average data to benchmark different time intervals against the average. Off peak may be defined by a threshold or rule used to trigger the alert.

Interface may provide a merchant view for an Off-Peak Alert, so that the merchant may be able to view a graph of average transactions per hour throughout the business hours of a particular day. This may enable a merchant to make a decision about creating an Off-Peak reward or incentive, or provide merchant with a recommendation. The slow day graph may show: the average dollar spend amount per business hour-of-day over the past overall time period, an average dollar spend amount per business hour, for all business hours over the past overall time period, and an indication where the average per hour-of-day is less than the overall average per day. For example, days of week may be replaced by hours of day. So: 8 am-9 am, 9 am-10 am, etc. An Alert Detail screen for an alert may enable a merchant to view a graph representing the average transactions per hour across one day at one merchant store. The y axis may represent average number of transactions. The x axis may represent time of day. Data points for time of day on the x axis may be measured on an hourly basis. Average transactions may be generated using data from the past overall time period. Average transactions per hour that the merchant store is open in a day may be generated using total transactions data and business hour data over the past overall time period (e.g. three months). For example, a total transaction dollar volume for 8 AM/total number of days that merchant store was open at 8 AM in last 3 months.

Business hours for each individual store may be pulled from information entered by the merchant when managing the merchant profile. The time labels that appear on the x axis may change dynamically, depending on the defined hours for that business. Hours may be defined by Business Rules. Identified Off-Peak hour segments may be highlighted on the graph.

There may be different types of alerts for slow times' trends. For example, there may be an alert for a Slow time of day triggered by a rule that indicates, for example, if the average dollar volume per hour for a particular hour of the day is below the overall average dollar volume per hour for all hours, then identify a slow time of day. There may be an alert for a slow day of week. If the average dollar volume for a particular day of the week is below the overall average dollar for all days of the week, then identify a slow day of the week.

The data collected and computed by the system to determine whether an alerts should trigger may include an overall average transaction dollar volume per hour for all hours for the last overall time period (e.g. 3 months) (i.e. total transaction dollar volume/total hours in last 3 months), an average transaction dollar volume per hour that the merchant store is open for last overall time period (i.e. total transaction dollar volume for 8 AM/total number of days that merchant store was open at 8 AM in last 3 months), and so on. Calculations may only include the hours within which the merchant store is open for business (i.e. if merchant store is open 9 AM-5 PM on Mondays through Fridays, 9 AM-8 PM on Saturdays, and 10 AM-4 PM on Sundays, only those hours should be used).

For time of day alerts, if there are multiple slow times of day, then an alert may identify the biggest differences from the average. For day of week alerts, if there are multiple days of the week, an alert may identify the one with the biggest differences from the average.

FIG. 23C displays an interface screen that may display if the merchant has already created a reward from an alert. The See Reward Button may take the merchant to the Reward Detail page of the reward the merchant created to address this alert. The label of this button may change once a reward is created. The Dismiss Button may take the merchant back to the Alerts List page and changes the status of the alert from 'new' to 'past'.

The following example algorithm may be implemented or configured by system to determine slow times or off peak periods. A slow time of day may be defined as one or more rules or thresholds. An example rule may provide that if the average dollar volume per hour for a particular hour of the day is below the overall average dollar volume per hour for all hours, then identify a slow time of day.

The data collected by the system for a Time of Day Alert (e.g. off peak time of day) may include an overall average number of transactions per hour for all hours for an overall period of time (e.g. the last 3 months). That is the data may be used to determine a total number of transactions/total hours of operation for an overall period of time.

The data collected by the system for a Time of Day Alert may include an average transaction dollar volume per hour that the merchant store is open for an overall period of time (e.g. last three months). That is the data may be used to determine the total number of transactions for each time (e.g. hour) period across all days in the overall period of time/total number of days that merchant store was open at for the time period in overall period of time.

The data collected by the system for a Day of Week Alert (e.g. an off peak day of the week) may include an Overall average number of transactions per day for all time periods (e.g. hours) for an overall period of time (e.g. the last 3 months). That is the data may be used to determine the total number of transactions/total days of operation in the overall period of time.

The data collected by the system for a Day of Week Alert (e.g. an off peak day of the week) may include an Average transaction dollar volume per day that the merchant store is open for an overall period of time (e.g. the last 3 months). That is the data may be used to determine the total number of transactions for each day of the week the merchant is open across all days in the overall period of time/total number of days that merchant store was open at for that specific day of the week in the overall period of time.

If the daily average differs from the overall average then an alert may be triggered.

The calculations may only include the hours within which the merchant store is open for business (i.e. if merchant store is open 9 AM-5 PM on Mondays through Fridays, 9 AM-8 PM on Saturdays, and 10 AM-4 PM on Sundays, only those hours should be used).

If there are multiple slow times of day, then the alert may identify those with the biggest differences from the average. As an example, the two biggest differences from the average may be provided in the alert.

Alerts may be issued for each store/merchant once a week until the merchant has taken action or the underlying data has changed and a reported slow period is no longer a slow period.

A negative feedback reward or alert may be triggered when a cardholder completes a review and responds with a so-so or dislike (depending on which the merchant selects).

For high spending and number of visits thresholds alerts, the system may check each threshold for a merchant when the transaction is entered in the system.

This alert data analysis process may triggered daily by the loading of the transaction file. When the transaction files are loaded into system the data may be analyzed to determine whether any alerts trigger and should be generated.

FIGS. 24 and 25 provide an interface screen with customer demographics trends. Customer demographics are examples of customer attributes.

Item 1 provides a Customer Transactions Graph which displays the total number of customers, the number of transactions from returning customers and the number of transactions from new customers over the specified time frame.

Item 2 provides a Customer Visits Graph which displays how frequently Members make a transaction in the specified time frame.

Item 3 provides a Customer Spending Graph which displays how much customers spent per visit. "Average spent per customer" may be calculated by including all customers who have transacted at a specific merchant to find the average spent per customer for that specific merchant during the selected time frame.

Item 4 provides a Customer Age Groups Graph which displays a line for each age group. Each line details the number of customers in that age group over the time frame specified. The "Average age" may be calculated by including ages of all customers who have transacted at a specific merchant during the selected time frame.

The age key/index lists age groups and total number of customers in each age group that transacted in the specified timeframe. It is sorted by the total number of customers in descending order.

Item 5 provides a Customer Age & Gender Graph which displays the customer age breakdown for male customers and female customers.

Item 6 provides a Zip Code Graph which displays the zip codes associated with customers (depending on data availability from partner company) and the number of customers associated to that zip code. The zip codes are sorted by the total number of customers in descending order.

Item 7 provides a Location Drop-down which shows all merchant locations by default. When a location is selected, it shows the first line of the location's address. Choosing a location in this dropdown filters the data for the graphs and statistics to the chosen location. This dropdown may expand to accommodate differing lengths of texts.

Item 8 provides a Date Pickers which sets the time frame for the data set. The default time frame is set to the last 30 days of data. The time frame limits the data for all graphs displayed in Trends Demographics.

Item 9 provides an Index which allows the user to navigate to the different sections by clicking on one of the values.

FIG. 26 provides an interface screen with customer performance trends.

Item 1 provides a revenue drop down which allows the Merchant to change the data type that is displayed. Options: Revenue, Transactions and Donations.

Item 2 provides a date picker which sets the time frame for the data set. The default time frame is set to the last 30 days of data.

Item 3 provides a graph area which displays graphs of Total Program Revenue, Total Reward revenue and revenue for any selected rewards.

Item 4 provides a Rewards listing which lists all the rewards that were active in the specified time frame. Selecting a reward makes the revenue graph for that reward appear. The list is sorted by start date in descending order.

Item 5 provides a Rewards detail icon which links to the reward details page for that reward. It is hidden for non-selected rewards.

Item 6 provides a timeline control which allows the Merchant to set the time frame of the data by dragging the timeline controls to the desired start and end dates. The timeline bar shows the entirety of the data and gives a summary graph of total cardholder revenue.

Item 7 provides a timeline view picker which sets the length of the time frame. The length of the time frame is set relative to the last date (start or end) changed. If the end date was last changed it sets the duration to end at that date. If the start date was last changed it sets the duration to begin at that date. For example in the current screen the length of the time frame is 3 months. If the end date was the last changed to May 1st, selecting 1 month in the timeline view picker will change the start date to April 1st.

Example value of time-line links are:
1 W=7 days
2 W=14 days
1 M=30 days
3 M=90 days
6 M=180 days
1 Y=365 days
2 Y=730 days
5 Y=1825 days Item 8 provides a location drop-down which shows all locations by default. When a location is selected, it shows the first line of the location's address. When Merchant has only one location, the location drop-down is not shown.

FIG. 27 provides an interface screen with a performance reward hover mechanism.

Under Trends Tab, a user may select an example reward, such as 10% Off Any Bottle reward.

Item 1 illustrates that hovering over a reward highlights it and displays that reward's graph. The graph line of the reward being hovered over is thicker that the other graphs in this example.

FIG. 28 provides an interface screen with a performance reward hover mechanism. Under Trends Tab, a user may select a data point on the graph.

Item 1 illustrates that hovering over a data point in a graph may trigger the display an information overlay that displays the y axis values for all displayed graphs on that date. The value for the graph being hovered over is highlighted in this example.

As shown in FIG. 1, loyalty system 26 may include a cardholder interface module 62 operable to generate an interface display on a cardholder device (not shown). The interface may provide information about the cardholder, available incentives, merchants, loyalty programs, card issuers, transactions, products, and so on.

Cardholder device may be configured with various computing applications, such as loyalty program interface application. A computing application may correspond to hardware and software modules comprising computer executable instructions to configure physical hardware to perform various functions and discernible results. A computing application may be a computer software or hardware application designed to help the user to perform specific functions, and may include an application plug-in, a widget, instant messaging application, mobile device application, e-mail application, online telephony application, java application, web page, or web object residing, executing, running or rendered on the cardholder device to access functionality of loyalty system 26 and display an interface screen. Cardholder device is operable to register and authenticate users (using a login, unique identifier, and password for example) prior to providing access to applications and loyalty system 26.

Cardholder device is operable by a member, customer, cardholder, etc. and may be any portable, networked (wired or wireless) computing device including a processor and memory and suitable for facilitating communication between one or more computing applications of cardholder device (e.g. a computing application installed on or running on the cardholder device), the loyalty system 26.

In accordance with some embodiments, cardholder device may be a mobile computing device. A mobile computing device may be a two-way communication device with advanced data communication capabilities having the capability to communicate with other computer systems and devices. The mobile device may include the capability for data communications and may also include the capability for voice communications. Depending on the functionality provided by the mobile device, mobile device may be referred to as a portable electronic device, smartphone, a data messaging device, a two-way pager, a cellular telephone with data messaging capabilities, personal digital assistant, a wireless Internet appliance, a portable laptop computer, a tablet computer, a media player, an electronic reading device, a data communication device (with or without telephony capabilities) or a combination of these. Cardholder device may also be a desktop computer, or other type of computing device. Cardholder device may be connected within system 26 via any suitable communications channel. Cardholder device may also have additional embedded components such as a global positioning system (GPS), a clock, a calendar, and so on. Cardholder device may also be connected to and receive data from other devices that collect data regarding the user, objects associated with the user, and so on.

Cardholder interface 62 is operable to implement rules to retrieve data relevant to cardholder, customer, member. Cardholder interface 62 is operable to generate an interface rendering a display of the relevant data. The interface may be optimized for a mobile display screen, a full size display screen, a tablet display screen, etc. Cardholder interface 62 may receive configuration data regarding the cardholder device display screen to generate the optimized interface.

FIG. 29 illustrates an example interface for display on cardholder device. The interface provides an expiring view of an incentive.

Item 1 provides a Twist Control. This allows the user to navigate to different reward/incentives filters using a touchscreen interface. The default filter when the user first views this screen may be a Recent filter. The twist remembers a state for the current session and so any subsequent changes (filters chosen) may be remembered for the current session and the default would be used for future sessions.

Example twist values include:
All
Nearby
Recent
Expiring
Favorite Merchants
Saved The twist control may lock at the top of the screen when scrolling and may always be visible.

Item 2 provides a reward list item. The reward list item displays the reward icon, reward title, store name, donation rate and one relevant data point. Clicking on a reward takes the user to the reward details.

Item 3 provides a Group indicator. The group indicator demarcates the beginning of a new reward group. Rewards can be grouped by distance, publish date and expiration period. The groups change based on what filter is chosen. The groups are outlined in the relevant filter sections. If there are no rewards present in a group, that group indicator is not displayed.

Item 4 provides a Redeemed reward. Previously redeemed rewards are indicated by the reward having a different background, "redeemed" text above the reward title and the reward title being crossed-out.

Item 5 provides a Location Button. Tapping displays the Location Control which allows the user to set location by choosing any address in their profile or to use the device's location services (GPS, etc.). Changing location can affect results that are based or sorted by distance, e.g. Nearby rewards.

Item 6 provides a Favorite merchant indicator. This indicates that the reward is from merchant that the user had previously selecting as a favorite.

Item 7 provides a Saved for later indicator. This indicates the Member has saved the reward.

Item 8 provides a donation rate. Displays the donation rate of a reward, defaults to the merchant donation rate if there is no reward specific donation rate. The donation rate may only display when the rate is equal or greater than 5%.

Item 9 provides a Data point. The data point that is displayed is based on what filter is chosen and is detailed in the section dedicated to that filter screen. Possible data points are:
Distance. Distance in miles between the Member Location and the Merchant Location.
Date reward was published.
Expiration period.
Item 10 provides a Section header.

FIG. 30 illustrates an example interface for display on cardholder device in a default view.

This view may be displayed when a user selects an item under My Rewards Screen from Nearby Tab. This may display available incentives that are nearby a user's current location, work location, home location, etc.

Item 1 provides distance in miles between the Member Location and the Merchant Location.

FIG. 31 illustrates an example interface for display on cardholder device in an expanded reward view.

Item 1 provides a Reward Image.

Item 2 provides a Merchant name. Selecting this link takes the user to the Merchant details screen.

Item 3 provides a Favorite Merchant Indicator. Indicates that the Merchant Location was marked as a Favorite by the Member.

Item 4 provides a Distance between the Member Location and the Merchant Location.

Item 5 provides an Expiration. Number of days until expiration of the incentive.

Item 6 provides a Donation rate.

Item 7 provides a Redeem button. Selecting this button takes the user to the reward activation screen.

Item 8 provides a Map button. Launches a mapping application with the reward location inputted.

Item 9 provides a Call button. Launches a phone dialer with the Merchant Location number inputted.

Item 10 provides a Save button. This button marks this reward as saved. The link changes color and text, and becomes disabled if it has been saved.

Item 11 provides a Reward description.

Item 12 provides a Reward fine print (Terms and Conditions).

Item 13 provides a Store link. Displays Merchant Location Details.

FIG. 32 illustrates an example interface for display on cardholder device in a survey review view.

Item 1 provides a Back button. Tapping this displays the previous screen.

Item 2 provides an Edit button. Tapping this displays the Removing reviews from the lis-state screen.

Item 3 provides a Review list item. This displays information about a review. List items are sorted by date in descending order. Tapping a list item displays the Standard Question screen.

Item 4 provides a Transaction date. Item 5 provides a Transaction time. Item 6 provides a Merchant name. Item 7 provides a Pending review indicator. Item 8 provides a Transaction amount.

FIG. 33 illustrates an example interface for display on cardholder device in a remove survey items view.

Item 1 provides a Review check box. Multiple reviews can be selected using the check boxes.

Item 2 provides a Delete button. This is inactive by default. When one or more reviews are selected the button becomes active. Tapping the delete button deletes the selected items and displays the prior screen.

Item 3 provides a Cancel button. Returns the user to the previous screen without making any changes.

FIG. 34 illustrates an example interface for display on cardholder device in rating questions view.

The first survey question may be rating your experience.

Item 1 provides a Back button. This displays the previous screen or previous question with the selected response highlighted. If this screen was accessed from the rewards redemption screen, the BACK button may be replaced with a HOME button—which when tapped will display the Home screen or page.

Item 2 provides a Question text. There are may be a number of questions in the Provide Merchant Feedback flow—standard questions, open question, etc.

Item 3 provides a Left Rating icon. The rating icon to the left of the selection. It can be selected by tapping, or swipe-right-and-release. When selected the item is centered.

Item 4 provides a Selected Rating icon. The current selection (default is "Like").

Item 5 provides a Right Rating icon. The rating icon to the right of the selection. It can be selected by tapping, or swipe-left-and-release. When selected the item is centered.

Item 6 provides a Next button. Tapping Next displays the next question and does not submit any data to loyalty system 26. Data is submitted using the Submit button.

Other questions may be in the form of a yes/no question

FIG. 35 illustrates an example interface for display on cardholder device to ask a survey question. For example, the question may be "Did charity influence your purchase?Select Yes or No". This may prompt for additional details about the charity for use in incentive recommendations.

FIG. 36 illustrates another example interface for display on a cardholder device to ask a survey question. The final survey question may ask the cardholder to write a review for their experience with the merchant.

Item 1 provides an Open question. Item 2 provides a Comment field. This is a text entry field for the Member to type an optional entry. It may be limited to 200 characters, for example.

Item 3 provides a Submit button. This is may be active. Tapping Submit displays Thank You page and sends the survey data to loyalty system 26.

FIG. 37 illustrates another example interface for display on a cardholder device in response to receiving a survey or review.

Item 1 provides a Thank you message. Item 2 provides a Next Review button. Tapping this will take the user to the next review in the cardholders list of currently available reviews. If there are no more reviews to be completed or the review flow was accessed from the redeem reward screen then this button may not appear and the Done button will expand to fill the button area. Item 3 provides a Done button. Tapping this displays different screens depending on how this flow was accessed.

Members may access this flow in example ways: End of Redeem Reward experience and Tapping the Done button displays Home page, Reviews and Tapping the Done button displays the reviews list.

FIG. 38 illustrates an example interface for display on a cardholder device to provide an aggregated view of donations. As described herein, an incentive may involve a donation to a charity. As many users may transaction based on an incentive involving a donation a pooled amount of donations may be referred to as a community donation. A total amount of donations may be provided to a user as a way to further engage the user to make transaction, which may in turn result in donations.

Item 1 provides a Back button. Tapping links to previous page.

Item 2 provides a Community donation. Displays total amount raised in the program (i.e. within the footprint of the bank) as defined by business rules. The amount may or may not a subset of a time period (i.e. "year to date" or "this month").

Item 3 provides an Individual donation. Displays amount donated from member to the charity as defined in business rules. The amount may or may not a subset of a time period (i.e. "year to date" or "this month").

Item 4 provides Imagery and copy. Copy may be a previously configured message from the charity and pulled from a data storage device 32.

FIG. 39 illustrates an example interface for display on a cardholder device to provide an Interest Indicator.

Item 1 links to the home page. Item 3 provides the customer Interests (e.g. attributes). Interests may be collected in response to questions, in some example embodiments. Interests may be otherwise received such as through a text box, suggested listing, and so on. This example shows the number of interest questions answered. Clicking the interests link may trigger the display of additional questions allowing the member to indicate their interest, one question at a time. Item 4 display an individual donation for a charity. Item 5 displays settings for a user (e.g. password, username, notifications). Item 6 provides a link to contact an administrator. Item 7 provides a link to cancel a membership to a loyalty program.

FIG. 40 illustrates an example interface for display on a cardholder device to provide an interest question.

Item 1 provides a Back button. Tapping links to previous page. The example question is "How much do you like wine?" Item 2 provides an interest rating (e.g. dislike, like, love) by member displays. Default state shows member's rating in center position (e.g. like). Member can change rating and changing a rating is saved on change.

Rating interests from the Profile page may be similar to, but different than rating interest during the Initial Login experience. In the login experience, Members may be asked to rate 5 interests with the option to proceed to rate additional interests. Rating Interests from the Profile page allows members to provide rating one interest at the time with the option to 'keep going', until there are no more interests to rate, or until the Member selects 'Done'.

Item 3 provides a number of ratings for the user. Displays total number of Interests member has rated. Item 4 provides a Done button. Tapping saves the rating for the currently displayed Interest and links to the Profile page. Item 5 provides a Keep Going button. Tapping links to the next rated Interest or to an Interest that has not yet been rated.

The cardholder interface 62 may also be adapted to generate interfaces for a full size screen or tablet screen, for example.

FIG. 41 illustrates an example interface for display on a cardholder device to provide an overview of rewards.

Item 1 provides a Rewards Filter Bar. This allows the user to navigate to different reward filters. The default filter when the user first views this screen is the All filter. The Filter Bar remembers state for the current session and any subsequent changes (filters chosen) persist for the current session. The default is used for future sessions. Example values include:

All
Nearby
Recent
Expiring
Favorite Merchant
Saved

The filter bar locks at the top of the screen when scrolling and may always be visible.

Item 2 provides a Group indicator. The group indicator demarcates the beginning of a new reward group. Rewards can be grouped by distance, publish date and expiration period. The groups change based on what filter is chosen. The groups are outlined in the relevant filter sections. If there are no rewards present in a group, that group indicator is not displayed.

Item 3 provides a Reward list item. The reward list item displays the reward icon, reward title, store name. It can also display the donation rate and one relevant data point. Clicking on an item expands that item and displays additional information (see Rewards List Item Expanded). Rewards with donation rates 5% and above may be larger (height, icon and Reward Title text size).

Item 4 provides a Data point. The data point that is displayed is based on what filter is chosen and is detailed in the section dedicated to that filter screen.

Example data points are:

Distance. Distance in miles between the Member Location and the Merchant Location.

Date reward was published.

Expiration period. Days left before reward expires.

Item 5 provides a Donation rate. Displays the donation rate of a reward, defaults to the merchant donation rate if there is no reward specific donation rate. The donation rate may only be displayed when the rate is equal or greater than 5%.

Item 6 provides a Favorite merchant indicator. This indicates that the reward is from merchant that the user had previously selected as a favorite.

Item 7 provides a Location Link. Clicking displays the Location Control which allows the user to set location by choosing any address in their profile or to use the browser's location services (IP triangulation, etc.). Changing location may affect results that are based or sorted by distance, e.g. Nearby rewards.

Item 8 provides a Saved for later indicator. This indicates that the Member has saved the reward.

Item 9 provides a Redeemed reward. Previously redeemed rewards are indicated by the reward having a different background, "redeemed" text above the reward title and the reward title being crossed-out.

FIG. 42 illustrates an example interface for display on a cardholder device to provide an overview of rewards in an expanded view.

Item 1 provides a Reward Title. Item 2 provides a Reward Image. Item 3 provides a Merchant name. Selecting this link takes the user to the Merchant details screen. Item 4 provides a Distance between the Member Location and the Merchant Location. Item 5 provides an Expiration. Number of days until expiration. Item 6 provides a Donation rate. Item 7 provides a Save button. This button marks this reward as saved. The link changes color and text, and becomes disabled if it has been saved. Item 8 provides a Print button. The print button displays the Rewards Print Screen in a new browser tab. This marks the reward as redeemed in the system but is still displayed as an unredeemed reward until either a transaction is associated to the reward redemption or the reward is redeemed using the member mobile website. Rewards can be re-printed. Item 9 provides a Map button. This button activates a mapping application with the reward location inputted. Item 10 provides a Reward description. This displays the description and fine print with a maximum of 300 characters, truncated with ellipses at the end. Item 11 provides a Reward Details link. This link displays the Rewards Details Screen.

FIG. 43 illustrates an example interface for display on a cardholder device to provide a transaction feedback survey.

Item 2 provides a List Item. Selecting the list-item displays the Standard Questions Screen for that transaction. Item 3 provides a Date/time column. Presents the data and time of the transaction that triggered the review. Item 4 provides a Business Name column. Presents the name and address of the Merchant location the review is for. Item 5 provides a Based on Reward column. If the review was based on a redeemed reward, the title of the reward that triggered the review displays. Item 6 provides a Transaction amount presents the amount for the transaction that triggered the review.

FIG. 44 illustrates an example interface for display on a cardholder device to remove survey items.

Item 1 provides an Edit link. While in edit mode, clicking EDIT may do nothing and does not have a rollover state. Item 2 provides a Checkboxes allow the member to select one or more list-items. Item 3 provides a Delete button is inactive until the member selects a checkbox. Selecting removes any checked reviews. If all reviews were Deleted, then the page may go to the "No list-items (state)." Item 4 provides a Cancel button reverts back to previous state without deleting any items.

FIG. 45 illustrates an example interface for display on a cardholder device to provide survey rating questions. A survey question may be to rate your experience or rate a product.

Item 1 provides a Question. Item 2 provides Rating Selections. For example, the ratings may consist of four ratings (dislike, so-so, like, love) or yes/no ratings. The Like rating is selected by default. The Yes rating is selected by default.

Item 3 provides a Previous Question Button. When the first question displays (Overall experience with the merchant), this button may be disabled. When one of the rotating questions displays, the button may be enabled. Item 4 provides a Next Question Button. Selecting displays the next question.

FIG. 46 illustrates an example interface for display on a cardholder device to provide survey rating questions, with Yes/No Questions.

Other questions may be in the form of a yes/no question.

FIG. 47 illustrates an example interface for display on a cardholder device to provide a review field.

A survey question may ask the cardholder to write a review for their experience with the merchant.

Item 1 provides an Open Fixed Question. Item 2 provides a Comment Field. Text entry field. Contains advisory text encouraging the user to make an entry. May be limited to 200 characters, for example. There may be a dynamic Character Counter. This may be a text string with the number of characters. The number reduces in real time as the user types.

Item 3 provides a Submit button. This may be always active. Tapping displays the survey summary page and sends the survey results to loyalty system 26.

FIG. 48 illustrates an example interface for display on a cardholder device to display when a review is complete.

Item 1 provides a Dynamic Text Message. This may refer to the Business Name. Item 2 provides a Next Review button. Selecting displays the next review in the Member's list of currently available reviews. If there are no more reviews to complete this button is hidden, and the Done button expands to fill the space. Item 3 provides a Done button. Selecting DONE displays the Reviews Landing Page.

FIG. 49 illustrates an example interface for display on a cardholder device to provide information regarding a charity and a donation. This may provide an aggregated view of donations.

Item 1 provides a Charity branding and description. Item 2 provides a community donation. Displays total amount raised in the program (i.e. within the footprint of the bank). The amount may be a subset of a time period (i.e. not "year to date" or "this month"). Item 3 provides an individual donation. Displays amount donated from member to the charity. The amount may or may not be a subset of a time period (i.e. "year to date" or "this month"). Item 4 provides a Charity link. Clicking links to a charity web site.

FIG. 50 illustrates an example interface for display on a cardholder device to provide a list of Interest Questions.

Item 1 provides a Dynamic text. The text displays the number of interests the member has rated. Item 2 provides a number rated. Displays number of interests rated with a given value (such as "Love"). Item 3 provides a Rated Interests. These may be sorted alphabetically. Clicking displays an Edit Rating state (e.g. lightbox of rate interest control). Item 4 provides Unrated Interests. These may be sorted alphabetically. Clicking displays Edit Rating state (e.g. lightbox of rate interest control). When there are more than a predetermined number of unrated interests, the first column may have a minimum of the predetermined number of interests. The columns may have the same number of interests, except the last column, which may have fewer interests. When there are no unrated interests, the "5/30 interests expressed. How about . . . " copy may change, and the More button may not display. Item 5 provides a More button. Clicking displays Edit Rating state with first unrated interest displayed.

FIG. 51 illustrates an example interface for display on a cardholder device to provide an Interest Question.

Item 1 provides a, for rated interests, a highlighted value ("Hate" to "Love") that matches the rating. For unrated interests, the highlighted value is the "Like" value.

Item 2 provides a Done button. Clicking saves the rating and returns to page state with new ratings updated. Item 3 provides a Keep Going button. Clicking saves the rating and displays the next unrated interest. If the displayed interest is the last unrated interest, or if there are no unrated interests, this button does not display; the Done button is centered.

Figure 53:
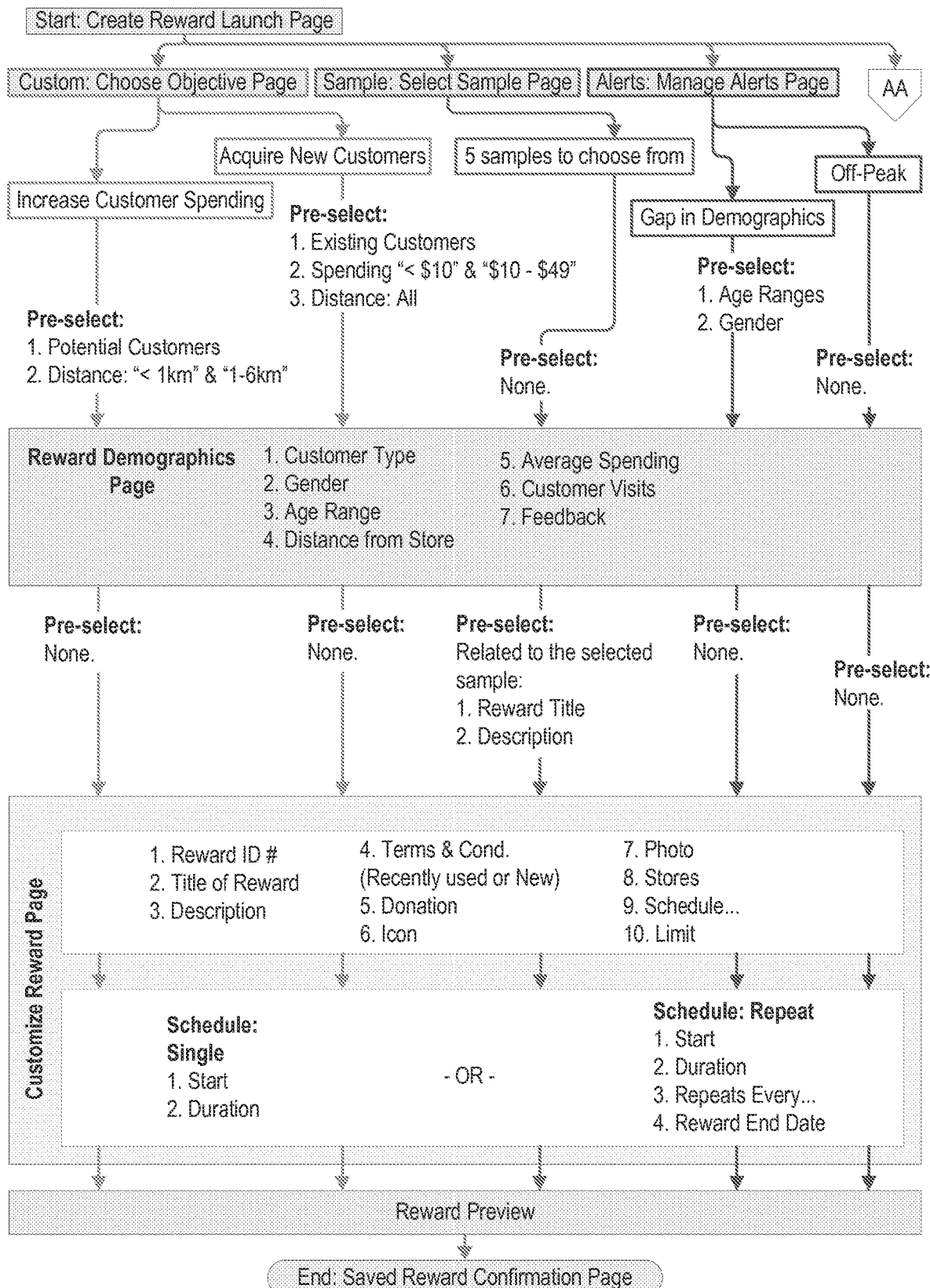
Figure 53A:
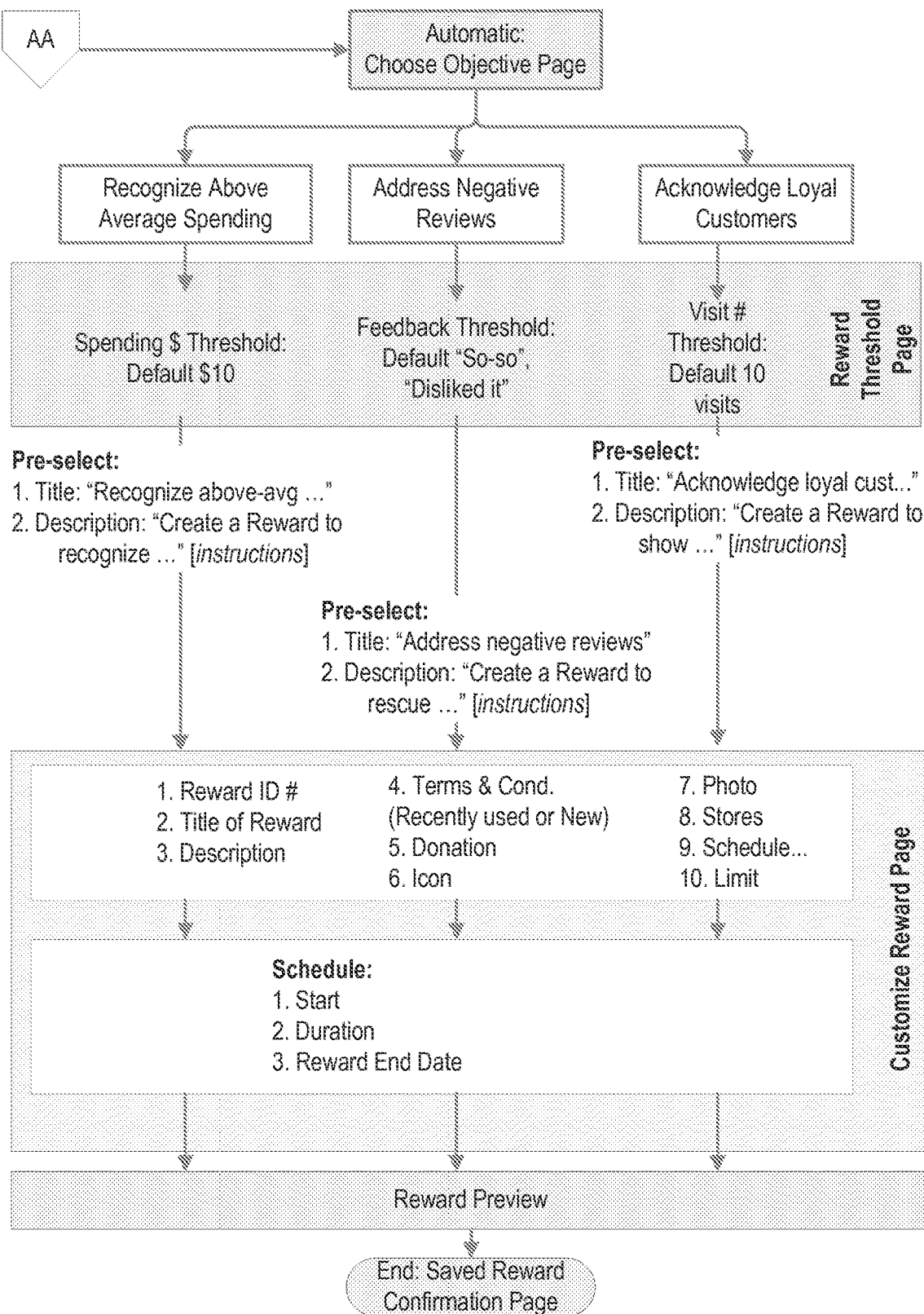
Figure 54:
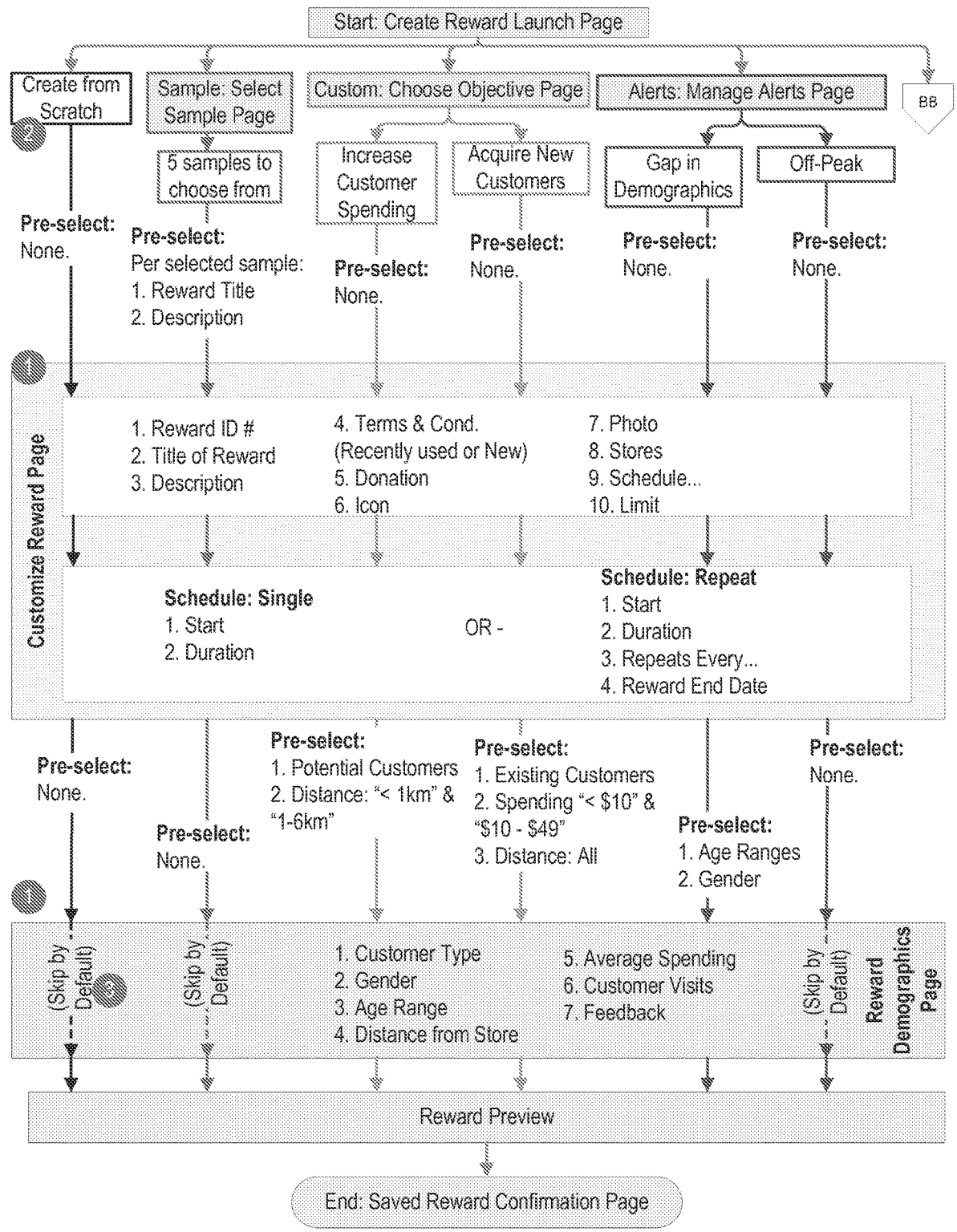
Figure 54A:
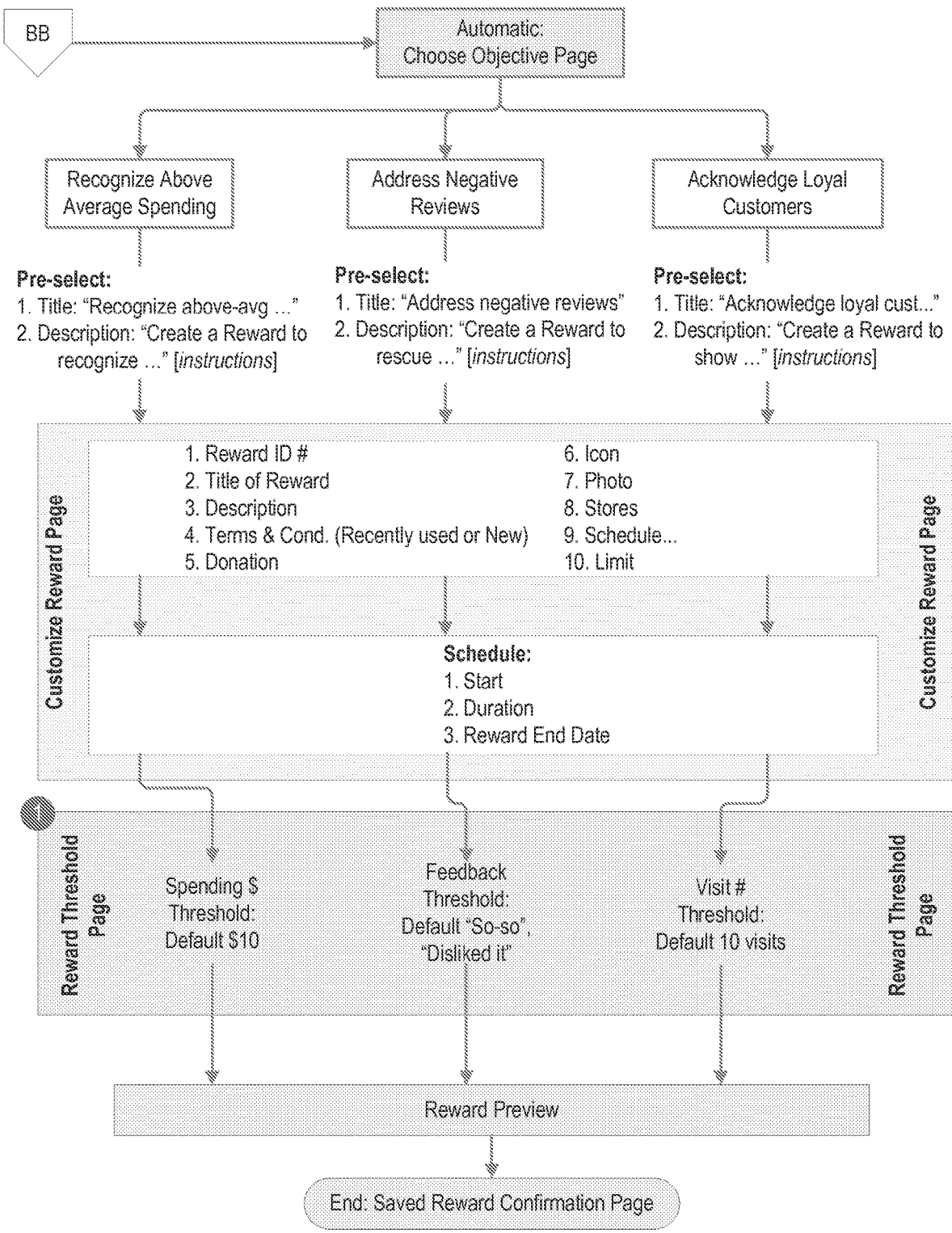

FIGS. 53 and 53A, and 54 and 54A illustrate flow diagrams for creating an incentive or reward in accordance with embodiments described herein. The incentive or reward may be created in response to a recommendation generated by system as described herein. The incentive or reward may be created in response to an alert generated by system as described herein. These are examples only and other events may trigger the creation of incentives or rewards. FIGS. 53 and 53A show an example flow for creating an incentive, and FIGS. 54 and 54A show another example flow for creating an incentive.

FIGS. 53 and 53A illustrates that a method for creating an incentive may begin with a create reward action or display view (e.g. user interface screen display). This may provide various actions or options, such as for example, an option to select a customized objective, an option to select a sample incentive for modification, an option to view and manage alerts (which in turn may trigger incentive creation), and an option to one or more sample or default objectives.

Examples of customized objectives include an objective to increase customer spending, an objective to acquire new customers, and so on. The customized objectives may enable selection of attributes for customers to tailor the incentive to, such as for example type of customer (potential customers, existing customer), distance from merchant location, spending thresholds, and so on. The customized objectives may trigger the display view of incentive and customer demographics, as described herein.

The option to select a sample incentive for modification may provide multiple samples or templates of incentives to select from and modify. The samples may also be linked to attributes for customers, such that different selected attributes result in providing a different set of samples.

The option to view and manage alerts (which in turn may trigger incentive creation) may display different types of alerts. As described herein alerts may be triggered based on trend analysis, events, and so on. Example alerts may relate to a gap in customer demographics, off-peak days or times, and so on. The alerts triggered may enable selection of attributes for customers to tailor the incentive to. Example attributes include age ranges, location, gender, and so on.

The display view of incentive and customer demographics (e.g. "Reward Demographics") may illustrate graphs, reports and charts for different customer attributes based on historical data, industry averages, similar merchants, the same merchant, predicted data, and so on. Example customer attributes include customer type, gender, age range, distance from merchant location, average spending, customer visits, feedback, and so on. The different customer attributes or demographics may be selected by the user for incentive creation.

A reward or incentive title and description may be received, provided, or otherwise determined or identified by system.

For the option for one or more sample or default objectives may, example objectives may directed to customers with above average or threshold spending, negative feedback or reviews, demonstrated loyalty, and so on.

The selection of a sample or default objective may trigger an incentive threshold display view. The thresholds for different objectives may be view, modified, and so on. The thresholds may be default values, customized values, and so on. For example, the spending threshold may be $10, the feedback threshold may be 'so-so' or 'disliked', the number of visits threshold may be 10 visits. These are non-limiting illustrative examples. The thresholds may be modified and selected to generate incentives for customers that fall meet the threshold.

A customize incentive display view (e.g. "Customize Reward") may create a data structure for maintaining data regarding the incentive in a persistent store. For example, the data structure may define different data fields for the incentive with corresponding values, such as for example, reward identification number, title, description, terms, conditions, donation for charity, icon, photo, stores, merchants, schedule, expiry date, limit, and so on. The schedule may indicate a single occurrence of an incentive, or a recurring or periodic occurrence of an incentive. The schedule may define a state date, a duration or end date, and so on.

A preview display page may provide a preview of the incentive prior to the incentive being made available to customers. The preview may trigger modifications to the incentive which may in turn result in a revised preview. The incentive may be saved for later review, modification, and dissemination.

A merchant may create different incentives for different customers, and so on. The incentives may be associated with donations to charities and the attributes may relate to charities. The charities may be recommended based on trends, and customer demographics.

At a high level FIGS. 53 and 53A, and 54 and 54A show different incentive creation flows where the order of "Customize Reward" and "Reward Demographics" actions or display views may vary. A business administrator may be able to define what an offer is before defining who can see an offer or use it for reward creation.

There may be a "Create from Scratch" display view (FIG. 54) that when clicked immediately takes the user to the "Customize Reward" display view or action without having to go through an intermediate display view.

On some flow paths for creating a reward, the "Reward Demographics" may be skipped or omitted. This may result in the reward being available to all members or customers.

With these flows it may be possible for a business administrator to easily create a simple reward with fewer steps for increased efficiency.

With reference for example to FIGS. 2, and 55-59, the loyalty 26 or other system may include a registration tool 90 or other module for autoboarding or otherwise streamlining or simplifying the registration process for a prospective member.

FIG. 55 shows an example method 5500 for registering members. At 5510, one or more processors of the loyalty 26 or other system (e.g. 38, 80, 40) can be configured to receive signals representing pre-enrollment data. The pre-enrollment data can include profile information associated with one or more prospective members. For example, the pre-enrollment data for a prospective merchant member can include information associated with that merchant such as a business name, number of stores, address, website, email address, phone number, business identification number, category, merchant identification (MID) number associated with a POS or other transaction terminal, contact person, and the like.

The pre-enrollment data can, in some examples, include information associated with multiple merchants. For example, the pre-enrollment data may be received as a spreadsheet file, a database file, a text file, a comma-separated value (csv) or other delineated file, or any other suitable data format or file. In some examples, the one or more processors may be configured to receive the pre-enrollment data from the card issuer system 38, the charity system 80, a data storage device 32, or any other source. In some examples, the pre-enrollment data can be received and/or parsed from business databases (e.g. Hoovers™), partner systems (from bank relationships, etc.), merchant acquirers, card brands, etc. In some examples, the data may be received over a network, or using web crawlers or any other data aggregation tool.

In one example as illustrated in FIG. 56, the one or more processors may be configured to generate signals for presenting an interface through which an administrator or other user can upload/import an identified file containing pre-enrollment data. In another example, as illustrated for example in FIG. 57, the one or more processors may be configured to generate signals for presenting an interface through which an administrator or other user can manually input pre-enrollment data.

In some examples, as illustrated in FIG. 56, the one or more processors may be configured to parse or otherwise associate the pre-enrollment data with profile fields. In some examples, the one or more processors may be configured to identify parsing errors or warnings about the pre-enrollment data. Errors or warning can include missing data, incorrect formatting, unknown fields/data, etc. In some examples, the one or more processors may be configured to generate signals for displaying the received data for confirmation/verification.

The pre-enrollment data can include some or all of the information required to complete all the profile fields in a member profile. In some examples, the one or more processors may flag pre-enrollment data for a prospective member as acceptable for pre-loading when each of a defined set of fields is filled. In some examples, the pre-enrollment data may be acceptable when any field is filled.

At 5520, the one or more processors may be configured to generate a unique registration identifier for each member included in the pre-enrollment data. Generating the unique registration identifier may include generating a random number or alphanumeric code, assigning an enumerated value from a list, or any other suitable manner for generating a unique value. In some examples, generating the unique registration identifier may include verifying that the generated identifier has not already been associated with another prospective member. In FIG. 56, the example unique registration identifiers are listed as 6-character claim codes; however, any other length or format of identifier may be used.

The unique registration identifier(s) can be associated with or otherwise stored in association with the corresponding prospective member profile information.

Upon generation of the registration identifier(s), the processor(s) can be configured to generate signals for displaying or communicating the registration identifiers. For example, the processor(s) can generate signals useful for distributing an identifier to a prospective member via an email, for printing a document for mailing or physically presenting to the prospective member, etc. In other examples, the processor(s) can generate signals for displaying the identifier(s) to a user which can be communicated to the prospective member via a phone call, sales visit, or other marketing initiative.

At 5530, the processor(s) can be configured to receive signals representing a registration request including the registration identifier associated with a requesting prospective member. The registration request or other registration message may be received, for example, via a webpage, an application or otherwise. FIG. 58 shows a portion of an example interface screen where a prospective member can enter information for a registration request including desired login credentials, and a registration identifier (e.g. claim number).

Upon receipt of the registration request and the registration identifier, the processor(s), at 5540, can be configured to generate signals for displaying an interface for creating and/or confirming the profile information associated with the received registration identifier. The interface can include a plurality of profile fields including in a member profile with at least one of the profile fields pre-populated with at least a portion of the profile information associated with the received registration identifier.

In some instances, this may shorten, streamline, or otherwise simplify the registration process for a new member because some or all of the new member's profile information has been pre-loaded into the system. In some examples, this may increase the likelihood that a prospective member will complete the registration process (instead of losing interest and aborting the registration process). In some examples, this may increase membership and the network value of the program. In some instances, the system may reduce processing requirements and/or data communications on or between devices associated with the prospective member and/or the loyalty or other system.

In some embodiments, before displaying the registration interface, the processor(s) may be configured to generate a verification request. The verification request can, in some examples, request that the new member provide data for one or more profile fields. If the received data matches the data pre-populated in the profile field(s), the processor(s) can determine that the member has been verified and can continue the autoboarding process. If the received data does not match, the processor(s) can determine that the member has not been verified and can stop or abort the autoboarding process.

In some examples, the processor(s) may randomly select one or more of the pre-populated fields to use in a verification request. In some examples, the pre-populated field(s) in the verification request may be selected from a defined subset of profile fields. For example, in some embodiments, the defined subset may only include fields which would generally not be readily available to the public such as a business identification number, a postal code, an account number, a tax identifier, and the like.

In some instances, the embodiments including the optional verification request can provide greater data security or privacy by preventing unauthorized persons from gaining access to information through the autoboarding process, or from unwanted registration. In some examples, the combination of the registration identifier and the verification request serve as a multi-factor authentication.

In some examples, upon displaying the pre-populated profile fields, the processor(s) can be configured to receive signals confirming the information in the pre-populated fields. For example, the signals may be received when the new member clicks on a confirm/submit button on an interface screen.

In some examples, the processor(s) can be configured to receive signals for modifying the pre-populated fields. For example, signals may be received when a new member changes the information pre-populated fields before clicking on a confirm/submit button. This may allow a new member to change any pre-populated information which is incorrect or outdated, or to add information to fields which were not pre-populated.

In some examples, when multiple options for pre-populating one or more fields are available (for example, if different data such as an address is received from different sources), the processor(s) can be configured to display on the interface input elements through which a new member can select/confirm one of the options. For example, if different addresses associated with a profile are received from different sources, the processor(s) can be configured to display an interface element which can be activated to select one of the addresses. The interface element may include a list, radio buttons, a pull-down menu, and/or any other suitable element.

Upon receiving a confirmation and/or submission of the profile data, the processor(s) can be configured to store the profile as a registered profile. In some examples, this may include modifying a flag or variable which indicates that the profile is registered. In some example, storing the profile as a registered profile includes storing the profile in a separate database for registered profiles.

With reference to FIG. 59, upon confirming the profile information, the processor(s) can be configured to present interface(s) for welcoming the new member, presenting terms and conditions, setting up one or more initial rewards, and displaying a member (e.g. merchant) dashboard. In FIG. 59, AW stands for "Admin Web" which is an example partner/bank portal or other interface through which users may administer the program. For example, the AW may be used to upload .csv files or information for potential business members (see for example, FIGS. 56 and 57).

In FIG. 59, BW stands for "Business Web" which is an example business/merchant portal or other interface through which merchant users may access the program (See for example, FIG. 58).

FIG. 60 shows an example interface whereby tags or other group identifiers can be viewed, searched, or assigned to member profiles. For example, tags may be created and applied to identify members who signed up through certain organizations, at certain locations, or during certain membership drives.

While tagging may be applied to any type of member (e.g. cardholders, merchants, charities, etc.), the interface in FIG. 60 illustrates an example for applying tags to customer/cardholder members. In some examples, the application of tags can provide useful information regarding a member such as what charities, merchants, locations, etc. the member may be interested in, connected to, or otherwise related. In some examples, tagging may enrich member profiles and may provide additional information for providing more targeted and/or relevant rewards/offers, or donation options.

Other examples of tags can indicated that a member is an employee of a certain company/industry, or that a member has won a prize within the loyalty system. FIG. 61 shows an example member profile including a number of example tags.

In some examples, the processor(s) may be configured to receive bulk tagging information suitable for importing new tags and/or applying tags to multiple members. FIG. 62 shows an example interface for receiving and loading tagging data for multiple members. In some examples, additional information such as tag descriptions can be added during this process.

Figure 63B:
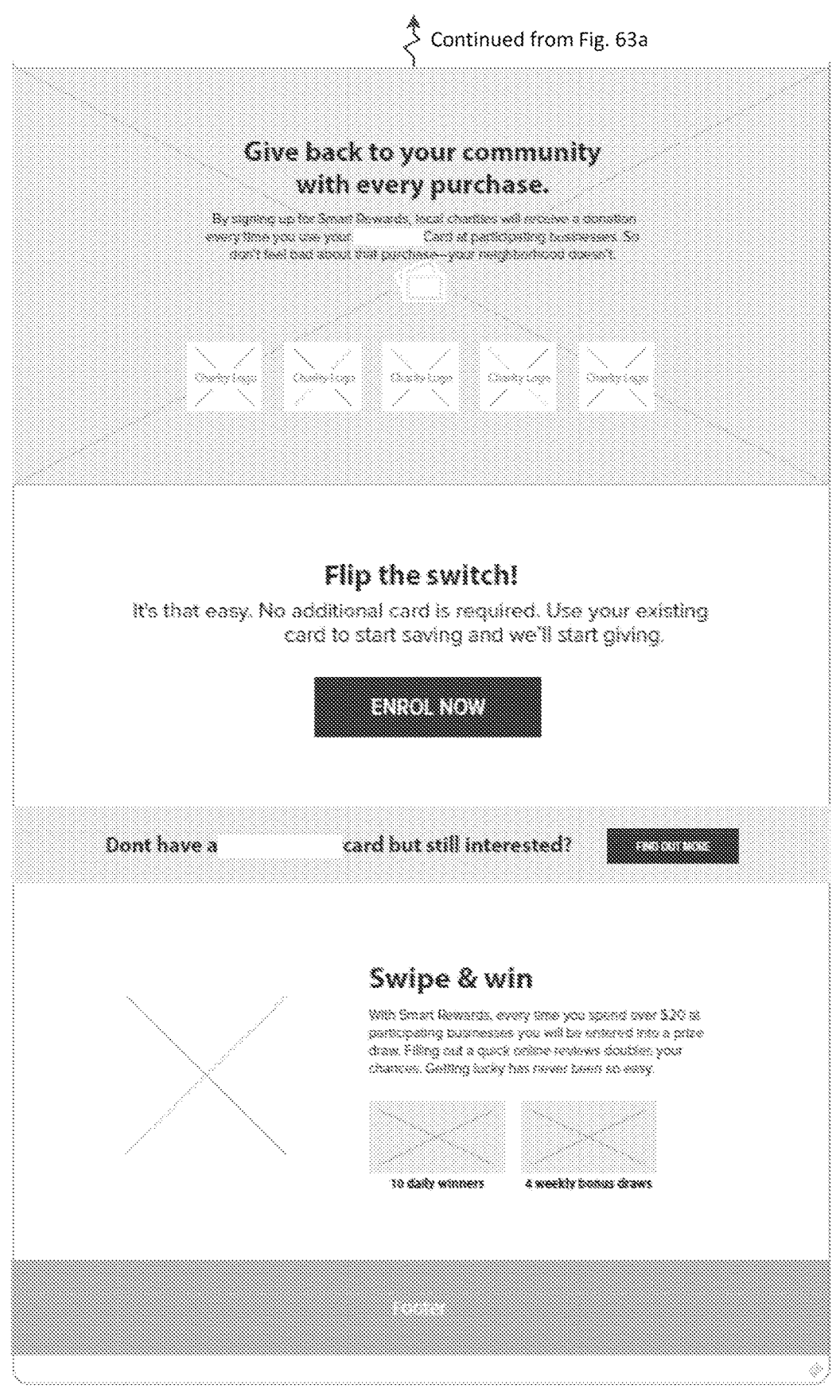

FIGS. 63*a*, 63*b*, 64*a*, and 64*b* show portions of an example interface templates which may be displayed to advertise, encourage, and/or accept new members. In some examples, the interface placeholders can be populated with sample offers, charities, and/or prizes which may be of particular relevance to a prospective member such as a cardholder/customer. Some of the more advanced loyalty systems may be termed automated cause marketing ("ACM"). An ACM program typically automates dissemination of benefits to several parties involved in fundraising, including one or more supported organizations (for example, charities), merchants, and individuals (also referred to as members, consumers, or customers). Optimally, flow-through to the supported organizations is maximized in the ACM model. One exemplary model of an ACM program is disclosed in U.S. patent application Ser. No. 12/118,923 to EDATANETWORKS™ for "Method, System, and Computer Program for Providing a Loyalty Engine for Automated Cause Management".

The present invention enables an intermediary such as an advertising provider to also be advantageously associated with the ACM program while also increasing contribution opportunities to the supported organizations and loyalty opportunities to the merchant. The merchants and advertising provider may acquire and analyze data associated with consumer-merchant transactions. The present invention is equally beneficial for enabling an online advertising provider to benefit from offline transactions as it is from online transactions.

descriptions can be added during this process.

FIGS. 63*a*, 63*b*, 64*a*, and 64*b* show portions of an example interface templates which may be displayed to advertise, encourage, and/or accept new members. In some examples, the interface placeholders can be populated with sample offers, charities, and/or prizes which may be of particular relevance to a prospective member such as a cardholder/customer.

Some of the more advanced loyalty systems may be termed automated cause marketing ("ACM"). An ACM program typically automates dissemination of benefits to several parties involved in fundraising, including one or more supported organizations (for example, charities), merchants, and individuals (also referred to as members, consumers, or customers). Optimally, flow-through to the supported organizations is maximized in the ACM model. One exemplary model of an ACM program is disclosed in U.S. patent application Ser. No. 12/118,923 to EDATANETWORKS™ for "Method, System, and Computer Program for Providing a Loyalty Engine for Automated Cause Management".

The present invention enables an intermediary such as an advertising provider to also be advantageously associated with the ACM program while also increasing contribution opportunities to the supported organizations and loyalty opportunities to the merchant. The merchants and advertising provider may acquire and analyze data associated with consumer-merchant transactions. The present invention is equally beneficial for enabling an online advertising provider to benefit from offline transactions as it is from online transactions.

The present invention also provides the above advantages optimally using a mobile device or other wireless means. The mobile device may enable optimal dissemination of offers, rewards, contests, surveys, mapping, or other location or proximity based services. Mobile access to an ACM program interface may also be provided.

Mobile Communications Facility

The present invention also discloses a mobile device utility that can be used with an ACM program to further enhance the systems and methods described above. The mobile device utility may receive and deliver content between the ACM program and a member's mobile device using SMS/MMS, cellular network, wi-fi, or other wireless mobile communications mediums and protocols. The mobile device utility may transmit and receive information using a secure protocol.

The mobile device utility is operable for any ACM program and, in particular, should not be considered limited to an ACM program where merchants and supported organizations are of any particular type, whether local, regional, national, etc.

The mobile device utility may be synchronized in real time or near real time with the ACM program. For example, if content such as surveys, offers, rewards, or contests are disseminated using the mobile device utility that content may not be made available to the same member using a typical portal to the ACM program, such as the ACM program web site. Similarly, if the member receives content while using the typical portal to the ACM program that content may not be made available to the same member via the mobile device utility. It should be noted that if the ACM program typically records the information exchanged between the ACM program and the member, the ACM program could be adapted to also record associated information exchanged with the member using the mobile device utility such that the mobile device utility may be a seamless addition onto the typical ACM program.

Optimally, the recording features of the ACM program would be operable to identify which information is exchanged using the mobile device utility, since such information may be desired by parties associated with the ACM program. This information can be advantageously used to provide advanced analytics in connection with the movements of and transactions of members. For example, mobile specific reports may be generated for a merchant or intermediary or across the entire ACM program or a subset thereof, whereby information is provided related to all facets of member-mobile interaction including mobile surveys, mobile reward redemption, and mobile contest entries.

These reports can be used by merchants to determine whether to issue rewards based on location tied to a member's prior shopping patterns or based on inventory variables.

A member may provide its mobile device information to the ACM program using any of a number of methods. The member may navigate to the ACM program interface, such as a web site, authenticate as a registered member (in accordance with the ACM program details), select a link corresponding to mobile device setup and then provide the mobile device information such as phone number or other identifier. Alternatively, a member may access the web site using the mobile device. In this case, a web page tailored to a mobile device may be displayed to the member. The member can provide authentication information, and once the ACM program validates the member, the active mobile device can be associated to the member's ACM program profile without the member needing to manually enter it. An unsuccessful authentication in either implementation can be handled by the ACM program by providing the member with an alert that authentication failed.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The invention claimed is:

1. A method comprising:

generating a registration identifier for each of a plurality of prospective members, each said registration identifier identifying profile information associated with a respective said prospective member;

receiving a registration request including the registration identifier associated with a requesting said prospective member, wherein said receiving includes receiving signals representing inputted prospective member profile data associated with at least one of a plurality of data fields;

generating signals corresponding to a plurality of profile fields, wherein:

at least one of the profile fields is pre-populated with at least a portion of the profile information associated with the requesting prospective member; and said generating further includes:

populating a prospective member profile with the inputted prospective member profile data;

identifying at least one prospective member registration identifier from the prospective member profile, the at least one prospective member identifier uniquely identifying the prospective member;

generating signals corresponding to instructions to:

search one or more data sources using the at least one prospective member registration identifier; and retrieve from the searched one or more data sources additional prospective member profile data associated with at least one of the plurality of data fields which are not populated with the inputted prospective member profile data;

populating the prospective member profile with additional prospective member profile data; and populating the prospective member profile with at least one incentive to incent the prospective member to conduct a commercial transaction with a merchant;

and receiving signals for modifying or confirming the pre-populated profile fields, wherein one of more of each said receiving of said signals is via telecommunications hardware with a short range wireless network operating according to the 802.11 family of standards.

2. The method as defined in claim 1, further comprising generating signals for displaying or distributing each of the at least one registration identifier.

3. The method as defined in claim 1, further comprising associating the profile information with the at least one of the profile fields.

4. The method as defined in claim 1, further comprising receiving signals at least one of an administrator portal interface, a card issuer system, a merchant system, and a charity system.

5. The method as defined in claim 4, further comprising:
generating a verification request, the verification request including a request for input data for at least one of the profile fields; and
when the input data matches the at least one profile field, generating the signals for the administrator portal interface.

6. The method as defined in claim 1, wherein:
the prospective member is a merchant; and
the plurality of data fields includes data fields associated with one or more merchant store locations in the prospective member profile;
and
the method further comprises:
generating signals to cause searching of the one or more data sources to locate data pertaining to one or more of the one or more merchant store locations;
displaying, on the display, the data pertaining to the one or more merchant store locations;
receiving signals representing one or more inputs confirming the data pertaining to the one or more merchant store locations;
and
populating the prospective member profile with the one or more merchant store locations with the confirmed data.

7. The method as defined in claim 1, further comprising:
identifying a merchant payment processing identifier as related to one merchant location of the one or more merchant transactions;
and
identifying merchant location data as corresponding with the merchant location.

8. A method comprising:
generating a registration identifier for each of a plurality of prospective members, each registration identifier identifying profile information associated with a respective said prospective member;
receiving signals representing a registration request including the registration identifier associated with a requesting said prospective member, wherein said receiving includes receiving signals representing inputted prospective member profile data associated with at least one of a plurality of data fields;
generating signals that include:
a pre-population of at least a portion of the profile information associated with the requesting said prospective member;
populating a prospective member profile with the inputted prospective member profile data;
identifying at least one prospective member registration identifier from the prospective member profile, the at least one prospective member identifier uniquely identifying the prospective member;
generating signals corresponding to instructions to:
search one or more data sources using the at least one prospective member registration identifier; and
retrieve from the searched one or more data sources additional prospective member profile data associated with at least one of the plurality of data fields which are not populated with the inputted prospective member profile data; and
populating the prospective member profile with at least one incentive to incent the prospective member to conduct a commercial transaction with a merchant, wherein the at least one incentive is based on the prospective member profile data; and
receiving signals for modifying or confirming the pre-populated profile fields, wherein one of more of each said receiving of said signals is via telecommunications hardware with a short range wireless network operating according to the 802.11 family of standards.

9. The method as defined in claim 8, further comprising generating signals for displaying or distributing each of the at least one registration identifier.

10. The method as defined in claim 8, further comprising associating the profile information with the at least one of the profile fields.

11. The method as defined in claim 8, wherein the signals representing pre-enrollment data are received via at least one of an administrator portal interface, a card issuer system, a merchant system, and a charity system.

12. The method as defined in claim 11, further comprising:
generating a verification request including a request for input data for at least one of the profile fields having pre-enrollment data; and
when the input data matches the pre-enrollment data for the at least one profile field, generating the signals for the administrator portal interface.

13. The method as defined in claim 8, wherein:
the prospective member is a merchant;
the plurality of data fields includes data fields associated with one or more merchant store locations in the prospective member profile; and
the method further comprises:
generating signals to cause searching of the one or more data sources to locate data pertaining to one or more of the one or more merchant store locations;
displaying, on the display, the data pertaining to the one or more merchant store locations;
receiving signals representing one or more inputs confirming the data pertaining to the one or more merchant store locations; and
populating the prospective member profile with the one or more merchant store locations with the confirmed data.

14. The method as defined in claim 8, further comprising:
identifying a merchant payment processing identifier as related to one merchant location of the one or more merchant transactions;
identifying merchant location data as corresponding with the merchant location; and
storing the merchant location data as corresponding to the merchant location in the prospective member profile.

15. A non-transitory computer-readable medium or media having stored thereon instructions which, when executed by a web-enabled mobile computing device, the web-enabled mobile computing device performs a method comprising:
generating a registration identifier for each of a plurality of prospective members, each said registration identifier identifying profile information associated with a respective said prospective member;
receiving signals representing:
a registration request including the registration identifier associated with a requesting said prospective member;
and
inputted prospective member profile data associated with at least one of a plurality of data fields;
generating signals including:
a pre-population of at least one of a plurality of profile fields with at least a portion of the profile information associated with the requesting said prospective member;
and
a population of a prospective member profile with the inputted prospective member profile data;
identifying at least one prospective member registration identifier from the prospective member profile, the at least one prospective member identifier uniquely identifying the prospective member;
retrieving from one or more data sources additional prospective member profile data associated with at least one of the plurality of data fields which having not been populated with the inputted prospective member profile data;
populating the prospective member profile with at least one incentive to incent the prospective member to conduct a commercial transaction with a merchant, wherein the at least one incentive is based on the prospective member profile data;
and
receiving signals corresponding to the pre-populated profile fields, wherein one of more of each said receiving of said signals is via telecommunications hardware with a short range wireless network operating according to the 802.11 family of standards.

16. The non-transitory computer-readable medium or media as defined in claim 15, wherein the method further comprises generating signals for displaying or distributing each of the at least one registration identifier.

17. The non-transitory computer-readable medium or media as defined in claim 15, wherein the method further comprises associating the profile information with the at least one of the profile fields.

18. The non-transitory computer-readable medium or media as defined in claim 15, wherein the signals representing pre-enrollment data are received via at least one of an administrator portal interface, a card issuer system, a merchant system, and a charity system.

19. The non-transitory computer-readable medium or media as defined in claim 18, wherein the method further comprises:
generating, with the at least one processor, a verification request that includes a request for input data for at least one of the profile fields having pre-enrollment data; and
when the input data matches the pre-enrollment data for the at least one profile field, generating the signals for displaying the administrator portal interface.

20. The non-transitory computer-readable medium or media as defined in claim 15, wherein:
the prospective member is a merchant; and
the plurality of data fields includes data fields associated with one or more merchant store locations in the prospective member profile;
and
the method further comprises:
generating signals to cause searching of the one or more data sources to locate data pertaining to one or more of the one or more merchant store locations;
displaying, on a display, the data pertaining to the one or more merchant store locations;
receiving signals representing one or more inputs confirming the data pertaining to the one or more merchant store locations;
populating the prospective member profile with the one or more merchant store locations with the confirmed data;
and
identifying a merchant payment processing identifier as related to one merchant location of the one or more merchant transactions.

\* \* \* \* \*